US006637517B2

(12) United States Patent  
Samuel et al.

(10) Patent No.: US 6,637,517 B2  
(45) Date of Patent: *Oct. 28, 2003

(54) COMPOSITIONS CONTAINING AQUEOUS VISCOSIFYING SURFACTANTS AND METHODS FOR APPLYING SUCH COMPOSITIONS IN SUBTERRANEAN FORMATIONS

(75) Inventors: Mathew M. Samuel, Katy, TX (US); Frank F. Chang, Sugar Land, TX (US); Roger J. Card, Paris (FR); Ronnie L. Thomas, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/051,842

(22) Filed: Jan. 17, 2002

(65) Prior Publication Data

US 2003/0019627 A1 Jan. 30, 2003

Related U.S. Application Data

(60) Division of application No. 09/256,980, filed on Feb. 23, 1999, now Pat. No. 6,435,277, which is a continuation-in-part of application No. 08/727,877, filed on Oct. 9, 1996, now Pat. No. 5,964,295, and a continuation-in-part of application No. 08/865,137, filed on May 29, 1997, now Pat. No. 5,979,557.

(51) Int. Cl.[7] .......................... E21B 43/26; E21B 43/27
(52) U.S. Cl. ...................... 166/381; 166/294; 166/307; 166/308; 507/923; 507/933
(58) Field of Search ................................ 166/281, 283, 166/294, 307, 308, 309; 507/131, 202, 240, 923, 933

(56) References Cited

U.S. PATENT DOCUMENTS

| 3,361,213 A | * | 1/1968 | Savins ...................... 114/67 R |
| 4,324,669 A | * | 4/1982 | Norman et al. ............. 166/282 |
| 4,591,447 A | * | 5/1986 | Kubala ........................ 166/275 |
| 5,101,903 A | * | 4/1992 | Llave et al. ............. 166/270.1 |
| 5,551,516 A | * | 9/1996 | Norman et al. ............. 166/308 |
| 5,979,557 A | * | 11/1999 | Card et al. .................. 166/281 |
| 6,239,183 B1 | * | 5/2001 | Farmer et al. ............. 166/270 |
| 6,399,546 B1 | * | 6/2002 | Chang et al. ............... 507/131 |
| 6,446,727 B1 | * | 9/2002 | Zemlak et al. ........... 166/177.5 |

* cited by examiner

*Primary Examiner*—George Suchfield  
(74) *Attorney, Agent, or Firm*—Catherine Menes; Brigitte Jeffery; John Ryberg

(57) ABSTRACT

The improved recovery of hydrocarbons from subterranean formations by hydraulically fracturing a subterranean formation is accomplished. Fracturing fluids using a viscosifying surfactant fluid containing viscosifying micelles, for example, wormlike micelles, are useful to improve recovery of hydrocarbons and limit the loss of fracturing fluid into the formation fracture face. The invention further relates to novel fracturing and acidizing methods useful for increasing hydrocarbon production, limiting water production, resisting fracturing fluid loss into the subterranean formation, and reducing the equipment requirements in mixing and pumping fracturing fluid. The action of viscosifying micelles of surfactant in aqueous zones of the subterranean formation diverts fracturing fluid or acid from the aqueous zones to the hydrocarbon-bearing zones and also facilitates the flowback of increased amounts of hydrocarbons once a fractured well is placed back on production. These methods selectively block the pore structure in a water-bearing zone and do not blocking the pore structure of a hydrocarbon zone at the formation face. The step for selectively blocking forms a plug of a viscous fluid containing viscosifying micelles in the pore structure of the water-bearing zone at the formation face.

8 Claims, 22 Drawing Sheets

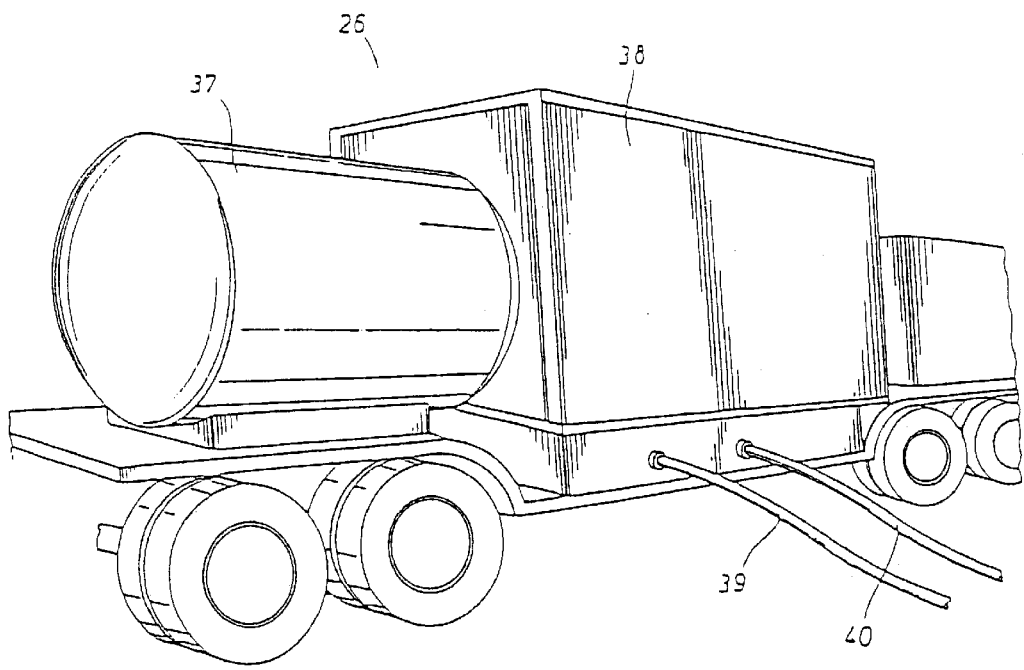
PRIOR ART     FIG. 2
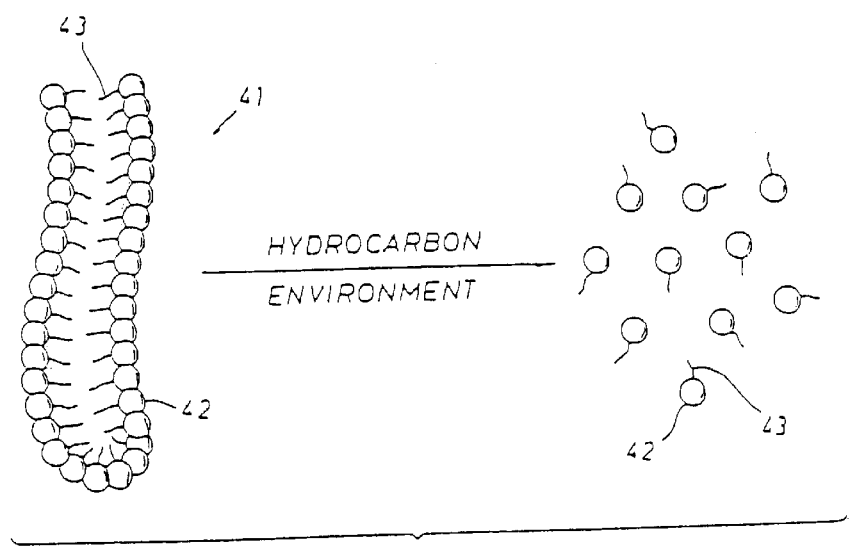
FIG. 5

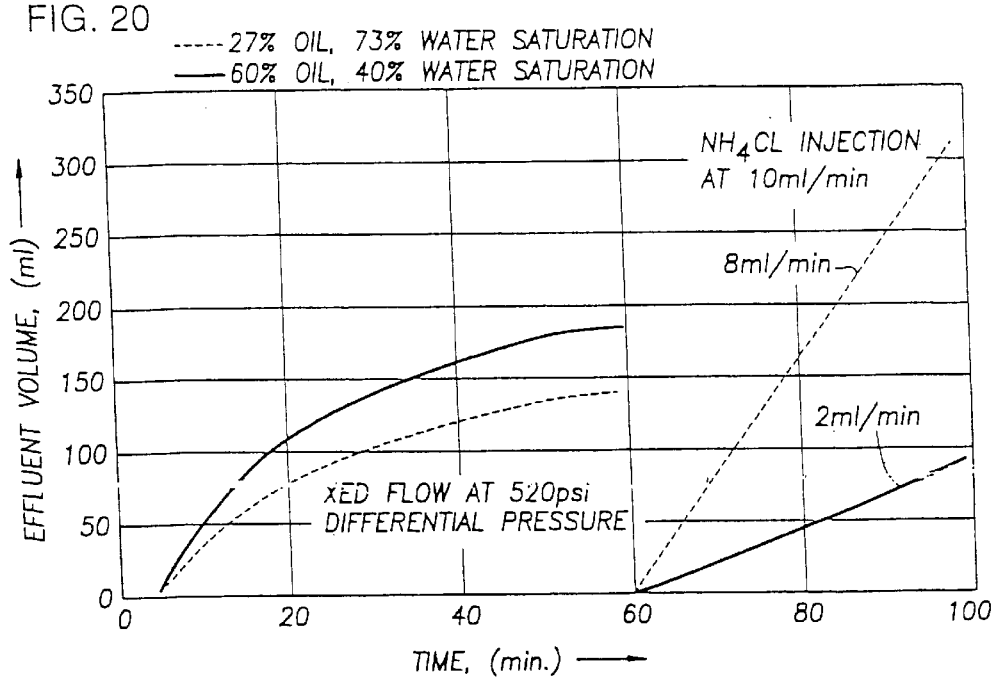
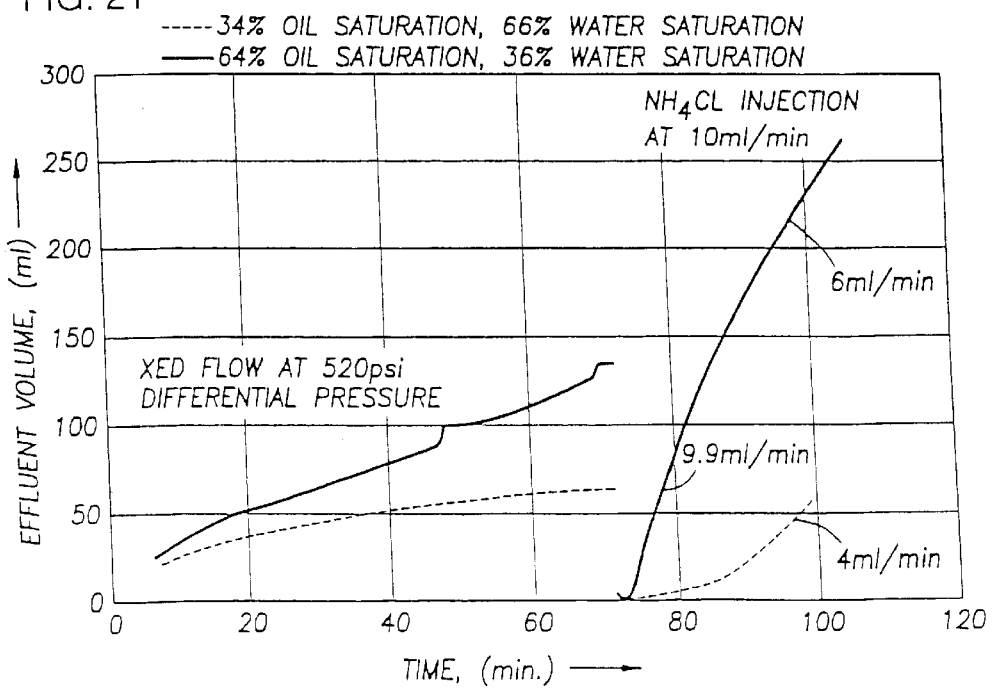

COMPOSITIONS CONTAINING AQUEOUS VISCOSIFYING SURFACTANTS AND METHODS FOR APPLYING SUCH COMPOSITIONS IN SUBTERRANEAN FORMATIONS

RELATED APPLICATIONS

This is a divisional application of U.S. patent application Ser. No. 09/256,980, filed on Feb. 23, 1999 and issued as U.S. Pat. No. 6,435,277 on Aug. 20, 2002, a continuation-in-part of U.S. patent application Ser. No. 08/727,877, entitled Methods of Fracturing Subterranean Formations, filed on Oct. 9, 1996 and issued as U.S. Pat. No. 5,964,295 on Oct. 12, 1999, and Ser. No. 08/865,137, entitled Methods for Limiting the Inflow of Formation Water and for Stimulating Subterranean Formations, filed on May 29, 1997 and issued as U.S. Pat. No. 5,979,557 on Nov. 9, 1999, both of which are hereby incorporated by reference in their entirety.

FIELD OF THE INVENTION

This invention relates to the recovery of hydrocarbons from subterranean formations and to compositions useful in such operations. More particularly, the invention relates to novel methods of stimulating subterranean formations, e.g., by fracturing and/or acidizing, to increase hydrocarbon production and diverting stimulation fluids away from water rich zones, thereby limiting stimulation fluid loss into such water rich zones, to novel methods for limiting the inflow of formation water, and to novel compositions useful in such methods.

BACKGROUND OF THE INVENTION

In the recovery of hydrocarbons from subterranean formations, particularly in such formations wherein the wellbore also traverses water-bearing zones, the desire is to facilitate the movement of hydrocarbons to the wellbore so that the hydrocarbons may be pumped from the well. At the same time, there is a corresponding desire to limit the movement of formation water into the wellbore and production thereof In order to enhance the effectiveness of some of these methods for increasing hydrocarbon production, the proper placement of, for example, acidizing and/or fracturing fluids at the hydrocarbon zones and minimizing the loss thereof into the water zones is desirable.

In such fracturing operations, a fracturing fluid is hydraulically injected into a wellbore penetrating the subterranean formation and is forced against the formation strata by pressure. The formation strata or rock is forced to crack and fracture, and a proppant is placed in the fracture by movement of a viscous fluid containing proppant into the crack in the rock. The resulting fracture, with proppant in place, provides improved flow of the recoverable fluid, i.e., oil, gas or water, into the wellbore.

Fracturing fluids customarily comprise a thickened or gelled aqueous solution which has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite, or similar materials. The "propped" fracture provides a larger flow channel to the wellbore through which an increased quantity of hydrocarbons can flow, thereby increasing the production rate of a well.

A problem common to many hydraulic fracturing operations is the loss of fracturing fluid into the porous matrix of the formation. Fracturing fluid loss is a major problem. Hundreds of thousands (or even millions) of gallons of fracturing fluid must be pumped down the wellbore to fracture such wells, and pumping such large quantities of fluid is very costly. The lost fluid also causes problems with the function or technique of the fracture. For example, the undesirable loss of fluid into the formation limits the fracture size and geometry which can be created during the hydraulic fracturing pressure pumping operation. Thus, the total volume of the fracture, or crack, is limited by the lost fluid volume that is lost into the rock, because such lost fluid is unavailable to apply volume and pressure to the rock face.

Hydraulic fracturing fluids usually contain a hydratable polymer which thickens the fracturing fluid when it is chemically crosslinked. Such a polymer typically is-hydrated upon the surface of the ground in a batch mix operation for several hours in a mixing tank or other container, and crosslinked over a period of time to viscosity the fluid so that it is capable of carrying the proppant into the fracture. Natural polymers including polysaccharides, such as guar, have been used in this way.

One problem associated with the use of polysaccharides as viscosifiers for fracturing fluids is that the hydration and crosslinking process is time consuming and requires expensive and bulky equipment at the wellsite. Such equipment, and the associated personnel to operate it, significantly increase the cost of the fracturing operation. Further, once the polysaccharide is hydrated and crosslinked, it is not feasible to add additional polysaccharide to the solution, or to regulate the concentration of polysaccharide in the fracturing fluid in real time during the pumping of the job.

Another difficulty is that a large number of supplementary additives are required to use polysaccharides successfully, including for example: bactericides, antifoam agents, surfactants to aid dispersion, pH control agents, chemical breakers, enzymatic breakers, iron control agents, fluid stabilizers, crosslinkers, crosslirking delay additives, antioxidants, salt(s) and the like. These materials must be formulated correctly (which can be a difficult task), transported to the jobsiste, and then pumped and metered accurately during the execution of the fracturing treatment.

Another disadvantage associated with such polysaccharide-based fracturing fluids is that, when they are used as viscosifiers, they contain materials that concentrate in the formation during the course of the hydraulic fracturing treatment, reducing the production of hydrocarbons after the fracturing event. For example, during the course of a treatment, water from the fracturing fluid leaks into the formation leaving the polysaccharide behind. Guar concentrations in the fracture sometimes increase by as much as a factor of twenty as compared to the concentration of guar in the actual fracturing fluid.

Many fracturing fluid materials, therefore, when used in large concentrations, have relatively poor "clean-up" properties, meaning that such fluids undesirably reduce the permeability of the formation and proppant pack after fracturing the formation. Detailed studies of polysaccharide recovery in the field after hydraulic fracturing operations indicate that more than sixty percent of the total mass of polysaccharide pumped during the treatment maybe left in the fracture at the time gas or oil begins to be produced in commercial quantities. Poor clean-up is a problem.

Well productivity after fracturing increases dramatically as the amount of polysaccharide returned to the surface increases. Anything that reduces the permeability of the propped fracture to hydrocarbons is usually detrimental to the production of hydrocarbons from the well.

Other polysaccharides, such as hydroxyethylcellulose ("HEC"), are sometimes believed to provide improved clean-up as compared to polysaccharide-based materials; however, HEC is known to form undesirable clumps or "fish eyes" during mixing. Further, HEC is limited to lower formation temperatures, and thus is not preferred for a wide variety of fracturing conditions.

To overcome the limitations of fracturing with natural or synthetic polysaccharides, some have suggested using relatively expensive materials as viscosity enhancers, such as viscoelastic surfactants. Fluids prepared from such materials are capable of carrying proppant into a fracture, but do not have many of the limitations of polysaccharide materials. Viscoelastic surfactants form micelles that are able to proceed into the reservoir rock, and then break up, allowing the components to be removed. Therefore, breaker materials are not customarily required, which reduces cost and improves cleanup of the fluid from the formation.

The problems encountered with viscoelastic surfactant-based fluids in the past, however, include relatively large fluid losses into formations in which they have been used. Micellar-type viscoelastic fluids have not been utilized widely in fracturing treatments of relatively low permeability formations because, among other reasons, materials have not been available that would enable the maintenance of a desired viscosity at temperatures above about 130° F., which is less than the temperature at which most hydraulic fracturing operations are conducted.

Until recently, the use of such viscoelastic surfactant fluids has been restricted largely to operations in shallow, high permeability formations to control sand production either in conventional gravel packing operations or involving fracturing very close to the wellbore, such as in so-called "frac-and-pack" type operations. The cost of viscoelastic components has rendered them too expensive, in most cases, to utilize in normal fracturing treatments of a large size and high volume.

Use of viscoelastic surfactant fracturing fluids has been limited in many cases to formations that contain clays or otherwise need soluble salts for the specific purpose of inhibiting hydration of the clay materials. If such clay materials are allowed to hydrate, problems can occur, thus the need exists for a soluble salt that can inhibit the hydration of such clay-type materials. U.S. Pat. No. 5,551,516 to Norman et al. ("Norman") discloses generally fracturing stimulation of high permeability formations, and more specifically, the use of surfactant-based fracturing fluids. However, Norman does not teach this invention, and in particular, does not teach application to low permeability formations. Further, Norman teaches the use of an organic activator, such as, for example sodium salicylate, which is not required in this invention.

Notably, low permeability formations present different fluid loss control challenges that typically are not addressed in fluids designed to work on high permeability formations. For example, solid fluid-loss-control additives, which are very effective in high permeability formations, have little or no utility in hydrocarbon zones of low permeability.

U.S. Pat. Nos. 4,725,372 and 4,615,825 (collectively "Teot") specifically teach and define fluids used in treating the wellbore. This requires the use of heavy brines (e.g. greater than 12–15 lbs/gallon of brine). Heavy brines generally are not desirable in hydraulic fracturing of low permeability formations. Heavy brines can minimize fluid returns after the hydraulic fracturing treatment, adversely affecting cleanup and well productivity.

For example, fluid systems that operate effectively in ammonium chloride salts many times are frequently not compatible with much heavier calcium chloride, calcium bromide and zinc salt derived brines that typically are required for wellbore treatments. Therefore, fluids of a viscoelastic type designed for wellbore applications have not been directly useful in the past as reservoir treating fluids (sand control, acid fracturing, hydraulic fracturing, matrix acidizing, remedial scale inhibition treatments and the like) and vice-versa.

Acidizing is used to stimulate hydrocarbon production from a well. There are two types of acidizing treatments: (1) matrix acidizing and (2) fracture acidizing with the difference between them relating to injection rates and pressures. Fracture acidizing is acidizing at injection rates above fracture pressure. Fracture acidizing is used for creating cracks or fractures in the formation to increase the available flow area and thereby increase well productivity. Acidizing at injection rates below fracture pressure is termed matrix acidizing. Matrix acidizing is primarily used for damage removal and to restore the permeability to original reservoir permeability or higher. The damage is primarily skin damage caused by drilling, completion and workover fluids and precipitation of deposits from produced water or oil (such as scale). Removal of severe plugging in carbonate and sandstone formations can result in very large increases in well productivity. Oil well flow behavior is greatly affected by the geometry of radial flow into the wellbore. The pressure gradient, for example, psi per foot, is proportional to the flow velocity and is very small at large distances from the wellbore. At points close to the wellbore, the flow area is much smaller and the flowing pressure gradient is much higher. Because of this small flow area, any damage to the formation close to the wellbore, say within 20 feet thereof and sometimes within as little as 3 feet therefrom, may be the cause most of the total pressure draw down during production and thereby dominate well performance.

Because acidizing fluids do not discriminate between hydrocarbon and water bearing zones, an undesired result may be obtained wherein the production of formation water is increased. Thus, there is a need to direct acidizing fluids away from water bearing zones and preferably also limit the amount of formation water produced once the well is "turned around."

Further, at the conclusion of a conventional hydraulic fracturing operation, it is necessary to bring back to the surface as much as possible of the hydraulic fluid components such as polymer, typically a galactomannan polysaccharide, broken polymer components, salts, typically ammonium chloride, potassium chloride and tetraethyl ammonium chloride, and fluid, typically a brine, pumped into the formation during treatment. This process of bringing the fluid back to the surface after the treatment is termed "turning the well around". This process lasts from the moment fluid is begun to be brought back until the gas or oil is produced in sufficient quantities for sale. The well turnaround process can last from hours to several days. During this period, it has historically been possible to recover approximately one third of the polymer and fluid pumped during the hydraulic fracturing treatment.

In the case of low permeability (less than about 1 md) dry gas reservoirs (that is, gas reservoirs which produce hydrocarbons and little or no formation water), it is possible to dramatically improve the recovery of polymer and fluid during the well turnaround period by increasing the rate at which the fluids are brought back to the surface. This has been documented in two published field studies. SPE 31094 (D. Pope, L. Britt, V. Constien, A. Anderson, L. Leung, "Field Study of Guar Removal from Hydraulic Fractures: presented at the SPE International Symposium on Formation Damage Control, Lafayette, La., Feb. 14–15, 1995) provided the first demonstration that increased flowback rate results in increased polymer recover which results in increased well productivity. This was taken further in SPE 36468 (A. J. Anderson, P. J. N. Ashton, J. Lang and M. L. Samuelson, "Production Enhancement Through Aggressive Flowback Procedures in the Codell Formation" presented at the SPE Annual Technical Conference and Exhibition, Denver, Colo., Oct. 6–9, 1997) where polymer recovery was increased to more than 60% of the amount pumped during the treatment and 90 day cumulative production was increased by more than 50% over those of offset wells with less aggressive flowback rates. Similar results have been observed in other low permeability dry gas wells. (See, for example, SPE 30495, P. R. Howard, M. T. King, M. Morris, J. P. Feraud, G. Slusher, S. Lipari, "Fiber/Proppant Mixtures Control Proppant Flowback in South Texas" presented at the SPE Annual Technical Conference and Exhibition, Dallas, Tex., Oct. 22–25, 1995.)

The flowback pattern from this type of formation is very distinctive. This is illustrated in FIG. 10. This figure presents a graph of the concentration of the polymer, in this case guar, in samples of fluid flowed back to the surface after the hydraulic fracturing treatment of a dry gas well as a function of the time between the start of the flowback and when the sample was collected. The concentration of polymer in these samples is equal to or greater than the concentration of guar pumped during the treatment and is relatively constant over time. This behavior continues for months after the turn around period is over and the well is in production.

However, in recent studies relating to oil wells, we have determined and demonstrated that the inflow of formation water during the well turn around period is detrimental to the ability to maximize the polymer recovered after a hydraulic fracturing treatment of a gas or oil well and to efforts to maximize well productivity. As a result, we have identified that there is a need to control the inflow of this formation water during the well turn around stage in order to be able to maximize well productivity.

A need exists for a surfactant fluid that economically can increase hydrocarbon production, limit formation water production, resist fluid loss into the formation, direct fluids away from water bearing zones, and preserve the component balance of the fluid mixture. A fluid that can achieve the above while improving the precision with which fluids are delivered, and reduce equipment or operational requirements, would be highly desirable.

SUMMARY OF THE INVENTION

It has been discovered that a viscous surfactant fluid may be used advantageously in many different fracturing applications to achieve results not previously believed possible using such fluids. In particular, this invention is effective in increasing hydrocarbon production following hydraulic fracturing. Further, these methods may be employed to limit formation water production after fracturing, which assists in improving the percentage of hydrocarbons recovered once a well is put back on production after fracturing.

Other advantages of the methods of this invention include that it assists in resisting fracturing fluid loss into the subterranean formation by directing fluids away from water-bearing zones, thereby saving money and preserving the component balance of the fracturing fluid mixture. It is also an advantage of this invention that it is possible to reduce the equipment requirements in mixing and pumping fracturing fluids at the wellsite, and improve operational efficiency in fracturing wells. This invention can be utilized to save operating expense and to improve the precision with which fluids may be delivered into the wellbore during fracturing.

The inventions contained in U.S. patent application Ser. No. 08/727,877, entitled Methods of Fracturing Subterranean Formations, filed Oct. 7, 1996, and 08/865,137, entitled Methods for Limiting the Inflow of Formation Water and for Stimulating Subterranean Formations, filed May 29, 1997, both of which have been previously incorporated by reference in their entirety, and are assigned to the assignee of the present invention, centered on surfactants which contained micelles, the micelles having a structure that contributes to the increased viscosity of the fluid. Specific embodiments therein were viscoelastic surfactants which formed wormlike micelles. Continuing the development of the inventions of these U.S. patent applications, we have found that wormlike micelles are only one type of micelles which form a structure in an aqueous environment that contributes to the increased viscosity of the fluid. Other structures are (1) closely packed spherical micelles, (2) serpentine multilayered structures, (3) entangled or interlocking multiple elongated micelle structures and (4) other structures which defy simple word characterization and will be referred to as "aggregates." Please note that "micelle" includes vesicles. We have also found other types of surfactants, not necessarily viscoelastic surfactants, possessing these characteristics. Those identified in the aforementioned patent applications are amines (nonionic surfactant) and amine salts and quaternary amine salts (cationic surfactants).

The surfactant component of the viscous fluid of the present invention comprises at least one surfactant selected from the group consisting of cationic, anionic, zwitterionic (including amphoteric), nonionic and combinations thereof, wherein the surfactants alone or in combination are capable of forming micelles which form a structure in an aqueous environment that contribute to the increased viscosity of the fluid (hereinafter called "viscosifying micelles") and wherein the viscous fluid loses its viscosity when in contact with hydrocarbons. The viscous fluids of the present invention are stable to temperatures in excess of 130 degrees ° F., preferably at least 150° F., more preferably at least 175° F. and yet more preferably at least 200° F., and are also shear stable showing little to no shear hysteresis.

In one embodiment, the invention comprises a method of reducing fluid loss into a relatively low permeability formation during fracturing by providing a viscous fracturing fluid comprising a thickening amount of at least one surfactant, each such surfactant comprising a surfactant ion having a hydrophobic first portion chemically bonded to an ionic hydrophilic second portion, wherein the surfactant spontaneously forms micelles having a structure that contributes to the increased viscosity of the fluid when the concentration is higher than the critical micellar concentration. The viscous fracturing fluids are stable at temperatures greater than 130 degrees ° F., preferably at least 150° F., more preferably at least 175° F. and yet more preferably at least 200° F., and are capable of selectively forming, changing structure or disbanding depending upon the polarity of the surrounding fluid in the formation. For example, these fluids maintain their viscosity in the presence of water, but lose their viscosity when in contact with hydrocarbons.

The fluid is pumped, for example, into a relatively low permeability formation at a pressure sufficient to fracture the formation, the relatively low permeability formation having a fracture face engaged by the fluid during pumping. Typically, the formation comprises at least one largely hydrocarbon-bearing zone and at least one largely aqueous zone.

The viscosity of the fluid within the hydrocarbon-bearing zone is decreased, while the viscosity of the fluid within the aqueous zone is maintained. Further, the amount of viscous fluid lost into the fracture face is reduced, whereby a greater volume of viscous fluid is available for fracturing the relatively low permeability formation, and increasing the ratio of fracture size per unit volume of viscous fluid pumped into the wellbore.

In other methods, the invention includes enhancing the cleanup of viscous fracturing fluid from the well, or in some cases flowing back fluid from the wellbore, wherein hydrocarbon production upon flowing back fluid from the wellbore is increased.

The viscosity of fluid within the at least one aqueous zone of the subterranean formation is maintained by presence of the viscosifying micelles in that zone of the formation, and viscosity of the fluid within the at least one hydrocarbon-bearing zone is depleted by the disbanding or structural change of the micelles to a structure which does not contribute to increased viscosity of the fluid.

In many cases, the maintenance of the viscosifying micelles within aqueous zones contributes to an increase in hydrocarbon production from the wellbore upon flowing back fluid from the wellbore following fracturing.

In another embodiment, a method of reducing the production of water from a subterranean formation subsequent to fracturing the subterranean formation is shown. This method is directed to providing an hydraulic fracturing fluid comprising an aqueous medium, an effective amount of a water-soluble salt, and an effective amount of a thickener in the fluid, generating a viscous fluid comprising viscosifying micelles; and pumping the viscous fluid comprising viscosifying micelles through a wellbore and into a formation at a pressure sufficient to fracture the formation. The formation may have an aqueous zone containing a significant amount of water, and a hydrocarbon zone. The viscosifying micelles in the viscous fluid within the hydrocarbon zone undergo a structural change or break down, thereby decreasing the viscosity of the fluid within the hydrocarbon zone to form a thinned fluid. The thinned fluid is then removed from the hydrocarbon zone of the formation. The viscosifying micelles in the water zone are more stable, and a reduction in the amount of water produced from the formation during the removing step is observed. Further, the advantage of increasing the production of hydrocarbons from the subterranean formation is realized.

In another method of the present invention, the formation is fractured by providing an aqueous hydraulic fracturing fluid comprising an aqueous medium, an effective amount of a water-soluble salt to effect formation stability, particularly clay stability, and at least one thickener selected from the group of surfactants consisting of cationic, anionic, zwitterionic (including amphoteric), nonionic and combinations thereof, wherein the surfactant or surfactants are capable of forming viscosifying micelles in an aqueous environment.

This method includes the steps of generating a viscous fluid comprising viscosifying micelles, pumping the viscous fluid comprising such micelles through the wellbore and into the formation at a pressure sufficient to fracture the formation. The micelles enter the water zone and the hydrocarbon zone and a fracture is accomplished. The micelles undergo a structural change or disband within the fluid in the hydrocarbon zone, thereby decreasing the viscosity of the fluid within the hydrocarbon zone. The well is flowed back, and hydrocarbons are produced from the subterranean formation. Significantly, there is a reduction in the amount of water produced from the subterranean formation during the removing step.

In one method, a procedure of fracturing a subterranean formation below the surface of the ground is disclosed using a viscous fracturing fluid that does not require prolonged hydration above the ground surface, resulting in a more efficient and less costly procedure. In this way, the fluid is prepared by simply continuously metering a concentrate at the ground surface into a blender, the concentrate comprising a thickening amount of at least one surfactant comprising a surfactant ion having a hydrophobic first portion chemically bonded to an ionic hydrophilic second portion. When a cationic viscosifying surfactant, such as a quaternary amine, is used alone, a counter-ion having a component capable of associating with the surfactant ion and forming a viscous fluid and a functionally effective amount of water are added. Mixing of the concentrate with the counter-ion and water above the ground surface is performed at the blender to instantly form a viscous fracturing fluid containing viscosifying micelles, which is simultaneously pumped below the surface of the ground into a wellbore.

The present invention provides a method of limiting the inflow of formation water during and after a well turn around to maximize the recovery of the fracturing fluid and components thereof after a hydraulic fracturing treatment of a formation having a hydrocarbon zone and a water-bearing zone, the method comprising:

step for selectively blocking the pore structure in the water-bearing zone at the formation face and not blocking the pore structure of the hydrocarbon zone at the formation face;

performing a hydraulic fracturing treatment using a fluid capable of transporting a proppant into a fracture; and turning the well around to recover the fluid and components thereof, wherein the step for selectively blocking forms a plug of a viscous fluid in the pore structure of the water-bearing zone at the formation face and wherein the viscous fluid includes at least (1) at least one surfactant capable of forming viscosifying micelles in an aqueous environment, (2) a water-soluble salt to effect formation stability, particularly clay stability, and (3) an aqueous carrier fluid in which the at least one surfactant forms the viscosifying micelles.

The term "water-bearing zone" means any portion of the formation that is capable of producing water during the turn around period. Accordingly, the term "water-bearing zone" includes a hydrocarbon-bearing zone that has a sufficiently high water saturation such that the water is mobile and produced during the turn around period.

The components of the fluid being recovered include the polymer, typically a galactomannan polysaccharide, broken polymer or polymer fragments and monomers thereof, salts, typically ammonium chloride, potassium chloride and tetraethyl ammonium chloride, and fluid, typically brine. The proppant carried by the fracturing fluid substantially remains in the fracture created during the fracturing process.

In another aspect of the present invention, there is provided a method of acidizing, including acid fracturing and matrix acidizing, a formation having a hydrocarbon zone and a water-bearing zone, the method comprising:

step for selectively blocking the pore structure in the water-bearing zone at the formation face to selectively retard migration of acid into the water-bearing zone and allow migration into the hydrocarbon zone; and injecting acid into the formation, wherein the acid is diverted from the water-bearing zone to the hydrocarbon zone as a result of selectively blocking the pore structure in the water-bearing zone at the formation face and wherein the viscous fluid includes at least (1) at least one surfactant capable of forming viscosifying micelles in an aqueous environment, (2) a water-soluble salt to effect formation stability, particularly clay stability, and (3) an aqueous carrier fluid in which the at least one surfactant forms the viscosifying micelles.

When the water-bearing zone contains a residual amount of hydrocarbon residues, these methods further comprise injecting a mutual solvent prior to the step for selectively blocking. The mutual solvent is preferably selected from the group consisting of low molecular weight esters, ether and alcohols, and more preferably, the mutual solvent is a low molecular weight ether, for example, ethylene glycol monobutyl ether.

BRIEF DESCRIPTION OF THE DRAWINGS

FIG. 2 depicts a standard mixer (the particular mixer shown is Schlumberger's "Precision Continuous Mixer" or "PCM")(PCM is a trademark of Schlumberger Technology Corporation) used to hydrate polysaccharides on a wellsite prior to pumping the polysaccharides to a blending unit where proppant is added prior to pumping into the wellbore;

FIG. 5 shows an illustration of the structure of a viscosifying micelle, e.g., worm-like micelle, of viscosifying surfactant material as it exists intact in an aqueous environment and in disbanded form after contacting a hydrocarbon medium;

FIG. 20 presents a graph showing the effect of diversion using an aqueous fluid as used in FIGS. 14a and 14b at 4%, but in a 3% $NH_4Cl$ brine followed by a 3% $NH_4Cl$ brine to simulate acidizing. One core had a 27% oil/73% water saturation and the other had a 60% oil/40% water saturation.

FIG. 21 presents a graph showing the effect of diversion using the same fluids as referenced in regards to FIG. 20, but where the cores were preflushed by a mutual solvent in a 3% $NH_4Cl$ brine.

Turning now to FIG. 1, a fracturing configuration 9 for a land-based fracture typically includes the equipment shown. The proppant is contained in sand trailers 10 and 11. Further, water tanks 12, 13, 14, 15, 16, 17, 18, 19, 20, 21, 22, 23, 24, and 25 are shown at the top of the figure. Water is pumped from such tanks into the mixers 26 and 28. Smaller fracturing jobs would use only one such mixer. Pump trucks 27 and 29 are shown on either side of FIG. 1, and they contain on their trailers the pumping equipment needed to pump the final mixed and blended slurry downhole.

Sand hopper 30 is available to receive sand from the sand trailers and distribute it into the mixers as needed. The mixers are filled with polysaccharide in a typical prior art fracturing operation, and the polymer then is hydrated using water from the water tanks. This process of hydrating the polysaccharide takes some time, and using the prior art methods that utilize guar or other hydratable polymers, the polysaccharide polymer cannot be pumped from the mixer until it is fully hydrated and ready to pump downhole. Once the polysaccharide is fully hydrated, it is no longer possible to increase viscosity by adding more polysaccharide. Should high fluid viscosity be required, the rate of polysaccharide addition from the pre-mixed slurry would be the only available means of increasing the viscosity. This would be very inefficient, however, because in many cases fluid already prepared, but of incorrect viscosity, would be discarded as unfit for use.

During fracturing, the hydrated polysaccharide is pumped from the mixers to the blenders 33 and 36, where it is blended with the proppant and then transferred to manifolds 31 and 32, respectively. The fluid containing proppant is then transferred to the pump trucks, and routed back at high pressure through treating lines 34 to rig 35, and then pumped downhole.

Figure 1:
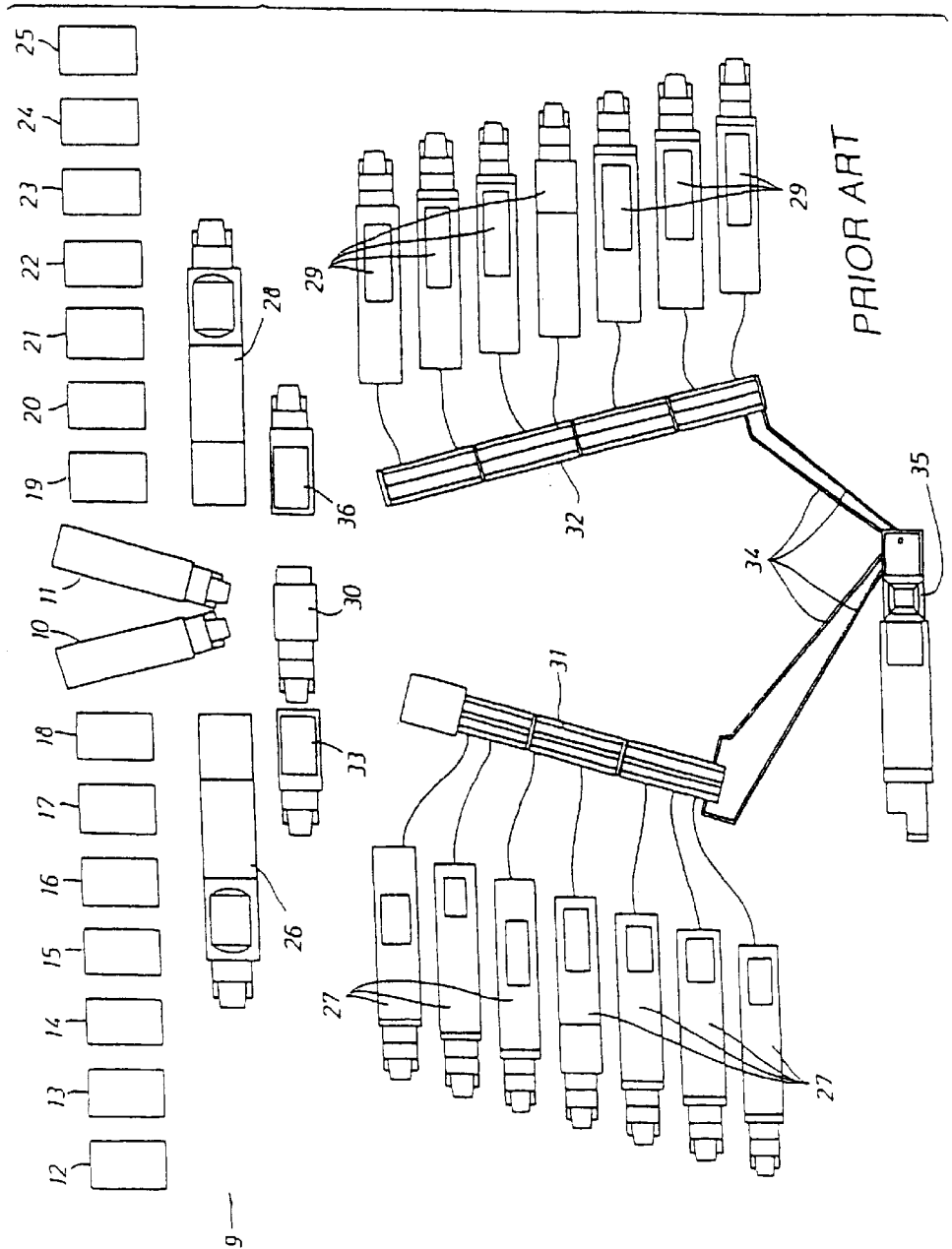
FIG. 1 shows a typical layout of the standard equipment used in the prior art on a large and-based fracturing job, which includes mixers to hydrate and contain the hydratable polymer.
Figure 1A:
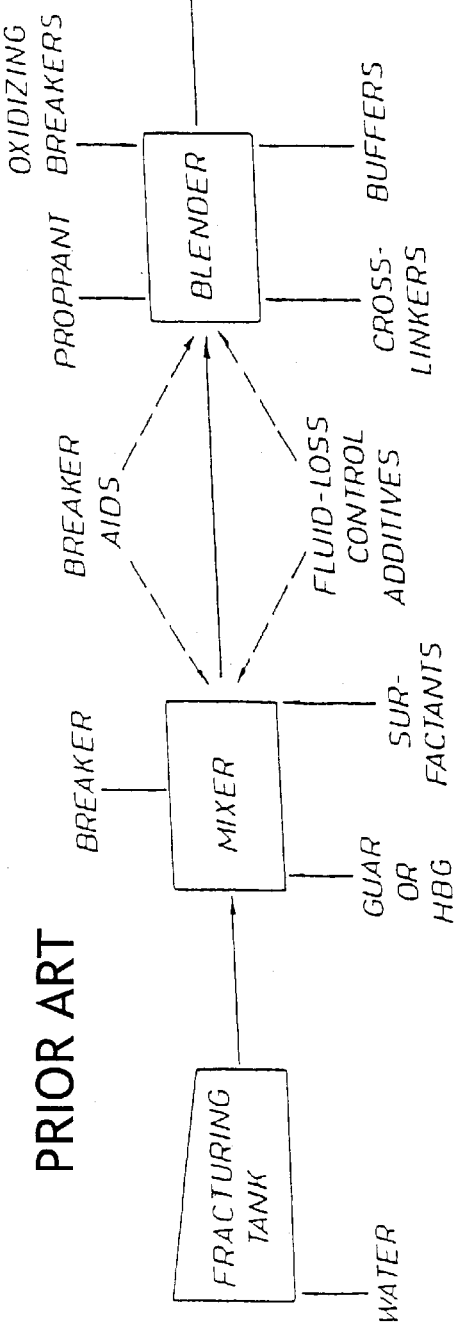
FIG. 1A illustrates the prior art methods of polysaccharide-based fracturing, which includes a mixer and numerous additives, breakers, etc., needed to cause the polysaccharide to perform.

FIG. 1A shows a typical prior art method in which water and polysaccharide are transferred from a frac tank to a mixer and then to a blender, while various additives are added along the path of the material.

FIG. 2 shows a mixer 26 which comprises a slurry gel tank 37 and mixing compartments 38. The mixing compartments contain paddle blades (not shown) which are used to slowly agitate the polysaccharide to allow it to hydrate and thicken prior to addition of crosslinker and other additives and then pumping it out discharge line 39 to blending equipment.

Suction line 40 carries water for mixing with the polysaccharide.

Figure 3:
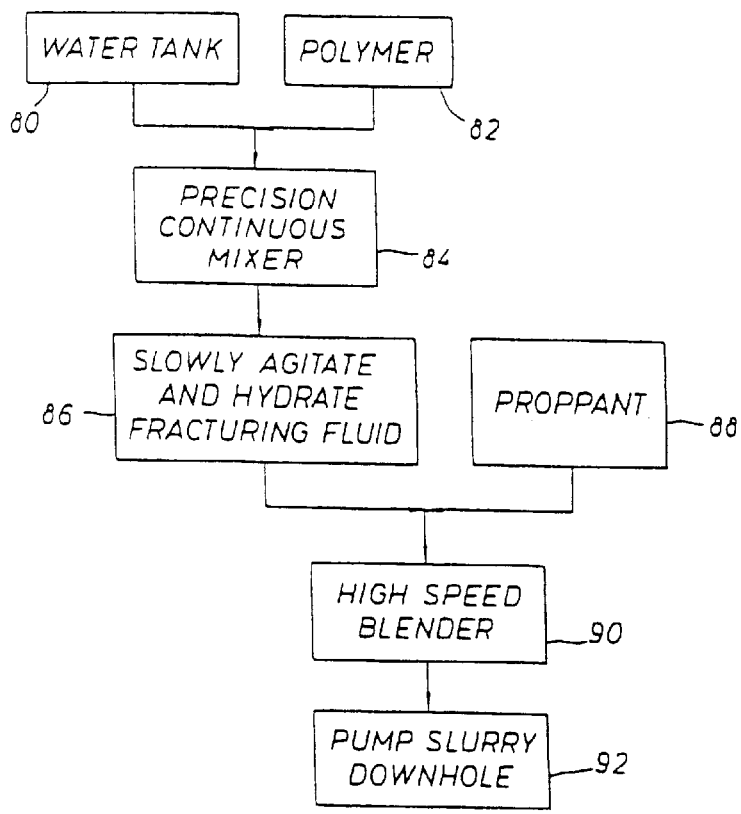
FIG. 3 is yet another schematic representation of the flow of material in above ground equipment and into the wellbore in the prior art.

In FIG. 3, the prior art methods of pumping polysaccharides hydratable are shown in which fluid from water tank 80 is mixed with polymer (or polysaccharide) 82 and pumped into precision continuous mixer 8. The next step is the relatively slow agitation and hydration of the mixture followed by addition of crosslinker and other additives to convert the polysaccharide slurry into a viscous fracturing fluid, followed by mixing with proppant 88. This resulting slurry is then transferred to the high speed blender 90 and pumped downhole at step 92.

Figure 4:
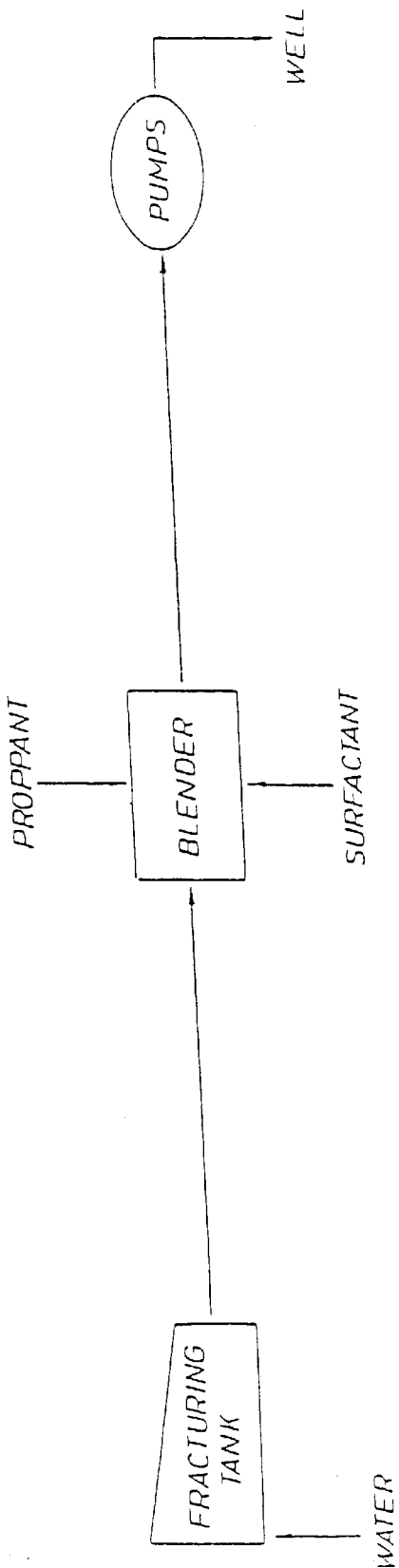
FIGS. 4 and 4A illustrate the flow of material that may be achieved using an embodiment of one invention of this application.
Figure 4A:
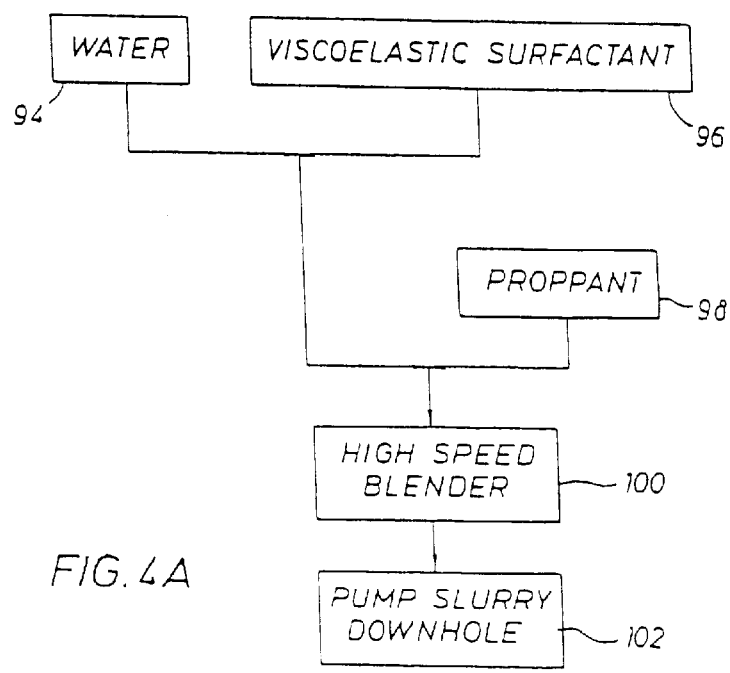

FIGS. 4 and 4A show the path of material using one of the inventions disclosed herein. In FIG. 4A, water 94 is mixed with viscosifying surfactant 96 and then mixed with proppant 98 where is proceeds into a blender 100 to be pumped downhole. This process may be accomplished, for example, using a concentrate of surfactant which can be taken to a wellsite and almost immediately hydrated and blended to go downhole, without the slow agitation and slow hydration used in some prior art methods. FIG. 4 shows an embodiment of the method of this invention wherein a mixer such as the PCM is not needed, but instead fracturing fluid is mixed with proppant and blended substantially at the same time that it is pumped downhole, without prolonged hydration times.

In FIG. 5, a micelle of surfactant is shown in a typical configuration with hydrophilic head portions 42 and hydrophobic tail portions 43. The hydrophilic portions, when in an aqueous (polar) environment, tend to form an outer layer, while the hydrophobic portions are directed inwards away from the aqueous environment. In the presence of sufficient amount of hydrocarbons, this viscosifying micellar structure, e.g., wormlike micelle, becomes unstable, reverting to a micellar structure that is not conducive to forming a viscous fluid, or to individual molecules as shown in the figure.

Figure 6:
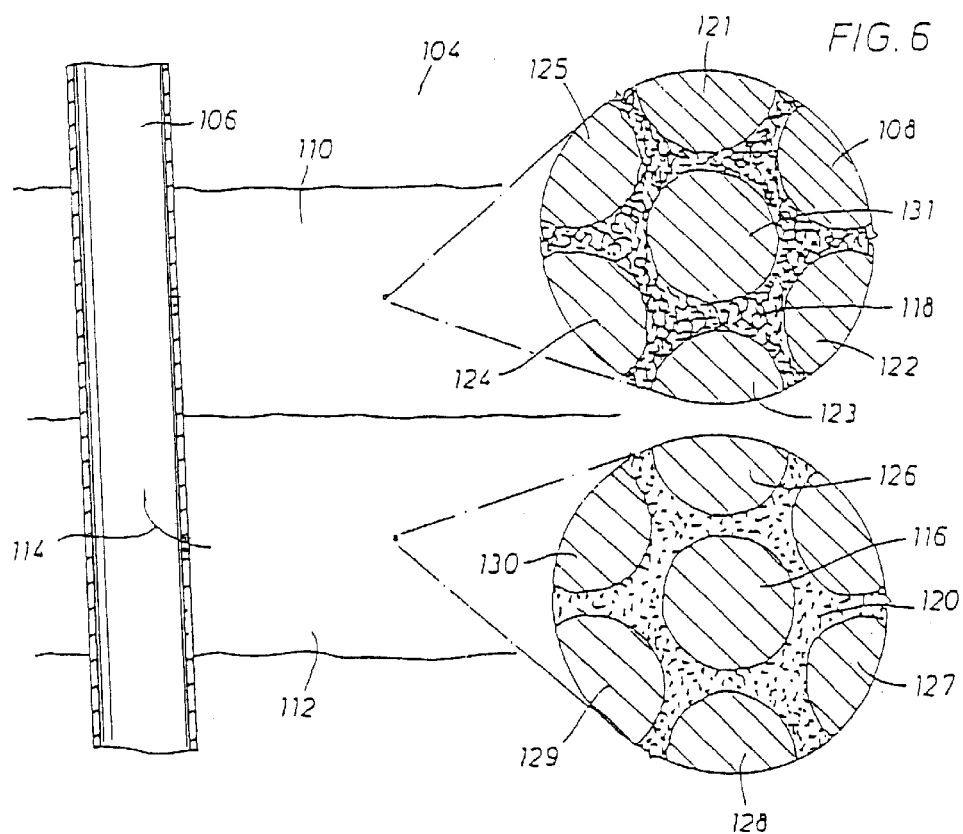
FIG. 6 demonstrates how viscosifying micelles exist in the water-bearing formation, and remain in viscosifying micellar form, e.g., wormlike micellar form, thereby inhibiting water flow from the aqueous zone, while the micelles themselves degrade into smaller components and facilitate production back into the wellbore of the fluids within the hydrocarbon bearing zone.

FIG. 6 depicts a fractured subterranean formation 104 comprising an aqueous zone 110 separating a hydrocarbon zone 112. Wellbore 106 receives hydrocarbons along direction arrow 114 from the hydrocarbon zone 112. A close-up examination of the pore structure is seen for both the aqueous zone (upper) and hydrocarbon zone (lower). Sand grains 121, 122, 123, 124, 125, 108, 131, 126, 116, 127, 128, 129, 130, are shown as deposited into the formation by the fracturing fluid. Viscosifying micelles, e.g., wormlike micelles, 118 are seen in the space between the sand grains in the aqueous zone as a network of micelles which impede formation or connate water flowback into the wellbore 106. The micelles within the hydrocarbon zone are dispersed into micellar subunits 120, as seen in the lower portion of FIG. 6.

Figure 7:
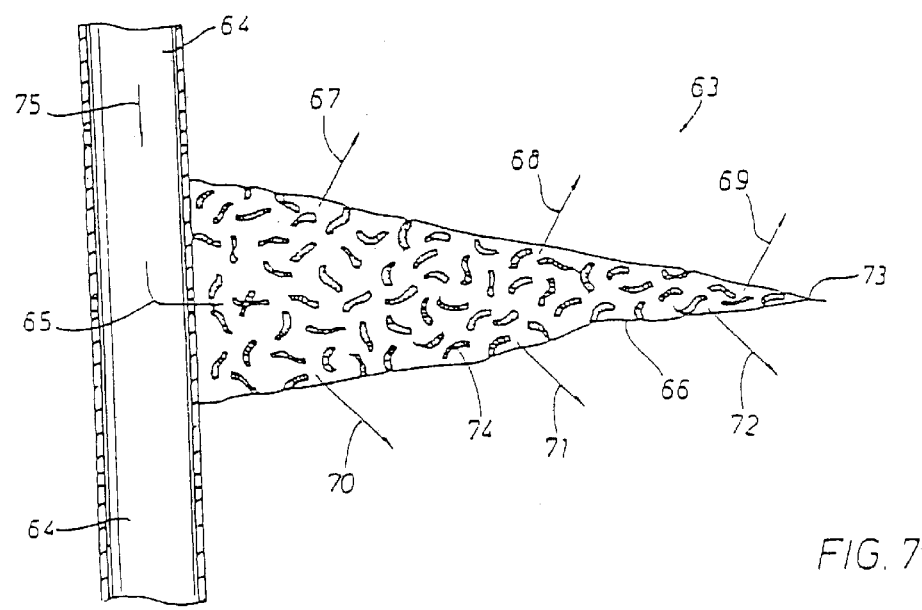
FIG. 7 illustrates how viscosifying micelles, e.g., worm-like micelles, are used to assist in preventing undesirable loss of the aqueous component of the fluid into the fracture face of a relatively low permeability formation.

In FIG. 7, an illustration of the benefit of micelles in controlling fluid loss is seen. Subterranean fracture 63 is shown growing outward from wellbore 64 which uses fracture fluid flow direction 75 to facilitate fracture fluid flow into the formation at 65. Fluid loss direction arrows 67–72 indicate the direction of fluid loss into the fracture face. In the case of viscoelastic surfactants, this has been found to occur by a mechanism that preserves and enhances the fracture volume.

DESCRIPTION OF THE PREFERRED EMBODIMENTS

The description and examples are presented solely for the purpose of illustrating the preferred embodiments of the invention and should not be construed as a limitation to the scope and applicability of the invention.

The invention(s) relate to novel fracturing methods useful in, among other things, increasing hydrocarbon production, limiting formation or connate water production, resisting acidizing and/or fracturing fluid loss into the subterranean formation, and reducing equipment requirements in mixing and pumping fracturing fluids.

The problem of excessive fluid loss has been known to detrimentally affect a well when a significant (greater than about 30%) portion of the aqueous fluid is lost into the fracture face, leaving behind the larger polymer molecules which do not diffuse into the pores of the rock. When the ratio of aqueous fluid to viscosifier is changed by such large fluid losses, problems in maintaining the integrity of the fluid occur. This is particularly a problem in relatively low permeability formations, in which large surface areas of rock fracture face are exposed to the fluid. In conventional guar based fluids, only water leaks off into the formation.

In relatively low permeability formations, e.g. less than about 10 millidarcies (hereafter "md"), where hydrocarbons are present, solid fluid-loss-control additives and fluid compositions usually show very little or no effect on fluid loss rate. Leakoff in such instances is controlled by the viscosity of the leakoff fluid. That viscosity is essentially the same as the viscosity of water for all polysaccharides because the polymer is filtered out at the surface of the rock face into which fluid loss is occurring.

It has been found that the leakoff rate of certain surfactant-containing fluids into similar rock is much lower than that of the polysaccharide-based fluids. While this invention and its claims are not bound by any particular mechanism of operation or theory, it appears that (a) the viscosifying micellar structure which provides fluid viscosity is sufficiently small so that it can move into the pore structure of the rock thereby maintaining the high viscosity of the leak off fluid and controlling total leakoff, or (b) the "equilibrium controlled" micelles break at the face of the rock producing the individual surfactant molecules which are too small to be filtered out on the rock face and therefore migrate into the pore structure of the rock where they are capable of reassembling into viscosifying micelles and decreasing fluid mobility (due to regained viscosity or due to the energy required to break the micelles before the fluid viscosity can decrease and the fluid migrates deeper into the rock structure).

The use of polysaccharide fluids for hydraulic fracturing is further limited by the physical processes that control cleanup after the hydraulic fracturing treatment in low to medium permeability formations. After a hydraulic fracturing treatment, the well is "turned around", that is, the piping used during the treatment is disconnected from the wellbore, new piping is put in place to allow production of the fracturing fluids and formation fluids back to the surface through a choke at a designed flow rate. This flow rate is set based on a number of criteria including consideration of proppant back production. The total flow rate at the surface depends on the rate of flow of fluids from the fracturing treatment out of the fracture and up the wellbore, plus the rate of migration of formation fluids (hydrocarbons and connate water) into the fracture and then into the wellbore. With time, the rate of production of formation fluids, including connate water, increases until it is equal to or very nearly equal to the flow rate at the surface. At this point in time, clean up of the fracture length essentially stops. Studies have shown that connate water production rate can be the limiting factor in determining guar recovery, effective fracture half length and well productivity.

The problem of excessive fluid loss has been known to detrimentally affect a well when a significant (greater than about 30%) portion of the aqueous fluid is lost into the fracture face, leaving behind the larger crosslinked polysaccharide molecules which do not diffuse into the pores of the rock. When the ratio of the aqueous fluid to viscosifier is changed by such large fluid losses, polysaccharide concentration increases by anywhere from 40 to 2000% forming pastes or rubbery semi-solids that are difficult to remove from the fracture. This limits well productivity and causes problems in maintaining the integrity of the fluid. This is particularly problematic in relatively low permeability formations, in which large surface areas of rock fracture face are exposed to the fluid. In conventional polysaccharide-based fluids, usually only water leaks off into the formation.

It has been shown by way of this invention that use of viscosifying surfactant-based fluids dramatically reduces the rate of production of connate water during the well turn-around period, thereby increasing effective fracture length and well productivity.

In high temperature formations, one may provide a hydraulic fracturing fluid wherein the selected viscosifying surfactant is erucyl methyl bis(2-hydroxyethyl) ammonium chloride. It is an object of this invention to provide a fracturing fluid with little or no residue following completion of the fracturing treatment.

The present invention comprises methods employing an aqueous viscous fracturing fluid. The fluid comprises water, a salt and at least one surfactant capable of forming viscosifying micelles in an aqueous environment. The fracturing fluid may optionally contain a gas such as air, nitrogen or carbon dioxide to provide a foam. Optionally, it may include a cosurfactant to increase viscosity or to minimize the formation of stable emulsions which contain components of crude oil or a polysaccharide or chemically modified polysaccharide, or an organic salt or alcohol, etc.

The viscosifying surfactants create fluids which have a low leakoff rate. Preferably, these fluids are insensitive to pressure. At high pressures, even as high as used during a fracturing operation, little fluid is lost to the formation. This reduces the total volume of fluid needed to provide the desired formation treatment, e.g., fracture, with associated cost savings. Further, since hydraulic fluid leakoff into the formation is minimized, longer fracture length extension is obtained using viscous fluids containing viscosifying micelles. At low pressures, these low molecular weight surfactant systems flow out of the formation more easily with better cleanup showing improved well productivity after fracturing.

Viscosifying surfactants are relatively small molecules. Each molecule is typically less than 500 grams per mole, which is less than 0.1% the size of the polymers used in some of the prior art hydraulic fracturing methods. These small molecules will associate under certain conditions to form viscosifying micelles, e.g., wormlike micelles, in an equilibrium state of breaking and reforming. As dynamic structures, the micellar structures are readily altered by shear pressure, the presence of hydrocarbons, or sometimes by increased temperature. All of these features may be found in the hydrocarbon portion of the reservoir. The viscosifying micelles rapidly assume a structure that is not conducive to creating viscosity and/or the surfactant molecules return to their original small independent state once they are placed into the hydrocarbon bearing zone, and are no longer required to provide viscosity which is required to transport particles into the formation.

To the contrary, the molecules pumped into the water-bearing zones of the formation advantageously remain behind in viscosifying micellar form while in an aqueous environment, and act to block or impede the flow of water from the formation, as seen in FIG. 6. The micelles of this invention are those which have a structure that contributes to the increased viscosity of the fluid, e.g., wormlike in shape, as opposed to other geometric shapes such as box-shaped or spherical. Wormlike micelles are circular or elliptical in cross-sectional area. Preferably, they are relatively long in comparison to their width, with an average aspect ratio of 100 or greater, in most cases.

Well treatment conditions allow viscosifying micelles to form under surface conditions and remain stable while they are pumped down the wellbore and through the perforations into a fracture, but then undergo a structural change or disband into individual components on exposure to hydrocarbons in the reservoir rock. Cleanup is often superior to that of the polymer systems, typically higher than 40%.

In addition to the viscosifying surfactant, the aqueous treating fluid, e.g., fracturing fluid, in accordance with the invention requires a sufficient quantity of at least one water-soluble salt to effect formation stability. Typically, water-soluble potassium and ammonium salts, such as potassium chloride, tetramethyl ammonium chloride and ammonium chloride, are employed. Additionally, calcium chloride, calcium bromide, magnesium chloride and zinc halide salts may also be used. Other useful salts include aluminum salts, zirconium salts and the like. Formation stability and in particular clay stability is achieved at a concentration level of a few tenths of a percent to a few percent by weight, for example, tetramethyl ammonium chloride can be used at about 0.2 to about 0.5 percent by weight, and as such, the density of the fluid usually is not significantly altered by the presence of the salt. However, if fluid density becomes an important consideration, heavier salts may be employed.

Acidizing

In another aspect of the present invention, there is provided a treatment fluid and a method to enhance the effectiveness of acidizing treatments, for example acid fracturing and matrix acidizing.

In acid fracturing, it is desirable to pump sequential stages of viscous fluids and of acids. In theory, the acid fingers into the viscous fluid. These acid fingers etch away the carbonate formation only where the formation is exposed to an acid finger. This creates a fractal type etching pattern on the rock (calcium carbonate) faces. This etched area creates flow channels for the reservoir fluids once the fracturing operation is ceased. For this process to work, a mobility ratio of at least 1000 is required between the viscous fluid and the acid fluid. For guar based fluid, this requires a high guar loading and crosslinking (typically with boron or zirconium) to provide the desired mobility ratio. Crosslinked polymer fluids are very similar to those used in hydraulic fracturing and suffer the same limitations as described above. In addition, the guar-based or polymer fluids simply do not work as effectively as desired. Recent laboratory results demonstrate that viscosifying surfactant derived fluids provide superior finger generation in acid fracturing applications than conventional fluids.

Acids are widely used to stimulate oil production from chalk reservoirs. In fracture acidizing, a fracture, or rather several fractures, are first created by injecting a fracturing liquid under high pressure. After the fractures have been created, acid is injected to etch flow channels that can persist after the fractures have closed thereby increasing the productivity of the well. During some acid treatments, the acids are injected subsequent to a preflush of viscous fluid. This leads to the generation of acid fingers in the more viscous preflush and prevents the formation of near well cavities. Studies have shown that the dissolution rate increases with increasing flow rate and increasing temperature.

Fingered acid-fracturing of vertical wells has been well studied and there are methods for analyzing fingering patterns in linear flow through fractures from vertical wells. The literature indicates that viscous fingering is a function of the mobility ratio between the fluids. Thus) fluids which provide similar viscosity should perform in a similar manner. This has not been observed, however. Borate fluids tend to be too sensitive to pH to be used reliably. This is especially true at about 150–200° F. Borate fluids at initial pH of about 9 do not provide adequate fingering downhole. Zirconate fluids can be effective at high guar loadings but are difficult to remove. Under those conditions, surfactant-based fluids offer superior performance and well clean-up.

The effectiveness of matrix acidizing treatments is often dictated by the ability to divert the acid into the areas where it can be most beneficial in opening up pore structures to the production of hydrocarbons. In many cases, acid will increase permeability in a small region. This makes it easier for sequential quantities of acid to follow this same higher permeability "path of least resistance". A number of techniques have been developed to divert acid away from higher permeability zones. These include foams, particulates or other additives designed to temporarily plug off areas most susceptible to fluid movement. These approaches are limited by the fact that they are indirect. What is truly needed is a means to divert acid away from water zones and into zones capable of producing hydrocarbons so that the permeability of the hydrocarbon zone can be increased preferentially over the permeability of the water zones.

A conventional acidizing treatment for a sandstone formation normally will involve sequentially injecting three fluids—a preflush, a hydrofluoric acid-hydrochloric acid mixture, and an afterflush. For a carbonate formation, a conventional acidizing treatment normally will involve sequential injection of at least two fluids—an acid (usually hydrochloric acid) and an after flush. A preflush may also be included.

Pursuant to the present invention, a step is added prior to the injection of the acid or prior to performing the acidizing method. The additional step is a step for selectively blocking the pore structure in water zones to selectively retard migration of acid into water zones and allow migration into oil or gas zones. For this purpose, an aqueous viscosifying surfactant system could be pumped into the formation. This fluid would have a viscosity in excess of 10 cp, and preferably at least 35 cp, e.g., from about 35 cp to about 500 cp, and more preferably at least 50 cp, at 100 sec$^{-1}$ and bottom hole temperature. Since it is a water-based fluid, the mobility of the viscosifying surfactant into the pores of the water-bearing zone will be greater than the mobility of the viscosifying surfactant into the oil or gas zone. In addition, the viscosifying surfactant system retains its viscosity on exposure to formation water but loses its viscosity on exposure to hydrocarbons. As a result, a plug of viscous fluid is placed selectively in the pore structure of water-bearing zones at the formation face while in contact with formation water, but not in the pore structure of the hydrocarbon zones at the formation face. When acid is subsequently introduced into the formation, the acid will go preferentially into the hydrocarbon zone because movement into the water-bearing zone is selectively blocked by the high viscosity plug. The viscosifying surfactants useful in the present invention are those selected from the group consisting of cationic, zwitterionic (including amphoteric), nonionic and combination of zwitterionic or nonionic with cationic.

In cases where there is a water-bearing zone which is substantially, but not completely, free, of hydrocarbon residues, it may be advantageous to pump a sequence of fluids. The initial fluid would include a solvent capable of dissolving both water and crude oil, i.e., a mutual solvent. Such solvents include esters such as butyl acetate, ethyl acetate and the like; ethers such as tetrahydrofuran and low molecular weight glycol ethers, e.g., EGMBE; low molecular weight alcohols such as methanol, ethanol, propanol, isopropyl alcohol and the like; and similar materials. This could optionally be followed by a brine spacer fluid. The next fluid would be the viscosifying surfactant, which is followed finally by the acid. These stages could be repeated as necessary during the treatment.

Productivity restrictions caused by oil wetting of formation and fines often can be removed by making the solids water wet. This may be done with surface-active materials provided they contact the solid surface and replace the agent making the surface oil wet. Unfortunately, most surface-active materials alone cannot cause the oil wetting agent to be desorbed. Some chemicals (such as the low molecular weight glycol ethers) can strip the oil wetting surfactant from the surface and leave it water wet. Ethylene glycol monobutyl ether (EGMBE) is often preferred for this application. When used at a concentration of 10 percent by volume in the afterflush, this material is most effective. Low molecular weight alcohols are sometimes used for this purpose, although they appear less effective than the glycol ethers. However, compatibility tests should be performed with acid, formation fluids, and formation solids to assure damage will not occur.

In the matrix acidizing of sandstone formations, the preflush is usually hydrochloric acid, ranging in concentration from 5 to 15 percent and containing a corrosion inhibitor and other additives as required. The preflush displaces water from the wellbore and formation, i.e., connate, water from the near-wellbore region, thereby minimizing direct contact between sodium and potassium ions in the formation brine and fluosilicate reaction products. Normally, this will eliminate redamaging the formation by precipitation of insoluble sodium or potassium fluosilicates. The acid also reacts with calcite (calcium carbonate) or other calcarious material in the formation, thereby reducing, or eliminating, reaction between the hydrofluoric acid and calcite. The preflush avoids waste of the more expensive hydrofluoric acid and prevents the formation of calcium fluoride, which can precipitate from a spent HF-HCl mixture.

The HF-HCl mixture (usually 3-percent HF and 12-percent HCl) then is injected. The HF reacts with clays, sand, drilling mud or cement filtrate to improve permeability near the wellbore. The HCl essentially will not react and is mainly present to keep the pH low, preventing precipitation of HF reaction products. Because the depth of permeability alteration is severely limited in HF-HCl treatments, a way to extend the action of acid deeper into the formation is to generate the HF acid in situ by injecting methyl formate and ammonium fluoride. Methyl formate hydrolyzes in the presence of formation water to produce formic acid, which then reacts with ammonium fluoride to yield hydrogen fluoride.

An afterflush is required to isolate the reacted HF from brine that may be used to flush the tubing and to restore water wettability to the formation and the insoluble-acid reaction products. Normally, in hydrocarbon producing wells, one of two types of afterflush is used: (1) for oil wells, either a hydrocarbon afterflush, such as diesel oil, or 15-percent HCl is used; and (2) for gas wells, either acid or a gas (such as nitrogen or natural gas) is used. With a liquid after flush, chemicals usually are added to aid in removing treating fluids from the formation, restoring water wettability to formation solids and precipitated acid reaction products, and prevention of emulsion formation. A glycol ether mutual solvent has been shown to be useful for this purpose. When a gas is used as an afterflush, cleanup additives are added to the HF-HCl stage of the treatment.

In an effort to remove damage completely, whether originally present or induced by the acid, one may decide to try a larger acid volume. Aside from the additional cost, there is a physical limitation on the quantity of acid the formation can tolerate without becoming unconsolidated. Recall that the acid is dissolving the cementing material; therefore, as acid is injected, the formation progressively becomes weaker until it finally disintegrates.

If simulated overburden stresses are imposed on a core during acidation, a point is soon reached where the compressive strength of the core is inadequate to support the load and the core recompacts to a lower porosity and permeability. The progressive improvement is permeability with acid throughout reverses once sufficient acid has been injected to remove consolidating material from the sand.

In a carbonate matrix acidizing treatment, the acid used (usually hydrochloric acid) is injected at a pressure (and rate) low enough to prevent formation fracturing. Again, the goal of the treatment is to create dominant wormholes which penetrate through the near wellbore damaged area The treatment usually involves acid injection followed by a sufficient afterflush of water or hydrocarbon to clear all acid from well tubular goods. A corrosion inhibitor is added to the acid to protect wellbore tubulars. Other additives, such as antisludge agents, iron chelating agents, de-emulsifiers, and mutual solvents, are added as required for a specific formation.

When acid is pumped into a carbonate (limestone or dolomite) formation at pressures below the fracture pressure, the acid flows preferentially into the highest permeability regions (that is, largest pores, vugs or natural fractures). Acid reaction in the high-permeability region causes the formation of large, highly conductive flow channels called wormholes. The creation of wormholes is related to the rate of chemical reaction of the acid with the rock. High reaction rates, as observed between all concentrations of HCl and carbonates, tend to favor wormhole formation. Acids normally used in field treatments are highly reactive at reservoir conditions and tend to form a limited number of wormholes. A low reaction rate favors the formation of several small-diameter wormholes.

The productivity increase that can result from a matrix acid treatment in carbonate normally is limited to bypassing the damage zone, retarding the acid by forming an emulsion of the acid or in other ways increasing the effective viscosity of the acidic fluid in order to achieve deeper acid penetration. The maximum stimulation expected from a matrix treatment will be about 1.5-fold above damage removal. The exact stimulation ratio from matrix acidizing of a carbonate cannot be predicted because the number and location of wormholes cannot be predicted.

Because wormhole length normally is a function of injection rate and acid reaction rate, comparable stimulation ratios can be achieved by adjusting the injection rate when using different acids, for example, organic acids, hydrochloric acid, acid mixtures and chemically retarded acids. A viscous, emulsified acid is preferred because it allows some control over the rate at which acid reacts with the formation rock. In low-permeability formations, however, it often is not feasible to use these acids because of their low injectivity. In these formations, 28-percent HCl normally is preferred. If hydrochloric acid cannot be effectively inhibited to limit corrosion at formation temperature, formic acid is preferred, although acetic acid could be used.

The following are some of the known methods of acidizing hydrocarbon bearing formations which can be used as part of the present method: U.S. Pat. Nos. 3,215,199 to R. E. Dilgren; U.S. Pat. No. 3,297,090 to R. E. Dilgren; U.S. Pat. No. 3,307,630 to R.E. Dilgren et al.; U.S. Pat. No. 2,863,832 to R. L. Perrine; U.S. Pat. No. 2,910,436 to I. Fatt et al.; U.S. Pat. No. 3,251,415 to C. C. Bombardieri; U.S. Pat. No. 3,441,085 to J. L. Gidley, and U.S. Pat. No. 3,451,818 to J. L. Gidley et al., which are hereby incorporated by reference. These methods are modified to incorporate the separate step for selectively blocking the pore structure in water zones prior to the acidizing step thereof, whether matrix acidizing or fracture acidizing.

Hydraulic Fracturing

In hydraulic fracturing applications, a sufficient quantity of at least one surfactant/thickener soluble in said aqueous salt solution is employed in the method of this invention to provide sufficient viscosity to suspend proppant during placement and/or to limit formation water production during turn around after hydraulic fracture operations, wherein the thickener is at least viscosifying surfactant.

The viscosifying surfactants useful in the compositions and methods of the present invention are selected from the group consisting of non-ionic, anionic, cationic, zwitterionic and combinations thereof. Specific examples of the types of surfactant or surfactant combinations which are useful in the present invention are those which form viscosifying micelles in an aqueous environment and are selected from the following. Unless otherwise specified under the respective combination surfactant systems, reference is to be made to the surfactant descriptions under the respective surfactant type.

A. Anionic Surfactants

The preferred anionic surfactants have structure:

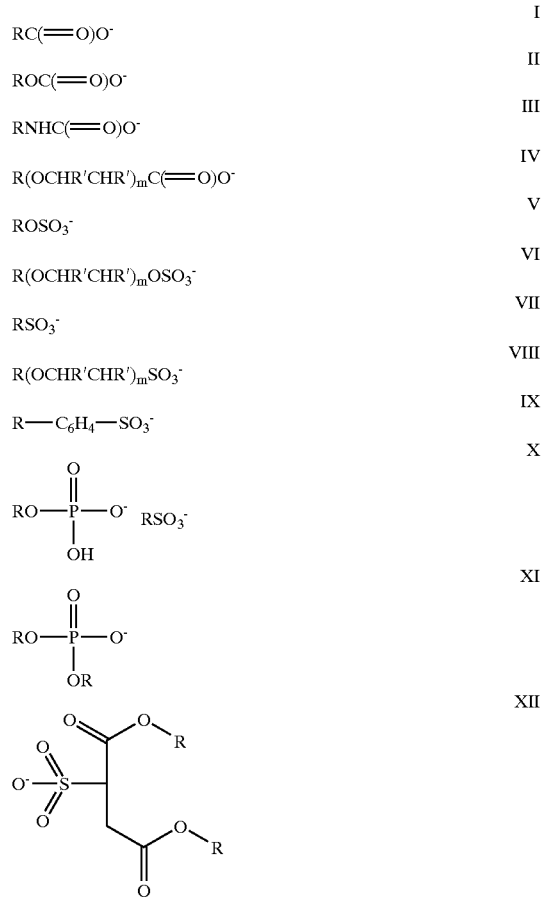

wherein R represents alkyl, alkenyl, arylalkyl, and hydroxyalkyl wherein each of said alkyl groups contain from about 8 to about 24 carbon atoms, more preferably at least 16 carbon atoms, and may be branched or straight chained and saturated or unsaturated, and wherein said the branch alkyl groups have from about 1 to about 6 carbon atoms. Representative of alkyl group for R include decyl, dodecy, tetradecyl (myristyl), hexadecyl (cetyl), octadecyl (oleyl), stearyl erucyl, and the derivatives of coco, tallow, soys, and rapeseed oils. The number of alkylene oxide groups, m, ranges from 0 to about 35, more preferably less than 10.

In accordance with the presently preferred embodiment of this invention, the anionic surfactant is employed as the sodium, potassium, or ammonium salt. Examples of such anionic surfactants include lignosulfonates, alkylbenzene sulfonates, petroleum sulfonates, naphthalene sulfonates, olefin sulfonates, alkyl sulfates, sulfated natural fats and oils, sulfated fatty acids, particularly sulfated oleic acid, sulfated alkanolamides, sulfated esters, sulfated alkyl phenols, sulfated alcohols, 2-sulfoethy esters of fatty acids, monalkylsulfosuccinates, dialkyl sulfosuccinates, polyethoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, and ethoxylated phosphate esters.

The preferred pH for anionic surfactants with carboxylate or sulfate head group is above 5 and even more preferred is above 7 and the most preferred is above 9. When Anionic surfactants having carboxyl or sulfate groups are used with salts containing magnesium, calcium or zinc, a chelating agent effective for chelating multivalent inorganic cations may be added.

The concentration of anionic surfactant and salt required to achieve the desired viscosity at a temperature of at least 130° F., at least 150° F., at least 175° F., or at least 200° F. depends on the structure of the surfactants. For surfactants having from about 10 to 16 carbon atoms, the concentration of surfactant preferably ranges from about 3% to about 30%, more preferably from about 10 to about 30% and even more preferred from about 15 to about 30%, and the brine concentration preferably ranges from about 2 to about 15%, more preferably from about 5 to about 15% and most preferably from about 10 to about 15%. For surfactants with hydrocarbon chain having from 18 to about 30 carbon atoms, the concentration of surfactant preferably ranges from about 0.5% to about 15%, more preferably from about 0.5% to about 10% and most preferably from about 0.5% to about 6%, and the brine concentration preferably ranges from 0 to about 10% and more preferably from 0 to about 6%.

B. Cationic Surfactants:

The preferred cationic surfactants have the structure:

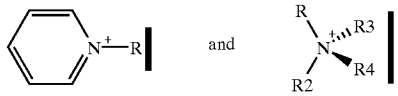

wherein R has been defined previously. and where $R_2$, $R_3$ and $R_4$ are independently a hydrogen or an aliphatic chain preferably from 1 to about 30 carbon atoms, more preferably from 1 to about 10 carbon atoms and most preferably from 1 to about 6 carbon atoms in which the aliphatic group can be branched or straight chained, saturated or unsaturated. Representative chains are methyl, ethyl, benzyl, hydroxyethyl, and hydroxypropyl.

Examples of such cationic surfactants include: salts of the amine corresponding to the formula

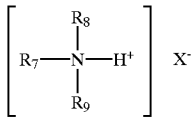

wherein $R_7$, $R_8$ and $R_9$ are the same as defined hereinbefore for $R_1$, $R_2$, and $R_3$, respectively, and $X^-$ is an inorganic anion, and;

a quaternary ammonium salt of the amine corresponding to the formula

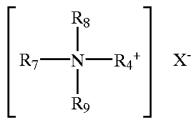

wherein $R_7$, $R_8$, $R_9$ and $X^-$ are the same as defined hereinbefore and $R_4$ independently constitutes a group which has previously been set forth for $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine.

A preferred cationic surfactant is erucyl bis(2-hydroxyethyl) methyl ammonium chloride. Alternative cationic surfactants may be employed either alone or in combination in accordance with the invention, including erucyl trimethyl ammonium chloride; N-methyl-N,N-bis(2-hydroxyethyl)rapeseed ammonium chloride; oleyl methyl bis(hydroxyethyl)ammonium chloride; octadecyl methyl bis (hydroxyethyl)ammonium bromide; octadecyl tris (hydroxyethyl)ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris (hydroxyethyl) ammonium bromide; hexadecyl ethyl bis (hydroxyethyl)ammonium chloride; hexadecyl isopropyl bis (hydroxyethyl)ammonium iodide cetylamino, N-octadecyl, pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

The surfactants are used in the concentration range which can provide the described viscosity under different shear rate to transport proppant at temperature above 130 degrees F. The concentration of surfactants with 12 to 16 carbon atoms as the hydrophobic group can range from about 0.5% to about 15% by weight of the fluid, more preferably from about 4% to about 15% and most preferably from about 5% to about 10%. The brine concentration can range from about 0.5% to about % 25%, more preferably from about 3% to about 25% and even more preferably from about 5% to about 25%. The concentration of surfactants with 18 to 24 carbon atoms as the hydrophobic group ranges from about 0.2% to about 10% by weight of the fluid, more preferably from 0.5% about to about 6% and most preferably from about 0.5% to about 5%. The brine concentration can range from 0 to about 10%, more preferably from about 1% to about 7% and even more preferably from about 1% to about 5%.

The fluid also can comprise of one or more member from organic acid and/or salt thereof, and/or inorganic salts. Typical concentration for these groups of additives is from zero percent to about 20% by weight, more typically from zero percent to about 10 by weight and even more typical from zero percent to about 5% by weight.

C. Nonionic Surfactants

The preferred polymeric surfactants have the structure:

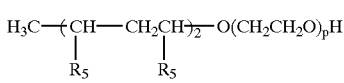

where $R_5$ is hydrogen or a hydrocarbon chain containing from about 1 to about 5 carbon atoms and may be branched or straight chained and saturated or unsaturated; n and p can be from 1 to 30, preferably from 5 to 30, more preferably from 15 to 30.

Another example of polymeric surfactant include structure:

wherein n, p, and k represent the number of the repeating units and could be from above 5 to about 150.

The concentration of such polymeric surfactants preferably ranges from about 0.5% to about 40%, more preferably from about 2% to about 30% and most preferably from about 5% to about 25%. Brine concentration ranges from zero to about 10%.

Other preferred nonionic surfactants have the structure:

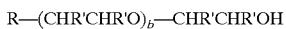

where R has been defined before and b can be 1 to about 40. R' is hydrogen or a hydrocarbon chain or group of less than about 7 carbon atoms. Examples include ethylene oxide derivatives of octanol and longer chain aliphatic alcohols, propylene oxide derivatives of octanol and longer chain aliphatic alcohols, and mixed oxide derivatives of longer chain aliphatic alcohols, and

where R, $R_2$ and $R_3$ have been defined previously.

The preferred concentration ranges from 0.5% to 30% and even more preferred a concentration is from 1% to 30% and the most preferred concentration is from 1% to 20%. The brine concentration can be zero to 10%.

Other suitable nonionic surfactants include amines corresponding to the formula

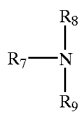

wherein $R_7$ is at least about a $C_{16}$ aliphatic group which may be branched or straight chained and which may be saturated or unsaturated, $R_8$ and $R_9$ are each independently, hydrogen or a $C_1$ to about $C_6$ aliphatic group which can be branched or straight chained, saturated or unsaturated and which may be substituted with a group that renders the $R_8$ and/or $R_9$ group more hydrophilic.

Examples of such amines include:
bis(hydroxyethyl) soya amine; N-methyl, N-hydroxyethyl tallow amine; bis(hydroxyethyl) octadecyl amine; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; and N-hydroxyethyl cosyl amine;

D. Zwitterionic Surfactant System

The preferred zwitterionic surfactants have structure:

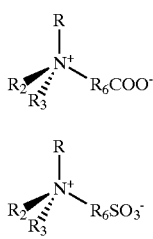

III. BET wherein R, $R_2$ and $R_3$ have been defined previously and wherein R further includes alkylaminoalkyl and alkylamidoalkyl groups. $R_6$ is alkylene or hydroxyalkylene group with chain is length from zero to about 6, preferably from 1 to 3.

Zwitterionic surfactants with hydrophobic chain of 10 to 16 carbons are preferably used with a co-viscosifying surfactant of a different type with a ratio of at least from 10:1 to 2:1 (zwitterionic to other surfactant).

The concentration for zwitterionic surfactants with a hydrophobic chain having from about 18 to about 24 carbons ranges from about 0.5% to about 15% and more preferably from about 1% to about 10% and most preferably from about 2% to about 10%. The brine concentration preferably ranges from about zero to about 20% and more preferably from about 5% to about 20%.

E. Zwitterionic and Cationic Surfactant System

The zwitterionic and cationic surfactants are as identified above.

For zwitterionic surfactant with hydrocarbon chain from 10 to 16 carbons, the preferred concentration is from 0.5% to 20%, more preferred from 5% to 20% and most preferred from 8% to 20%. For the cationic surfactants with 6 to 10 carbon hydrocarbon chain, the preferred cationic surfactant concentration is from 1% to 10% and even more preferred from 3% to 10%. For the cationic surfactants with 18 to 24 carbon hydrocarbon chain, the preferred concentration is from 0.1% to 8% and even more preferred concentration is from 0.1% to 4%. The preferred brine concentration can be from zero to 15% and more preferred from zero to 5%.

For zwitterionic surfactant with hydrocarbon chain from 18 to 30 carbons, the preferred concentration is from 0.5% to 15%, more preferred from 0.5% to 10% and most preferred from 0.5% to 6%. For the cationic surfactants with 6 to 16 carbon hydrocarbon chain, the preferred cationic surfactant concentration is from 0.5% to 10% and even more preferred from 3% to 6%. For the cationic surfactants with 18 to 24 carbon hydrocarbon chain, the preferred concentration is from 0.1% to 8% and even more preferred concentration is from 0.1% to 4%. The preferred brine concentration can be from zero to 15% and more preferred from zero to 5%.

F. Zwitterionic and Nonionic Surfactant System

In this system, the preferred nonionic surfactants have the structure:

wherein a is greater than about 5 and b is less than about 5 and can be zero. R' is hydrogen or a hydrocarbon chain or group having less than about 7 carbon atoms. Examples include octanol and longer chain aliphatic alcohols, ethylene oxide derivatives of octanol and longer chain aliphatic alcohols, propylene oxide derivatives of octanol and longer chain aliphatic alcohols, mixed oxide derivatives of octanol and longer chain aliphatic alcohols. Mixtures of alcohols, mixtures of hydroxy ethers and mixtures of these two systems can be used. When mixtures are used, one or more component can consist of or be derived from alcohols having a hydrocarbon chain having less carbon atoms than octanol.

For zwitterionic surfactant with hydrocarbon chain from 10 to 16 carbons, the preferred concentration is from 0.5% to 20%, more preferred from 5% to 20% and most preferred from 8% to 20%. For the nonionic surfactants with "a" less than 16, the preferred nonionic surfactant concentration is from 0.1% to 10% and even more preferred from 3% to 10%. For the nonionic surfactants with "a" between 16 to 24, the preferred concentration is from 0.1% to 8% and even more preferred concentration is from 0.1% to 4%. The preferred brine concentration can be from zero to 15% and more preferred from zero to 5%.

For zwitterionic surfactant with hydrocarbon chain from 18 to 30 carbons, the preferred concentration is from 0.5% to 15%, more preferred from 0.5% to 10% and most preferred from 0.5% to 6%. For the anionic surfactants with "a" less than 16, the preferred nonionic surfactant concentration is from 0.1% to 8% and even more preferred from 0.1% to 5%. For the anionic surfactants with "a" between 16 to 24, the preferred concentration is from 0.1% to 5%. The preferred brine concentration can be from zero to 15% and more preferred from zero to 5%.

G. Cationic and Anionic Surfactant Systems

For the cationic surfactants with 12 to 16 carbon hydrocarbon chain, the preferred concentration is from 1% to 20% and more preferred concentration is from 3% to 20% and the most preferred concentration is from 3% to 15%. Preferred anionic surfactants are anionic surfactants with 6 to 10 carbon hydrocarbon chain and the preferred concentration is from 0.1 to 5%, even more preferred from 0.1 to 3%. The preferred number of alkylene oxide group in anionic surfactants is from zero to 10, more preferred from 2 to 5.

For the cationic surfactants with 18 to 24 carbon hydrocarbon chain, the preferred concentration is from 0.5% to 10% and more preferred concentration is from 1% to 8% and the most preferred concentration is from 1% to 5%. Preferred anionic surfactants are anionic surfactants with 10 to 16 carbon hydrocarbon chain and the preferred concentration is from 0.1 to 5%, even more preferred from 0.1 to 3%. The preferred number of alkylene oxide group in anionic surfactants is from zero to 10, more preferred from 2 to 5.

H. Zwitterionic and Anionic Surfactant System

For zwitterionic surfactant with hydrocarbon chain from 10 to 16 carbons, the preferred concentration is from 0.5% to 20%, more preferred from 5% to 20% and most preferred from 8% a to 20%. For the anionic surfactants with 10 to 16 carbon hydrocarbon chain, the preferred anionic surfactant concentration is from 0.1% to 10% and even more preferred from 3% to 10%. For the anionic surfactants with 16 to 24 carbons hydrocarbon chain, the preferred concentration is from 0.1% to 8% and even more preferred concentration is from 0.1d/o to 4%.

For zwitterionic surfactant with hydrocarbon chain from 18 to 30 carbons, the preferred concentration is from 0.5% to 15%, more preferred from 0.5% to 10% and most preferred from 0.5% to 6%. For the anionic surfactants with 10 to 16 carbon hydrocarbon chain, the preferred anionic surfactant concentration is from 0.1% to 8% and even more preferred from 0.1% to 5%. For the anionic surfactants with 16 to 24 carbons hydrocarbon chain, the preferred concentration is from 0.1% to 5%.

I. Non-ionic and Anionic Surfactant System

The preferred nonionic surfactants have the structure:

$$CH_3-(CH_2)_a-(CHR'CHR'O)_b-CHR'CHR'OH$$

where "a" is greater than about 5 and "b" is less than about 5 and can be zero. R' is hydrogen or a hydrocarbon chain or group of less than about 7 atoms. Examples include octanol and longer chain aliphatic alcohols, ethylene oxide derivatives of octanol and longer chain aliphatic alcohols, propylene oxide derivatives of octagonal an longer chain aliphatic alcohols, mixed oxide derivatives of octanol and longer chain aliphatic alcohols. Mixtures of alcohols, mixtures of hydroxy ethers and mixtures of these two systems can be used. When mixtures are used, one or more components can consist of or be derived from shorter chain alcohols than octanol, or

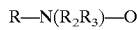

$$R-N(R_2R_3)-O$$

where R, R2 and R3 have been defined previously.

The preferred anionic surfactants consist of aliphatic carboxylic acids (I), carbonic acids (II), carbamic acids (III), carboxylic acid alkylene oxide derivatives (IV), aliphatic sulfate (V), aliphatic sulfate alkylene oxide derivatives (VI), aliphatic sulfonate (VII), and aliphatic sulfonate alkylene oxide derivatives (VIII) wherein the aliphatic chain consists of at least about 7 carbon atoms. The preferred anioin surfactants listed above, besides carbonic acids and carbamic acids, can be derived from natural occuring fatty acids and are commercially available. Carbonic acids and carbamic acids, for example, can be derived from the reaction of phosgene with aliphatic alcohol or aliphatic amine, respectively. The more preferred systems will contain a hydrolizable linkage such as the alkylene oxide, carbonic acid or carbamic acid group. This allows hydrolysis of these linkages and loss of surfactant properties over time and facilitates clean up, for example after hydraulic fracturing operations.

For anionic surfactants with 10 to 16 hydrocarbon, preferred concentration is from 1% to 20%, more preferred concentration is from 5% to 20% and most preferred is from 8% to 15%. The nonionic surfactant concentration can be from 20 to 1%, more preferred from 20% to 5% and most preferred from 15% to 5%. Brine concentration can be from zero to 10% and more preferred from zero to 5%.

For anionic surfactants with 18 to 24 hydrocarbon, preferred concentration is from 0.5% to 15%, more preferred concentration is from 1% to 10% and most preferred is from 1% to 8%. The nonionic surfactant concentration can be from 20 to 1%, more preferred from 20% to 5% and most preferred from 15% to 5%. Brine concentration can be from zero to 10% and more preferred from zero to 5%.

The thickening agent employed in the invention comprises at least one of the thickening agents (i.e., viscosifying surfactants) set forth herein. It has been found that with certain solutions, a mixture of two or more thickeners may be preferred.

A sufficient quantity of a water soluble organic salt and/or alcohol may optionally be employed to provide desired viscosity under severe conditions. Preferably, the organic salt is a water soluble carboxylate salt such as sodium or potassium salicylate or the like. However, this salt is not required in all cases.

In instances where the thickening agent is an amine acid salt or a quaternary ammonium salt, the associated anion should be an inorganic anion. Preferably, X⁻ is an inorganic anion such as a sulfate, nitrate, perchlorate or halide. A halide (Cl, Br or I) is preferred, Cl and Br being most preferred.

The optional organic salt constituent of the fracturing or treatment fluid, when employed, is preferably a water soluble compound involving typically a sodium or potassium salt of an organic anion. The anion may be an aromatic organic anion such as a salicylate, naphthalene sulfonate, p- and m-chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5, 6-trichloropicolinate, 4-amino-3,5,6-trichloropicolinate, 2,4,-dichlorophenoxyacetate, toluene sulfonate, a,β-napthols, p.p'bisphenol A or cocoamidopropyl dimethyl amine oxide. The thickening agent should be chosen such that the anion is compatible with the electrolyte present in the aqueous solution such that undesirable precipitates are not formed. Also the specific anion chosen will depend to some degree on the specific amine structure. In some applications, only organic salts may be present. While not wishing to be bound to any particular theory, some anionic species are required when quaternary ammonium salts are used to form viscosifying micelles, e.g., worm-like micelles. The salt helps to neutralize the repulsive forces exhibited when two cationic species approach each other. Organic salts and inorganic salts do this in different ways. The inorganic salts tend to neutralize the charge by associating with the cationic surfactant on the outer surface of the worm-like micelle. The organic anions that are most effective tend to be incorporated as part of the micelle structure with hydrophobic portion of the organic anion lying inside worm-like micelle. Thus, the two species work differently and yield different properties. The choice of when to use either organic, inorganic or a mixture thereof depends on the properties desired. Organic anions tend to be required for higher temperature applications, for example, above about 175☐F.

The thickening agent, that is, the viscosifying surfactant, is employed in an amount which in combination with the other ingredients is sufficient to increase the viscosity of the aqueous fluid enough to maintain proppant in suspension during fluid placement. The exact quantity and specific thickener or mixture of thickeners to be employed will vary depending on the concentration of and selection of specific soluble salt(s) employed to make up the solution, the viscosity desired, the temperature of use, the pH of the solution, and other similar factors.

The concentration of the surfactant thickener can range from about 0.05 to about 6 percent by weight of the fluid. Laboratory procedures are employed to determine the optimum concentrations for, any particular set of parameters. For example, when a non-protonated amine is employed as the thickener, the pH of the aqueous fluid can change to some degree the effectiveness of particular amines. More acidic solutions are required for some amines to be completely dissolved. It is possible that this fact results because the amine must become protonated before it will become effectively dissolved in the fluid.

Thickeners are selected from a group of surfactant materials capable of forming the viscosifying micelles as opposed to typical surfactant materials which tend to form spherical micelles or sheet-like structures. Further, in order to be useful in the present invention, the selected surfactant must be able to form the viscosifying micelles over a broad range of concentrations, such as specified in the preceding discussion relative to the Verious Surfactants, along or in combination. The number of surfactant materials that can be successfully used in the invention decreases with increasing temperature.

To prepare the aqueous hydraulic fracturing fluid or treatment fluid in accordance with the present invention, the surfactant is added to an aqueous solution in which has been dissolved a quantity of at least one water soluble salt. Standard mixing procedures known in the art can be employed since heating of the solution and special agitation conditions are normally not necessary. Of course, if used under conditions of extreme cold such as found in Alaska or Canada, normal heating procedures should be employed.

Sometimes it is preferable to dissolve the surfactant into a lower molecular weight alcohol prior to mixing it with the aqueous solution. The lower molecular weight alcohol or diol, for instance isopropanol or propylene glycol, may function to aid to solubilize the thickener. Other similar agents may be employed. Further, a defoaming agent such as a polyglycol may be employed to prevent undesirable foaming during the preparation of the fracturing fluid if a foam is not desirable under the conditions of the treatment. If a foamed fluid is desired, a gas such as air, nitrogen, carbon dioxide or the like may be employed.

In addition to the water soluble salts and thickening agents described herein, the aqueous hydraulic fracturing fluid may contain other conventional constituents which perform specific desired functions, e.g., corrosion inhibitors, fluid-loss additives, and others as described previously herein, and the like. The proppant can then be suspended in the fracturing fluid.

Figure 11:
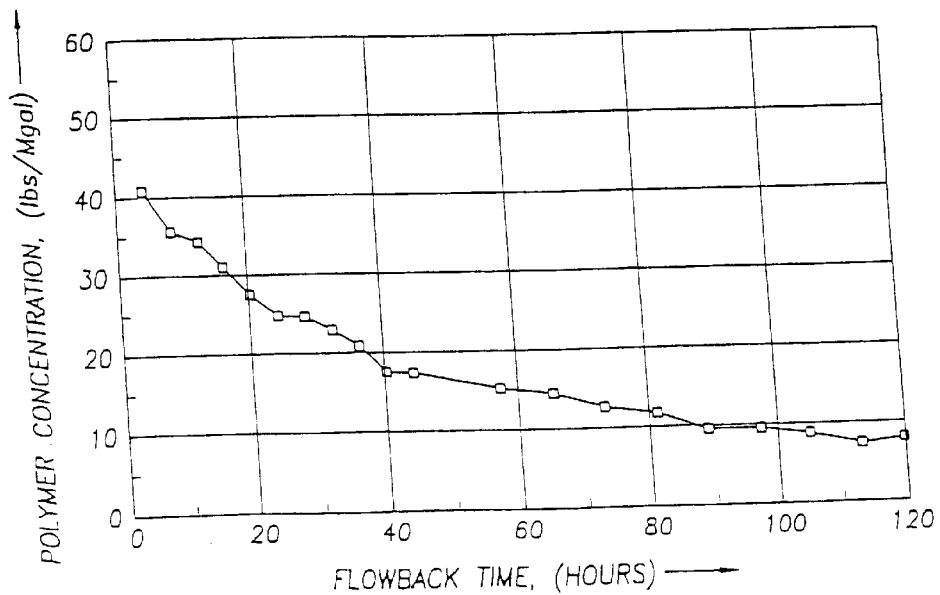
FIG. 11 presents a graph of the concentration of guar (1 bm/1000 gallons) in the samples of fluid flowed back to the surface after a prior art hydraulic fracturing treatment of a gas well producing formation water as a function of the time (hours) between the start of the flowback and when the sample was collected.
Figure 12:
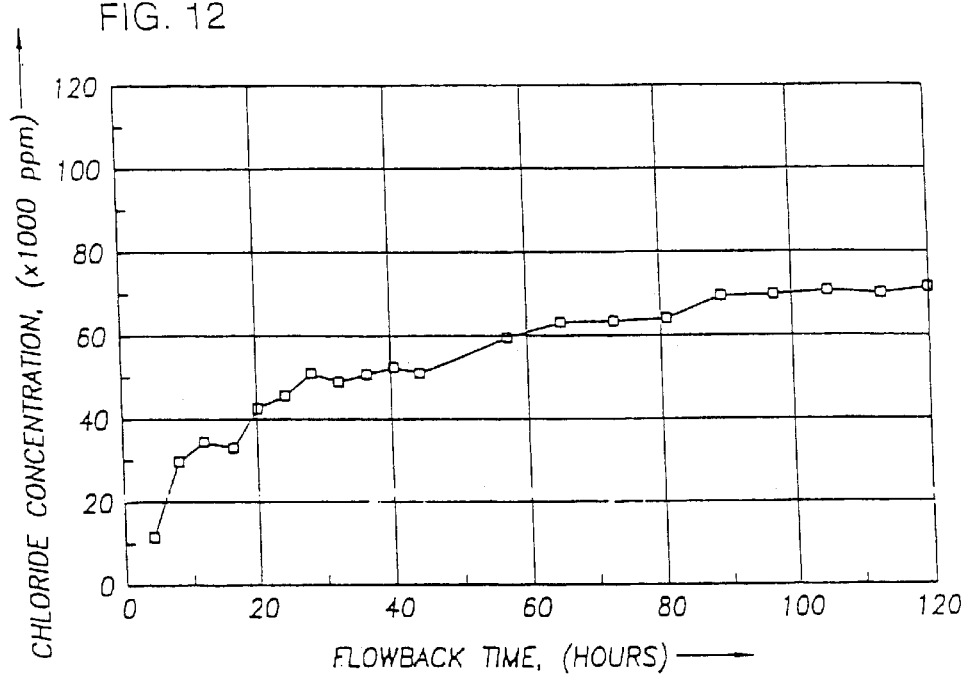
FIG. 12 presents a graph of chloride concentration (×1000 ppm) in the samples of fluid flowed back to the surface after the prior art hydraulic fracturing treatment of the gas well producing formation water referred to in FIG. 11 as a function of the time (hours) between the start of the flowback and when the sample was collected.
Figure 13:
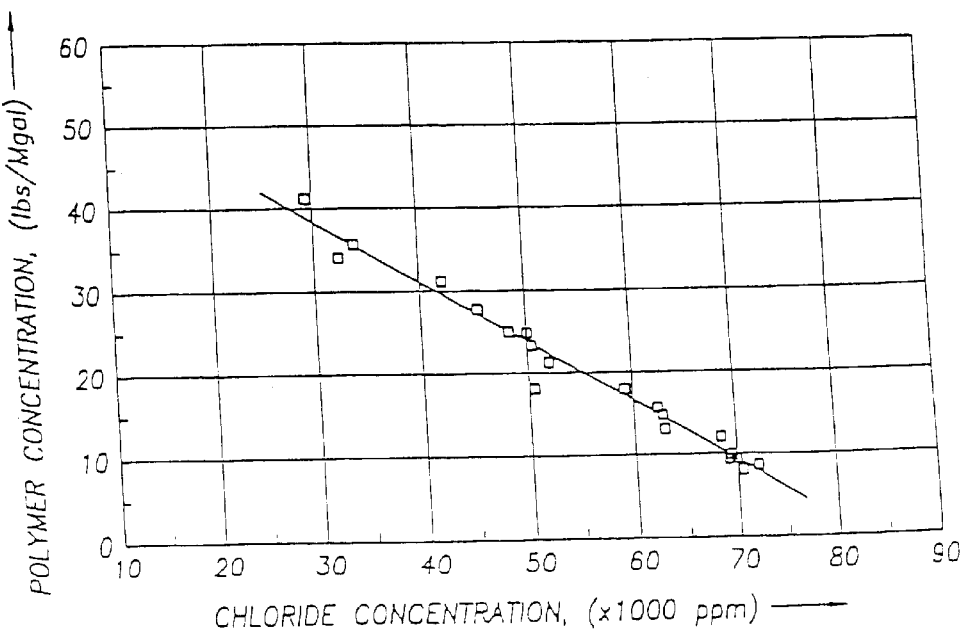
FIG. 13 presents a graph of guar concentration (1 bm/1000 gallons) versus chloride is concentration (×1000 ppm) in the flowback sample for the hydraulic fracture of the gas well corresponding to FIGS. 11 and 12.

We have recently discovered that the trend of aggressive flowback to enhance polymer recovery after a hydraulic fracture operation of a dry gas well is not observed in reservoirs, either oil or gas, in which formation water is produced. In such reservoirs, we found that aggressive flow back procedures did not substantially increase the amount of polymer recovered nor well productivity. We determined the cause of this behavior by analyzing data from samples obtained during the flowback period. In contrast to the pattern seen for dry gas reservoirs, polymer concentration rapidly decreased during the flowback period for these wells. This is illustrated by the data in FIG. 11. This is a graph of guar concentration in the flowback samples as a function of time. Polymer concentration started off near the level of the polymer pumped on the job for the hydraulic fracture operation and then rapidly decreased to approach zero in 5 to 6 days. Additional analysis showed that production of formation water quickly dominated over the production of water from the original fracturing fluid. This is illustrated in FIG. 12 which presents a graph of chloride concentration in the flowback samples with time. If only fracturing fluid were produced, this should have stayed constant at about 5000 parts per million. Instead, there was a rapid rise in chloride level until it reached the level of chloride in the formation. Thus, production of formation water quickly dominated over the production of fracturing water. This limited the amount of polymer which could be recovered during the clean up period and, will ultimately greatly restrict well productivity. FIG. 13 provides further evidence of this. This is a plot of guar concentration versus chloride concentration in the flowback samples. As the chloride concentration increased, the polymer concentration decreased until it approached zero. Thus, we discovered that there is a heretofore unrecognized need for a method to limit the inflow of formation water during the well turn around period, and optionally long into the life of the well, in order to maximize the polymer recovery and well productivity.

The present invention provides a step for selectively blocking the pore structure in water-bearing zones but not in oil or gas zones to selectively retard production of formation water. The processes incorporating this step can be used to treat the entire length of the conventional fracture if desired, although limitation of water production from as little as about the 10% of the fracture length nearest to the wellbore can be effective. It is always preferred that the area of the fracture nearest the wellbore be treated. This step, when used in a conventional hydraulic fracture process, also reduces treatment fluid loss to the water-bearing zones, and in an aggressive flow back increases the recovery of the polymer used in the fracturing fluid.

In one embodiment, an aqueous viscous surfactant system is pumped into the formation. This fluid would have a viscosity in excess of 10 cp, and preferably at least 35 cp, e.g., from about 35 cp to about 500 cp, and more preferably at least 50 cp at 100 $sec^{-1}$ and bottom hole temperature. Since the fluid is water based, the mobility of the viscosifying surfactant into the pores of the water-bearing zone is greater than the mobility of the viscosifying surfactant into the oil or gas zone. In addition, the viscous surfactant system retains its viscosity on exposure to formation water but loses its viscosity on exposure to hydrocarbons. As a result, a plug of viscous fluid is placed selectively in the pore structure of water-bearing zones at the formation face, but not in the pore structure of the hydrocarbon zones at the formation face. Thereafter, the fracturing treatment is performed. When the fracturing treatment is turned around, the production of formation water is selectively retarded by this plug of viscous fluid. The viscous plug may be temporary or permanent depending on the composition of the plug, the volume of the plug and reservoir conditions such as temperature and pressure.

The process may be conducted in a variety of ways. In one preferred embodiment, the viscous fluid is used in the pad (that is, the fluid stage at the start of a hydraulic fracturing process prior to the pumping of the proppant-fluid slurry). In a further embodiment, the viscous fluid is used as the carrying fluid for the proppant slurry during the normal hydraulic fracturing operation. In another embodiment, the viscous plug could be placed prior to the conventional hydraulic fracturing treatment, for example, as part of minifrac or calibration frac process.

In this embodiment of the present invention, the methods comprises employing an aqueous viscous surfactant based fluid. The fluid comprises water, a salt and a surfactant capable of forming viscosifying micelles. Optionally, it may include a cosurfactant to increase viscosity or to minimize the formation of stable emulsions which contain components of crude oil or a polysaccharide or chemically modified polysaccharide, or an organic salt or alcohol, etc.

The viscosifying surfactants create fluids which have a low leakoff rate. Preferably, these fluids are insensitive to pressure. At high pressures, even as high as used during a fracturing operation, little fluid is lost to the formation. This reduces the total volume of fluid needed to provide the desired formation treatment, e.g., fracturing, with associated cost savings. Further, since hydraulic fluid leakoff into water-bearing zones is minimized, longer fracture length extension is obtained using viscous fluids containing viscosifying micelles according to the present invention. At low pressures, these low molecular weight surfactant systems flow out of the oil or gas zones of the formation more easily with better cleanup—showing improved well productivity after fracturing.

Viscosifying surfactants are relatively small molecules. Each molecule is typically less than 500 grams per mole, which is less than 0.1% the size of the polymers used in some of the prior art hydraulic fracturing methods. These small molecules will associate under certain conditions to form viscosifying micelles, in an equilibrium state of breaking and reforming. As dynamic structures, the micellar structures are readily altered by shear pressure, the presence of hydrocarbons, or sometimes by increased temperature. All of these features may be found in the hydrocarbon portion of the reservoir. The viscosifying micelles rapidly assume a structure that is not conducive to creating viscosity and/or the surfactant molecules return to their original small independent state once they are placed into the hydrocarbon bearing zone.

To the contrary, the molecules pumped into the water-bearing zones of the formation advantageously remain behind in viscosifying micellar form while in an aqueous environment, and act to block or impede the flow of water from the formation, as seen in FIG. 6. The micelles of this invention are preferably wormlike in shape, as opposed to other geometric shapes such as box shaped or spherical. They are circular or elliptical in cross-sectional area. Preferably, they are relatively long in comparison to their width, with an average aspect ratio of 100 or greater, in most but not all cases.

EXAMPLE 1

Three 500-mL beakers were filled with 250 mL of three percent (by weight) ammonium chloride solution. Erucyl bis (2-hydroxyethyl) methyl ammonium chloride was added at three concentrations: 2%, 3% and 4% by volume. No sodium salicylate was added. The systems were stirred until all of the surfactant dissolved. Rheological measurements were performed at 110°, 130°, 150° and 175° F.

Figure 37:
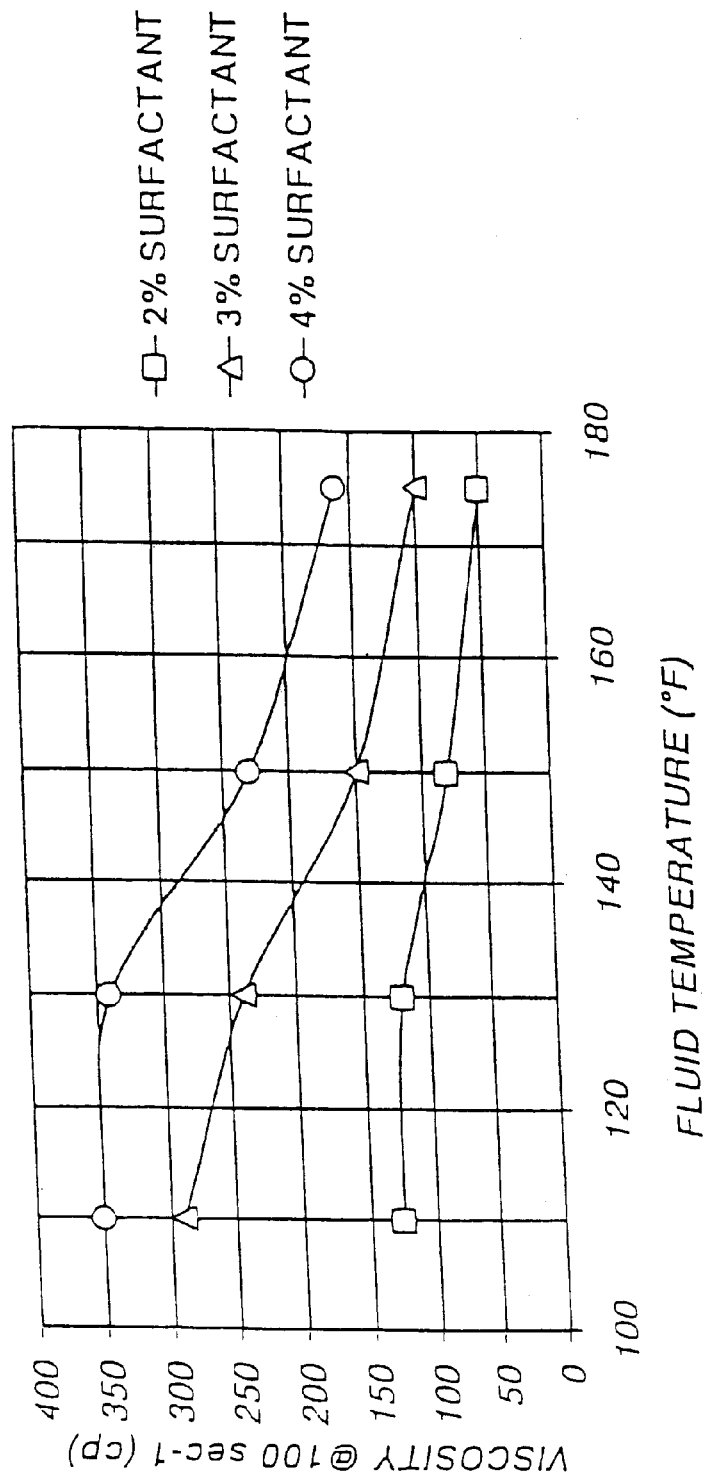
FIG. 37 presents a graph showing the rheology of surfactant-base fracturing according to the present invention.

FIG. 37 shows the viscosity of surfactant-base fracturing fluids prepared without the addition of sodium salicylate. The data show that sufficient viscosity for adequate proppant transport (~50 cp @170 $sec^{-1}$) can be attained at fluid temperatures up to about 175° F.

EXAMPLE 2

Two 500-mL beakers were filled with 250 mL of three percent (by weight) ammonium chloride solution. Erucyl bis (2-hydroxyethyl) methyl ammonium chloride was added at 4% by volume. Sodium salicylate (0.06 wt %) was added to one beaker and 0.5 wt % erucyl amine was added to the other. The systems were stirred until all of the surfactant dissolved. Rheological measurements were performed at 175° and 200° F. The results show that erucyl amine has utility as a high temperature viscosity stabilizer.

| Additive | Viscosity @ 170 $sec^{-1}$ (cp) | |
| --- | --- | --- |
| | 175° F. | 200° F. |
| sodium salicylate (0.06 wt %) | 108 | 21 |
| erucyl amine (0.5 wt %) | 136 | 81 |

EXAMPLE 3

Two 500-mL beakers were filled with 250 mL of three percent (by weight) ammonium chloride solution. Erucyl bis (2-hydroxyethyl) methyl ammonium chloride was added at 4% by volume. Cocoamidopropyl dimethyl amine oxide (0.6 wt %) was added to one beaker. The systems were stirred until all of the surfactant dissolved. Rheological measurements were performed at 130°, 150° 175° F.

The results show that cocoamidopropyl dimethyl amine oxide (0.6 wt %)has utility as a viscosity enhancer in this temperature range.

| Additive | Viscosity @ 170 $sec^{-1}$ (cp) | | |
| --- | --- | --- | --- |
| | 130° F. | 150° F. | 175° F. |
| none | 213 | 198 | 174 |
| cocoamidopropyl dimethyl amine oxide (0.6 wt %) | 306 | 210 | 195 |

EXAMPLE 4

Example 4 demonstrates properties which may be obtained using different viscosifying agents (benzoic acid derivatives). To a 3% ammonium chloride solution in a Warring blender, the following were dissolved: 0.5 mM benzoic acid derivatives like, sodium salicylate, 3-hydroxy benzoic acid, 4- and 5-methyl salicylic acid. The solution was mixed well and deareated before measuring the viscosity on a reciprocating capillary viscometer. The viscosity was measured at various temperature from 80 F. to 225 F.). The viscosity values at 200 degrees ° F. are provided below:

| Substituted benzoic acid (Na salt) | % erucyl bis (2-hydroxyethyl) methyl ammonium chloride | Viscosity @ 100 S$^{-1}$ (200 F.) |
|---|---|---|
| 2-hydroxy benzoic acid | 4 | 88 |
| 4-hydroxy benzoic acid | 4 | 44 |
| Amino-2-hydroxy benzoic acid | 4 | 68 |
| 3,5-Dinitro-2-hydroxy benzoic acid | 4 | 73 |
| 5-Methyl-2-hydroxy benzoic acid | 4 | 100 |
| 5-Methyl-2-hydroxy benzoic acid | 5 | 120 |
| 4-Methyl-2-hydroxy benzoic acid | 4 | 91 |
| 3,5-Di-isopropyl-2-hydroxy benzoic acid | 4 | 75 |

4- and 5-substituted 2-hydroxy benzoic acid gave sufficient viscosity (57 sec$^{-1}$) even at 220° F. at an erucyl bis (2-hydroxyethyl) methyl ammonium chloride concentration of 4%.

EXAMPLE 5

Experiments in the Presence of Polysaccharide (guar)

In a similar experiment, to 3% ammonium chloride solution, dissolve 0.5 mM sodium salicylate. To this, hydrated guar is added to get a final concentration of 2 to 5 lb/1000 Gal followed by 0.5 to 5% surfactant solution. The solution is mixed well and viscosity is measured on a reciprocating capillary viscometer. The viscosity of 5% erucyl bis (2-hydroxyethyl) methyl ammonium chloride in the presence of 5 lb Guar is given below:

|   | n' | k' | Temp (F.) | Viscosity @ 100 S$^{-1}$ |
|---|---|---|---|---|
| 1 | 0.3942 | 0.2075 | 90 | 610 |
| 2 | 0.2230 | 0.1960 | 150 | 262 |
| 3 | 0.3221 | 0.0957 | 175 | 202 |
| 4 | .4772 | 0.0091 | 200 | 40 |

EXAMPLE 6

Example 6 provides for the addition of fluoro compounds and cosurfactants to prevent emulsions. The presence of fluoro compounds and other non-ionic surfactants as co-surfactants with erucyl bis (2-hydroxyethyl) methyl ammonium chloride are examined. They are found to be useful as deemulsifiers in Erucyl bis (2-hydroxyethyl) methyl ammonium chloride-diesel systems. Addition of 0.001% to 0.1% Fluorad-FC 750 and Fluorad FC 754; and non-ionic and cationic surfactant blends were found to decrease the formation of emulsion.

The de-emulsification was tested by two methods. To 10 ml of erucyl bis (2-hydroxyethyl) methyl ammonium chloride gel, 1 μl to 200 μl of the de-emulsifier was added and swirled well. To this, 20 ml of diesel is added and shaken well for 30 seconds. The efficiency of different surfactants were compared from the time required to separate it into two layers. It is also tested by looking at the pressure required to filter the mixture through a Whitmann membrane. The presence of fluoro-compounds and other surfactants made the filtration easier.

The viscosity of erucyl bis (2-hydroxyethyl) methyl ammonium chloride in the presence of these compounds were also tested and it is shown that these compounds enhance viscosity of erucyl bis (2-hydroxyethyl) methyl ammonium chloride.

EXAMPLE 7

A series of experiments was conducted to determine the half lives of viscosifying surfactant-base foams generated at elevated temperature and pressure. The results show adequate foam stability up to 190° F.

The apparatus uses a heated 250-mL ISCO syringe pump to feed the liquid phase into a foam generator. A nitrogen bottle with a Brooks digital flow controller feeds the gas into the foam generator. The foam passes by a sight glass that allows one to observe the foam texture and bubble size distribution, then goes on to fill a collection vessel with a glass wall. The cell is heated by a water circulating from a Hakke bath. An outlet is fitted on the collection vessel that allows foam sampling.

One liter of a base fluid composed of 4 vol % erucyl bis (2-hydroxyethyl) methyl ammonium chloride +0.06 wt % sodium salicylate was prepared in the manner described in previous examples. The foams were generated at about 1100 psi, then pumped into the preheated colletion vessel. The half lives of foams (the time at which 50% of the base fluid has separated from the foam) were measured at four test temperatures: 150°, 175°, 185° and 190° F. The results shown in the following table.

| Temperature (° F.) | Half Life (hr) |
|---|---|
| 150 | >6 |
| 175 | 3 |
| 185 | 2.5 |
| 190 | 0.6 |

The results show dequate foam stability up to 190° F.

EXAMPLE 8A

The fluid leakoff control characteristics of surfactant based fluids to polymer based fluids was evaluated in dynamic fluid loss tests. This test procedure simulates the leakoff of fracturing fluids into a porous media under representative hydraulic fracturing conditions. The tests were conducted with a generic borate-crosslinked guar fracturing fluid and a generic surfactant base fluid, the additives and their concentration as specified in the Table below. The tests involve maintaining a 1000 psi differential pressure across the length of the core, for a period sufficiently long enough so that a steady leakoff rate is established. Steady leakoff conditions are established either when an impermeable external filter cake forms on the face of the core, or when the internal pores are filled with an internal filter cake. Steady leakoff rate can also exist when the leakoff control mechanism is viscosity controlled.

Composition of Test Fluids

| Name | Concentration |
|---|---|
| A | |
| Guar | 20 lb/1000 gal |
| KCl | 167 lb/1000 gal |
| Antifoam | 0.5 gal/1000 gal |
| Bactericide | 0.25 gal/1000 gal |
| Xlinker | 1.5 lb/1000 gal |
| Xlinker activator | 7 gal/1000 gal |
| Surfactant | 1 gal/1000 gal |
| Diesel No. 2 | 20 lb/1000 gal |
| B | |
| Ammonium Chloride | 250 lb/1000 gal |
| Sodium Salicylate | 5 lb/1000 gal |
| ** | 40 gal/1000 gal |

**Composition comprised of 75% erucyl methyl bis(2-hydroxyethyl) ammonium chloride, and 25% isopropyl alcohol The retained permeability of the cores after leakoff was estimated from the pressure drop required to flow brine at a constant flow rate through the core. The direction of the flow is reversed in comparison to the direction of leakoff, so that the flow back retained permeability is representative of the permeability to the flow of formation fluid.

EXAMPLE 8B

The Table below shows results obtained as in 8B further in that it shows the results of the dynamic fluid loss tests for the guar-based fluid and our surfactant-based fluid along with the matrix retained permeability after 25 min. during flow back. These data. demonstrate that the surfactant fluid has better leakoff control characteristics. The data further demonstrate that, in comparison to polymer based fluids, the reduction in retained permeability with the surfactant-based fluid for brine (formation water) is not only lower but also more sustainable. This demonstrates that in comparison to polysaccharide-based fluids, the surfactant fluid would delay the entry of formation water into the fracture, thus enhancing the fracture cleanup potential.

Comparison of the Leakoff Characteristics of a Polymer Based Fluid and a Viscosifying Surfactant Fluid

| | | Leakoff (ml) | | |
|---|---|---|---|---|
| Example | Fluid | 1 min | 50 min | Retained Perm after 25 min |
| A | 20 lb/1000 gal Borate XL Guar | 1.2 | 12.9 | 40.0% |
| B | 4% mixture:*** | 1.3 | 5.8 | 8.2% |

***Composition comprised of 75% erucyl methyl bis(2-hydroxyethyl) ammonium chloride, and 25% isopropyl alcohol

EXAMPLE 9

Figure 8:
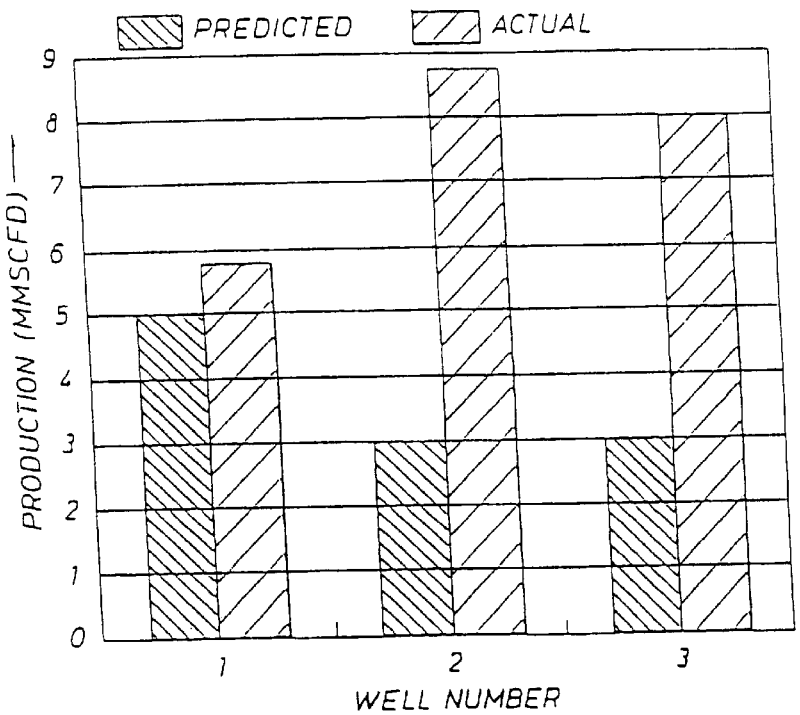
FIGS. 8 and 9 show results of tests described in Examples 9 and 10, respectively, and are discussed in connection with those Examples.

The case history as seen in FIG. 8 shows the results from three treatments tat were performed on gas wells. The formation permeability was approximately 25 mD. The well operator had indicated, based on previous experience in the area, what the expected production rates were for these wells. For each well, when the formation was fractured with the surfactant-based fracturing fluid of this invention. The resulting production rate was significantly higher than expected.

EXAMPLE 10

Figure 9:
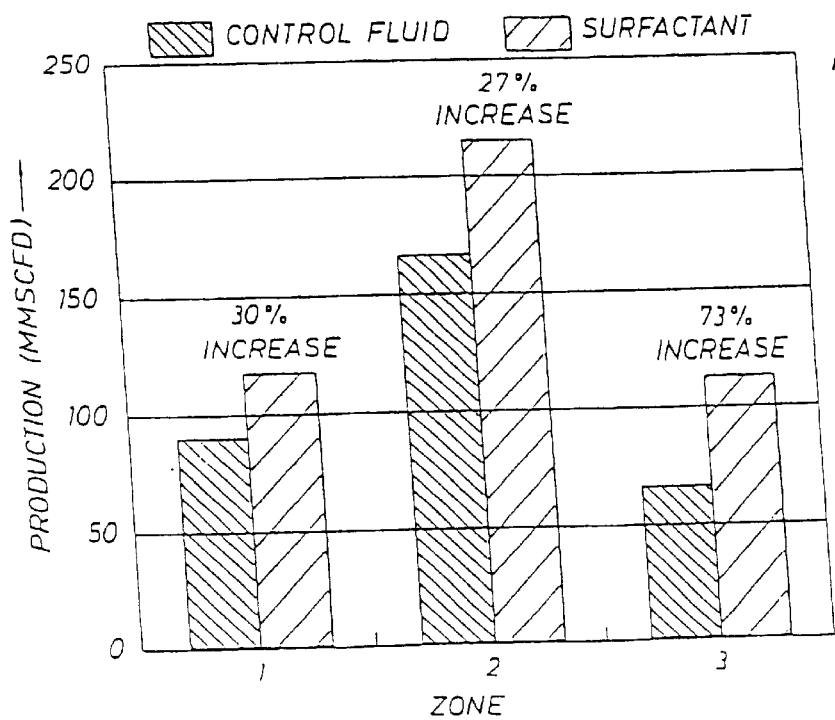
Figure 10:
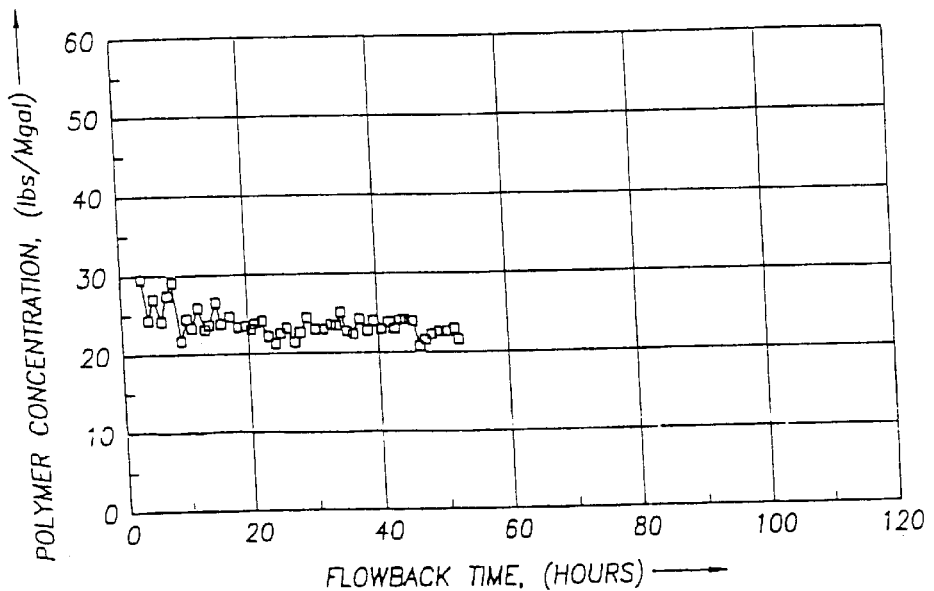
FIG. 10 presents a graph of the concentration of guar (1 bm/1000 gallons) in the samples of fluid flowed back to the surface after a prior art hydraulic fracturing treatment of a dry gas well as a function of the time (hours) between the start of the flowback and when the sample was collected.

The case history of FIG. 9 shows the results of treatment of three zones in a gas well with a viscosifying surfactant-base fracturing fluid. The production rates from each zone are compared with those from an offset well that had been fractured with a polysaccharide-based fluid (guar). A production-rate improvement ranging from 27% to 73% was observed when the surfactant-based fracturing fluid was used.

EXAMPLE 11

Blending tests were performed with the Witco surfactant containing erucyl methyl bis(2-hydroxyethyl)ammonium chloride, available from the Witco Chemical Company (hereafter in this example set forth as "SURFACTAN").

The tests showed the invention of this application may be successfully utilized by pumping the surfactant directly to the blender, without prolonged hydration in a mixer as required in the prior art fracturing methods. Thus, it will be possible to achieve viscosity increases and almost simultaneously pump the fracturing fluid into the wellbore, avoiding the use of an extra mixing or hydration step, thereby saving substantial time and resources, and facilitating real time adjustment of viscosity levels.

For example, SURFACTANT has no problem yielding its viscosity in either continuous or batch mix techniques using existing equipment and methods set up on the frac boats. Metering was accomplished using a combination of 75% of erucyl compound and 25% of isopropyl alcohol.

The same continuous mix equipment set up used for PermFRAC™ treatments were arranged and performed with the ClearFRAC™ material mix test. The SURFACTANT was placed in a returnable tote on the second floor mixing deck of an offshore fracturing boat, next to the skid. The tote was rolled just prior to use by using; the product being taken off bottom and pumped back on top. The 3% $NH_4Cl$ was cut into 230 bbls of city fresh water located in the starboard 3 below deck boat tank. Water temp was 88 degrees F. No high temp stabilizer was put in the mix water, simulating worst continuous mix conditions.

Two skid pumps (0 to 40 bpm) were primed and plumbed into the suction manifold of the starboard blender. The starboard in-line was the pump used. Prior to pumping 3% $NH_4Cl$ the blender and pump were first lined out using river water. The pump rate was set at 15 bpm (barrels per minute). The surfactant was set at 25 gpm (gallons per minute) using one of the pumps (4% surfactant loading). Once the test was started samples were taken at the discharge manifold of the blender, at the suction of the triplex pump, and down stream of the triplex pump. A total of 8 samples were taken, 4 at the blender, and 2 each from the suction and downstam sides of the triplex. A total of 60 bbls of clean fluid was mixed followed by 50 bbls of slurried fluid ramped from 1 to 15 ppa using 12/20 proppant.

Continuous Blend Test Results

The Table below lists the Fann 35 measurements taken on the collected samples. The data shows the SURFACTANT was fully yielded coming out of the blender, indicating enough shear is imparted to the surfactant in the blender slinger to fully yield the product—no additional time or shear is required. No sand accumulation problem was seen when the hoses and equipment were inspected after the mix test. The only problem encountered was the one inch hose feeding the surfactant to the blender was taxed to deliver the SURFACTANT material at 25 gpm, even though an A pump was used. A two inch line is recommended. Also, the 550 gallon tote appears to be a good working tank to pull from for continuous mix. The 550 gal tote placed on a 110 gal tote (i.e. placed ~3 feet high for additional hydrostatics) is therefore recommended as preferred Batch Mix Test Conditions A total of 25 bbls of 4% SURFACTANT was batch mixed in 3% NH4Cl using one of the deck 50 bbl paddle tank blenders. No centrifugal pump was used. The paddle was set at medium speed (~30–40 rpm). Water temp was 88 F. The SURFACTANT was fed into the fluid from the top at a rate of ~6 gpm.

Batch Mix Test Results

During the blending test it was noticed that the SURFACTANT started to yield viscosity before all of the material was added (within 3 minutes of initial addition). It took a total of ~7 minutes to add the SURFACTANT material. The last portion of SURFACTANT had no problem shearing into the viscosified fluid. Fann 35 measurements showed the SURFACTANT was fully yielded within 10 minutes after the last portion of SURFACTANT was added. The test showed that even at medium paddle speed plenty of shear is available to shear in and readily yield the SURFACTANT product.

Conclusion As To Example 11 Test Data

The continuous mix test showed the SURFACTANT ClearFRAC™ material was fully yielded coming out of the discharge of the blender, showing the blender delivers an ample amount of shear to yield the product. For this mix test the ambient temperature of the SURFACTANT and mix water were in the upper 80's. The effects of lower temperature mix water and surfactant on how well the blender will yield the SURFACTANT product is not known at this time.

The batch mix test performed showed that the SURFACTANT material can be easily batch mixed. A moderate amount of shear will readily yield the SURFACTANT material. To mix below deck the smaller 230 and 250 bbl tanks are recommended over the larger 500 and 550 bbl tanks, with the tanks no more than 95% full to enhance fluid circulation ClearFRAC Mix Test On BO30 Using 4% Witco Surfactant in 3% NH$_4$Cl

| Fluid | Temp | 170 sec-1 |
|---|---|---|
| Lab Sample | 85 F. | 156 |
|  | 150 F. | 135 |
| Batch Mix Sample | 88 F. | 162 |
|  | 150 F. | 141 |
| POD 1 minute | 87 F. | 150 |
|  | 150 F. | 132 |
| POD 2 minute | 87 F. | 165 |
|  | 150 F. | 138 |
| POD 3 minute | 87 F. | 174 |
|  | 150 F. | 144 |
| POD 4 minute | 87 F. | 180 |
|  | 150 F. | 147 |
| Triplex Suction 2 minute | 87 F. | 159 |
|  | 150 F. | 135 |
| Triplex Suction 4 minute | 87 F. | 180 |
|  | 150 F. | 147 |
| Downstream of Triplex | 87 F. | 156 |
| 2 minute |  |  |
| Downstream of Triplex | 150 F. | 135 |
| 4 minute | 87 F. | 174 |
|  | 150 F. | 140 |

EXAMPLE 12

Limiting Inflow of Formation Water

A viscous fluid, more particularly a viscoelastic fluid, is pumped through cores in parallel—a brine saturated core and a diesel saturated core which were prepared in similar fashion to those used in Example 14, Part I,. Steps 1–9. Temperature indicators at the inlet and outlet record the temperature of the fluid entering and exiting the core. In addition to a pressure indicator at the core inlet, there are 5 pressure transducers which note the pressure at different sections of the core. The exiting fluid is collected in a balance to determine the weight of the fluid leakoff. Following the leakoff test, brine is passed through the cores and the leakoff is noted.

Test Conditions of the Fluid Loss Experiment

| Test Conditions of the Fluid Loss Experiment | |
|---|---|
| Brine | 2% or 4% KCl or 3% NH$_4$Cl |
| Viscoelastic surfactant concentration[a] | 4–5% |
| Temperature | 150° F. |
| Pressure | 1000 psi |
| Permeability | 60 mD |
| Core Size | 6–12 in |
| Test time | 10–200 min |

[a]N-cis-13-docosenoic-N, N-bis (2-hydroxyethyl)-N-methyl ammonium chloride (QAS)

In matrix acidizing, the viscoelastic fluid (VF) is actually followed with acid and not brine. Tests were performance to study the effect of acid addition on the viscosity of the fluid.

Figure 14:
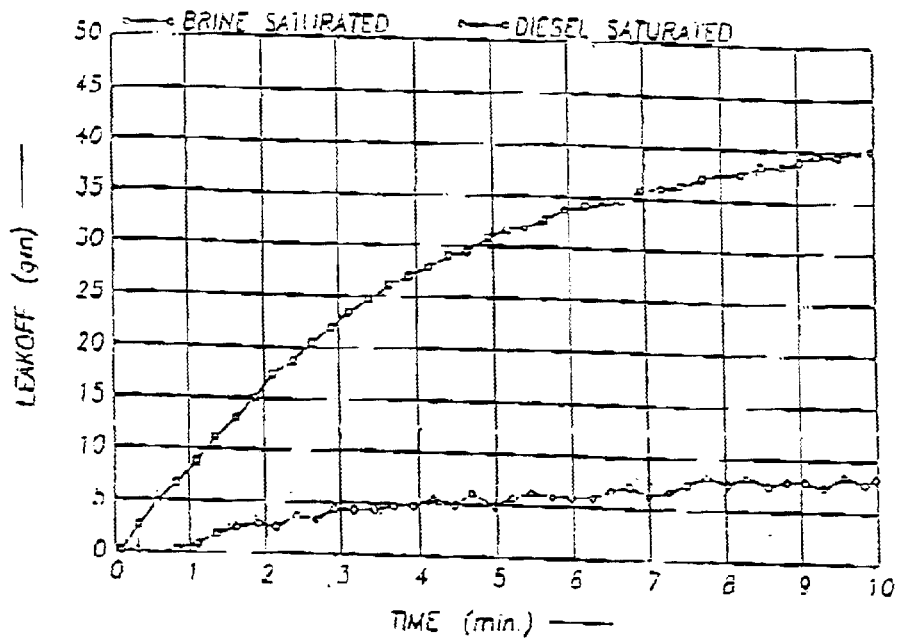
FIGS. 14a and 14b present graphs of a single parallel leakoff test in brine-saturated cores and diesel-saturated cores showing initial behavior (FIG. 14a) and long term behavior (FIG. 14b). The brine contained 2% KCl. The viscous fluid was an aqueous fluid containing (1) 4% of a blend of 25% isopropyl alcohol and 75% quaternary ammonium salt (QAS), N-cis-12-docosenoic-N,N-bis (2-hydroxyethyl)-N-methyl ammonium chloride, in (2) a 2% KCl brine. The cores were berea sandstone cores having a permeability of 60 millidarcies (mD), 12 inches long and maintained at a temperature of 150° F. The fluid pressure was 1500 psi.
Figure 14:
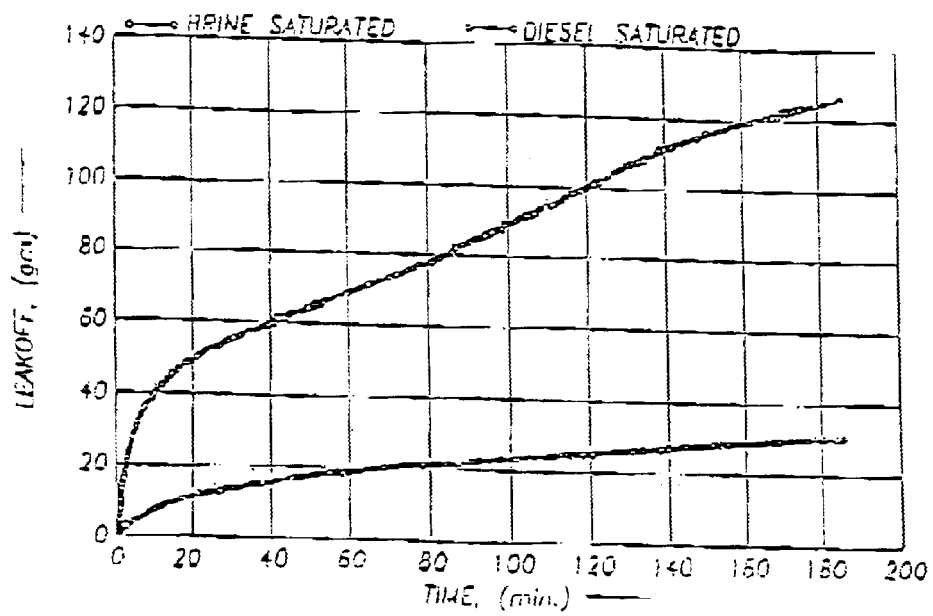
Figure 15:
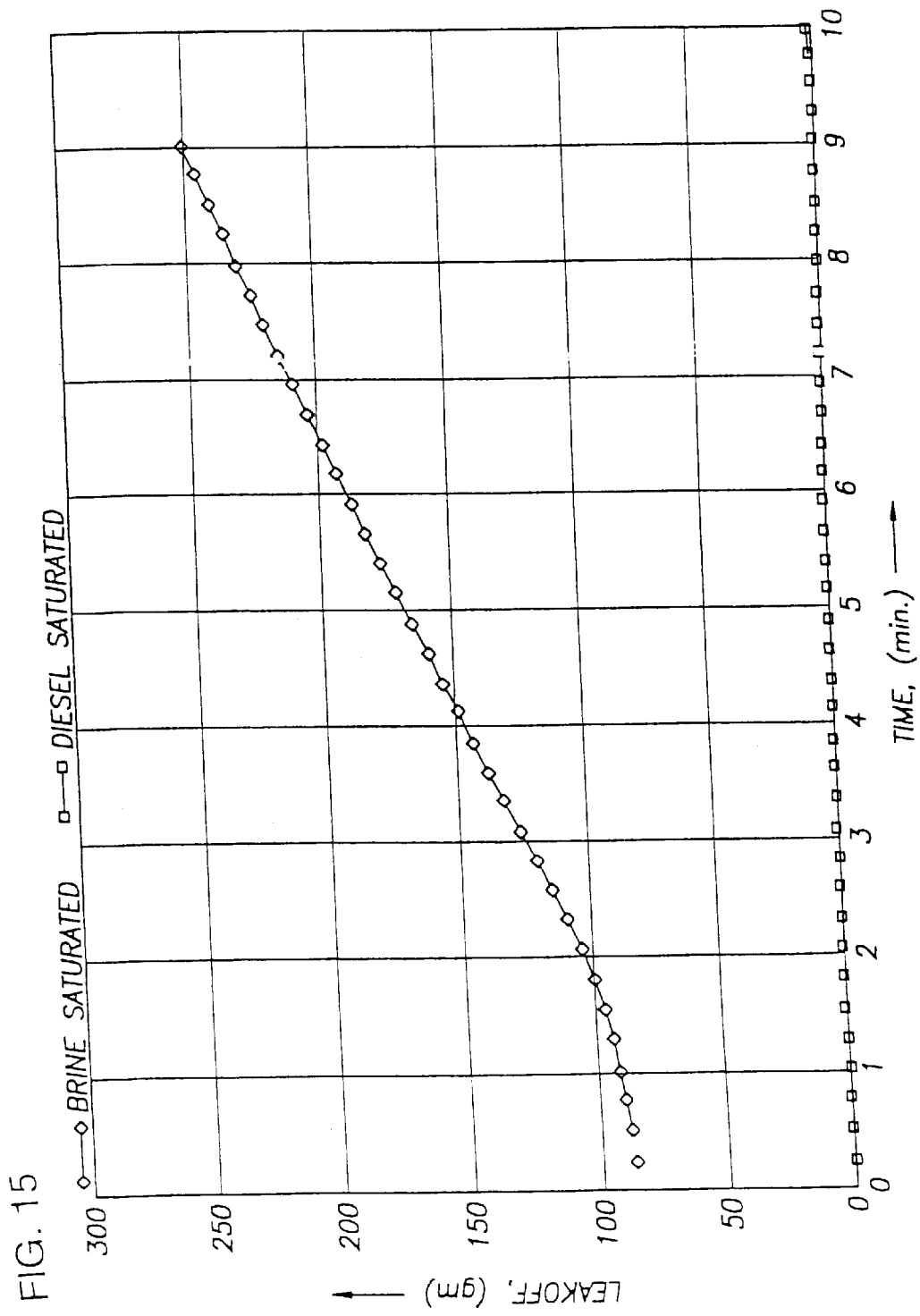
FIG. 15 presents a graph of the brine leakoff through a brine-saturated core and a diesel-saturated core after leakoff tests referred in FIGS. 14a and 14b.
Figure 16:
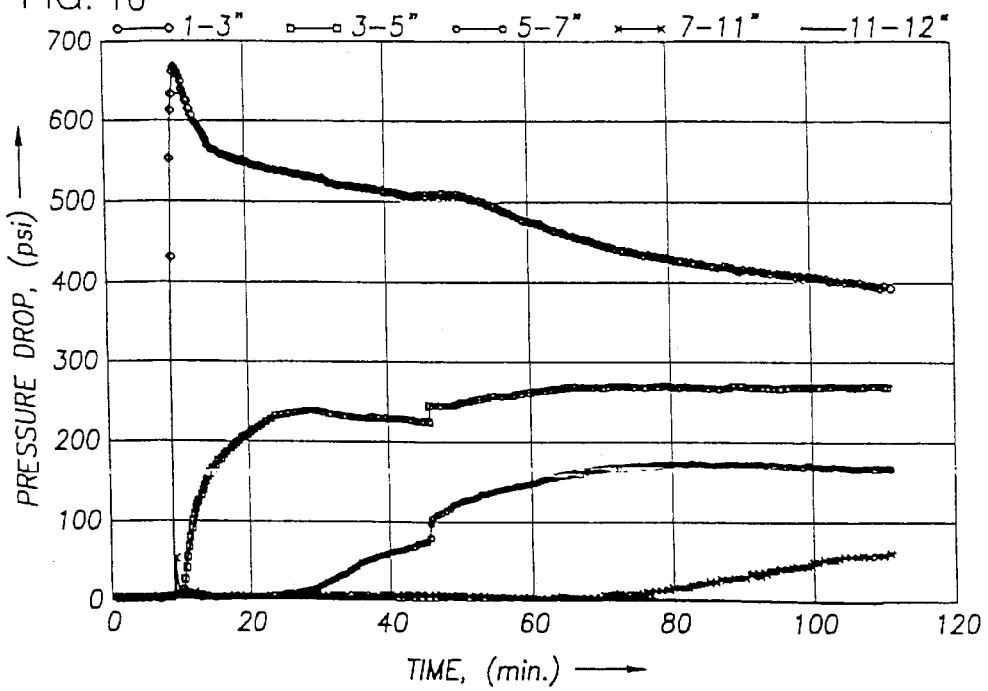
FIG. 16 presents a graph showing the pressure drop through different sections of the core between 1" and 3", 3" and 5", 5" and 7", 7" and 11", and 11" and 12" measured where the fluid enters the core.
Figure 17:
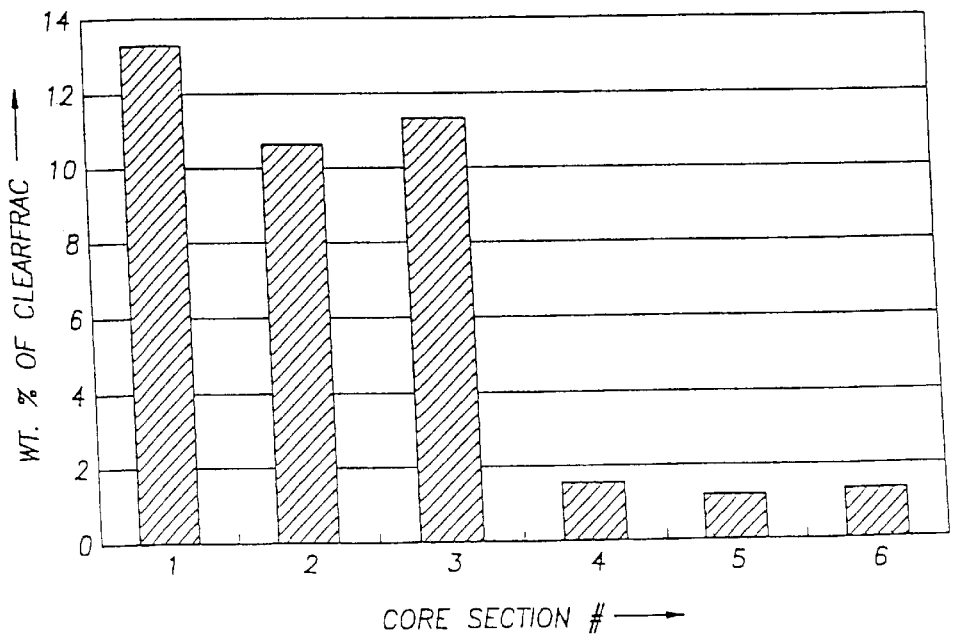
FIG. 17 presents a bar graph showing the concentration of the quaternary ammonium salt in each of the 2" sections of the 12" brine-saturated core identified as section numbers 1 through 6 starting from the fluid entrance end of the core.

The rate as well as total leakoff is higher in the case of diesel cores than brine saturated cores (FIGS. 14a and 14b). This is because the micellar structure of VF is changed when it comes into contact with hydrocarbon, resulting in lower viscosity and higher leakoff. The leakoff test is followed by passing brine through the two cores. FIG. 15 gives the leakoff of brine in the two cores. The second part of the experiment consisted of noting the pressure drop in different sections of the brine saturated core (FIG. 16) and comparing it with the concentration of QAS found in that section of the core (FIG. 17). The concentration of QAS was determined according to Example 15. These two graphs indicated that there is a zone of high fluid viscosity (50–200 cP) in the first 6 inches of the 12-inch core resulting in higher pressure drops.

Figure 18:
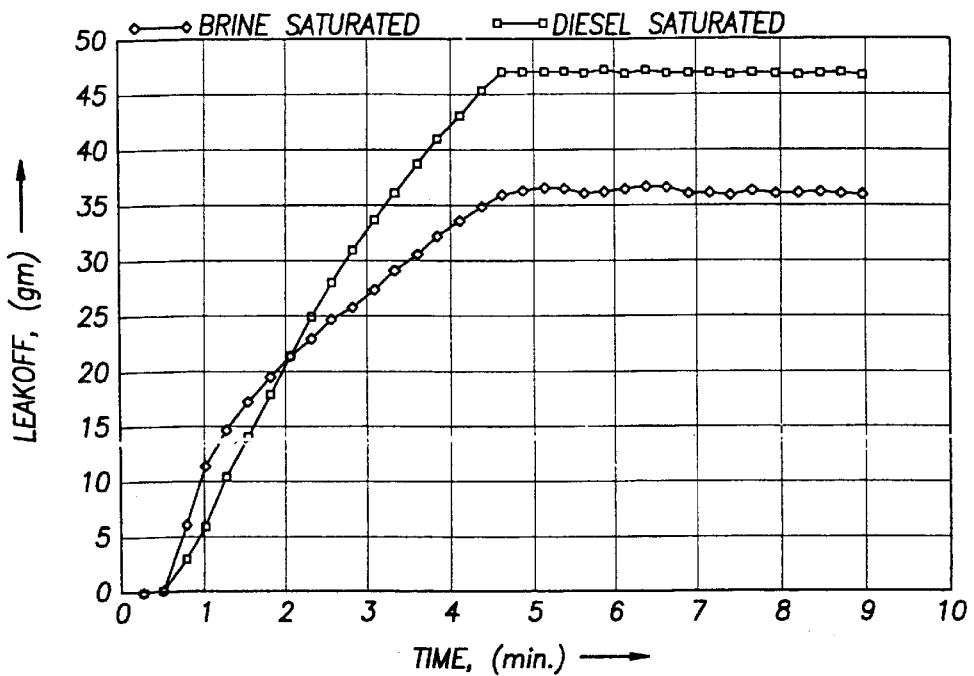
FIG. 18 presents a graph of another single parallel leakoff test in brine-saturated cores and diesel-saturated cores. The brine contained 2% KCl. The viscous fluid was like that used in FIGS. 14a and 14b, except the aqueous fluid containing the QAS was present at 5% also in a 2% KCl brine. The cores were 6 inches long, rather than 12 inches long, and maintained at 150° F. The fluid pressure was 500 psi.
Figure 19:
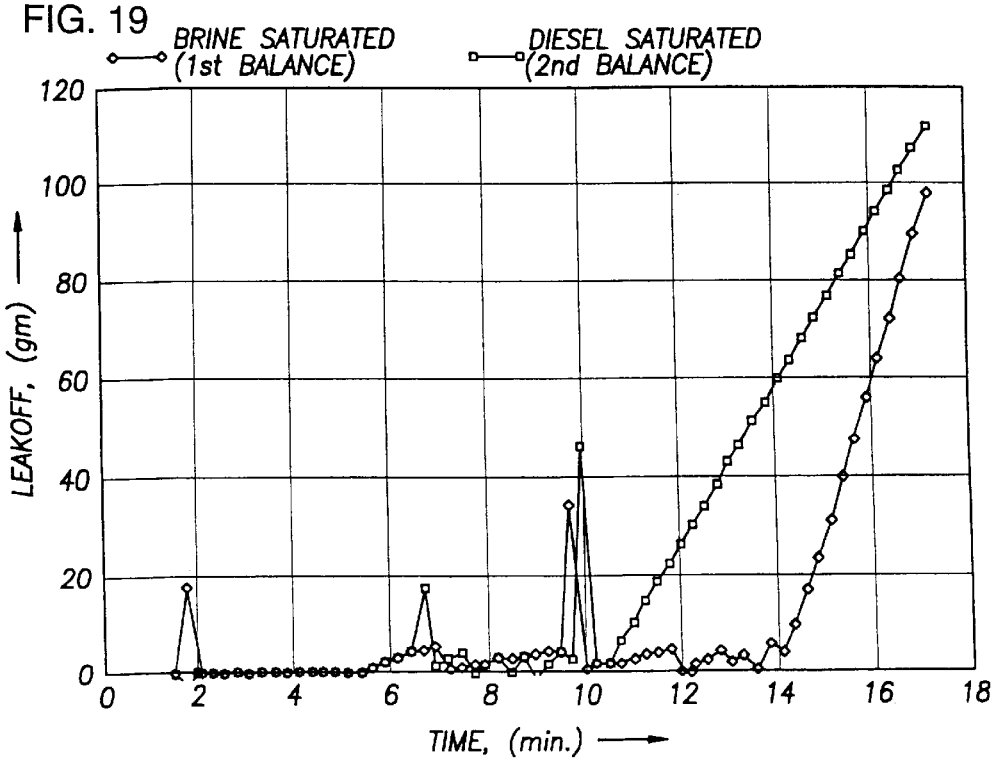
FIG. 19 presents a graph of the brine leakoff through a brine-saturated core and a diesel-saturated core after the leakoff test referenced in FIG. 18. The brine had 2% KCl and also 2% $NaNO_3$ (as a tag).

Another leakoff test was carried out for a shorter test time (FIG. 18). This was followed by passing tagged brine through both the cores (FIG. 19). There was a time lag (4 min) in the case of brine saturated core, with respect to leakoff, as compared to the oil saturated core. After this delay, the leakoff rate in brine saturated core was comparable to that in oil saturated core. This strengthens our hypothesis about the formation of a high-viscosity zone and also shows that viscosity developed in that section of the core is dependent on the duration of the test. In this case, since the test was carried out for less than 20 minutes, there was not enough time to form a high-viscosity zone and the zone formed may have been washed off with the incoming brine. Note that the delay in leakoff in the brine saturated core lasted longer than it takes to flow one pore volume through the oil saturated core.

Of the three acids studied (HCl, $H_2SO_4$, $HNO_3$), concentrated HCl was found to break VF, with 3% $NH_4Cl$ as the base brine. Hence, if HCl is used as the acidizing fluid, it will break the high viscosity zone. This can be avoided if VF is prepared in $NH_4NO_3$, instead of $NH_4Cl$.

These fluid loss experiments have given interesting results which suggest that a high viscosity zone is created in the initial 3 to 4 in of the brine-filled high-permeability core following passage of VF. This high viscosity zone will divert an aqueous treatment fluid away from the water zone and into the hydrocarbon zone in complex reservoirs.

EXAMPLE 13

Extraction of QAS From Sandstone with Methanol

Extraction studies were also carried out on cores after the VF leakoff test. The core was cut into six 2-inch pieces and each piece was crushed and pulverized. The QAS concentration in each piece was estimated colormetrically after extraction in methanol. The procedure was as follows:

1. Cut the 12-inch core to get six (6) 2-inch core pieces and label it from entrance to exit with a pencil.
2. Crush the pieces into powder using a hydraulic press.
3. Separate sandstone powder from the chunks.
4. Crush the chunks again and mix with the rest of the powder and label it.
5. Do this for all the 6 fractions.
6. Take 20 grams of the powder in a bottle and save the rest.
7. Add 20 ml methanol to the 20 g powder and shake well for a minute.
8. Decant the liquid to a 50 mL centrifuge tube.
9. Continue extraction another 3 times with 10 ml methanol each time.
10. Pool the extracted methanol in the 50 mL centrifuge tube.
11. Centrifuge and transfer the clear methanol solution to another 50 mL centrifuge tube.
12. Place equal volumes (30 or 35 ml) of the six methanol extracts in a rack and place in a water bath. (Do not cover the bath with a lid). Swirl the solution gently (about every 30 min). The solution is concentrated to dryness.
13. Add 3 + 1 + 1 ml (a total of 5 ml per sample) water to the above centrifuge tube, vortex and transfer the solution to a beaker.
14. Concentrate that to about 0.5 ml on a hot plate at very low heat. (Care was taken to avoid burning the QAS. Otherwise, the double-bond may be oxidized to —COOH and cleave the molecule.)
15. Accurately measure and transfer the solution to a 1.5 ml centrifuge tube.
16. Add water to the beaker in small quantities (0.2 ml each time), wash out all the QAS and transfer it to the 1.5 ml centrifuge tube. The total volume should be exactly 1.5 ml.
17. Centrifuge the solution.
18. Take 0.5 ml of the clear solution and add that to 4.5 ml water (10 times dilution).
19. Use this solution for estimation of QAS concentration by colorimetric method using $KMnO_4$.

EXAMPLE 14

Diversion of Acid Treatment Fluid from Higher Water Saturated to High Oil Saturated Formation Core Flowing Testing Procedure:

Part I.

Control: Without Mutual Solvent and Brine Spacer Preflush:

1. Two dry berea cores were weighed and then vacuum saturated with 3% $NH_4Cl$.
2. After the cores were saturated, they were weighed again so the pore volumes of these two cores could be calculated.
3. The cores were mounted into a dual-core device, which is capable of housing two 12" cores, and heated up to 150° F. No back pressure was applied except 20 inch long ⅛" diameter coil tubing was installed at the outlet of each of the two core holders to provide some back pressure.
4. Initial permeabilities of both cores to were determined by injecting 3% $NH_4Cl$.
5. Diesel was injected into core number one at 2 ml/min to displace the 3% $NH_4Cl$ out of the core. Injection continued until no more water was contained in the effluent.
6. Step 4 was repeated for core number two.
7. The cores were then at their irreducible water saturations. They were shut in for 12 to 18 hours.
8. After shut in, 3% $NH_4Cl$ brine was injected through core number one at 5 ml/min to displace diesel out of the core until residual oil saturation.
9. At this time, core number one was saturated with water at residual oil saturation, and core number two was saturated with oil at irreducible water saturation.
10. Four percent viscoelastic surfactant concentrate was mixed in 3% $NH_4Cl$ brine and was then injected into both cores simultaneously under a constant differential pressure of 520 psi for 60 minutes. Effluents from the cores were measured by electronic balances. The concentrate was 25% isopropyl alcohol and 75% N-cis-13-docosenoic-N,N-bis (2-ahydroxyethyl)-N-methylammonium chloride (aka N-methyl-N,N-bis (2-hydroxyethyl) erucylammonium chloride). This quaternary ammonium salt is available from AKZO Nobel Chemicals, Inc. and is derived from rape seed oil.
11. Viscoelastic surfactant concentrate was followed by 3% $NH_4Cl$ brine or 15% HCl brine injected into both cores simultaneously at 10 ml/min. When dissolved in a brine, these surfactant molecules group together to form unique micelles. The geometry of these micelles is similar to polymer molecules with a long rod shaped or worm-like structures. Effluent volume through each core was measured.

Results from this procedure are presented in FIG. 20. Part I of this example demonstrated that pumping the viscoelastic surfactant without a mutual solvent preflush does not divert the following treatment away from the area with the lowest oil concentration.

Part II

With Mutual Solvent and Brine Spacer Preflush:

The procedure for saturating cores was the same as the procedure described above from step 1 through 9. Thereafter, the Procedure was as Follows:

10. Before injecting the viscoelastic surfactant, 120 ml (approximately 2 overall pore volumes) of ethylene glycol monbutyl ether, a mutual solvent, was pumped through both cores simultaneously at 10 ml/min. Effluent volume through each core was measured.
11. The mutual solvent preflush was followed by a 120 ml $NH_4Cl$ spacer preflush at 10 ml/min.
12. Four percent of the VF was mixed in 3% $NH_4Cl$ brine and was then injected into both simultaneously under a constant differential pressure of 520 psi for 60 minutes. Effluents from the cores were measured by electronic balances.

13. VF was followed by 3% NH₄Cl brine or 15% HCl brine, injected into both cores simultaneously at 10 ml/min. Effluent volume through each core was measured.

FIG. 21 shows that use of a mutual solvent preflush prior to the stage containing the viscoelastic surfactant results in excellent diversion of the acid stage into the area of highest oil concentration.

Figure 22:
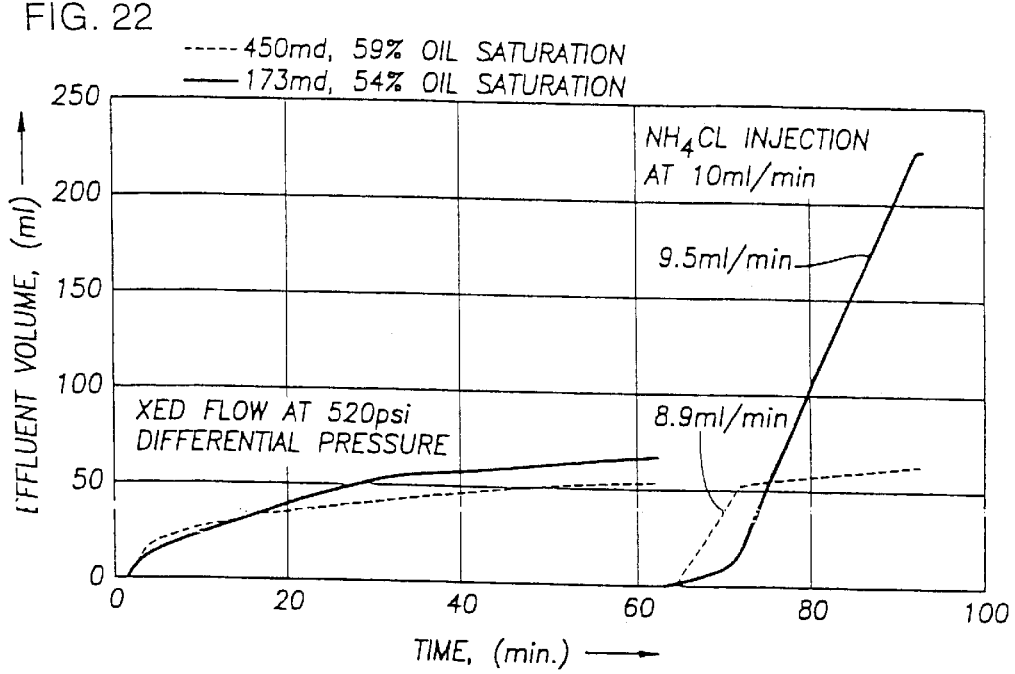
FIG. 22 presents a graph showing the effect of diversion into lower permeability rock (450 mD and 59% oil saturation vs. 173 mD and 54% oil saturation) using the same fluids and preflush composition referred to in regards to FIG. 21.

FIG. 22 shows that the sequence of mutual solvent followed by viscoelastic surfactant can divert subsequent water based treatments away from high permeability zone and into lower permeability zones of the same oil saturation.

Figure 23:
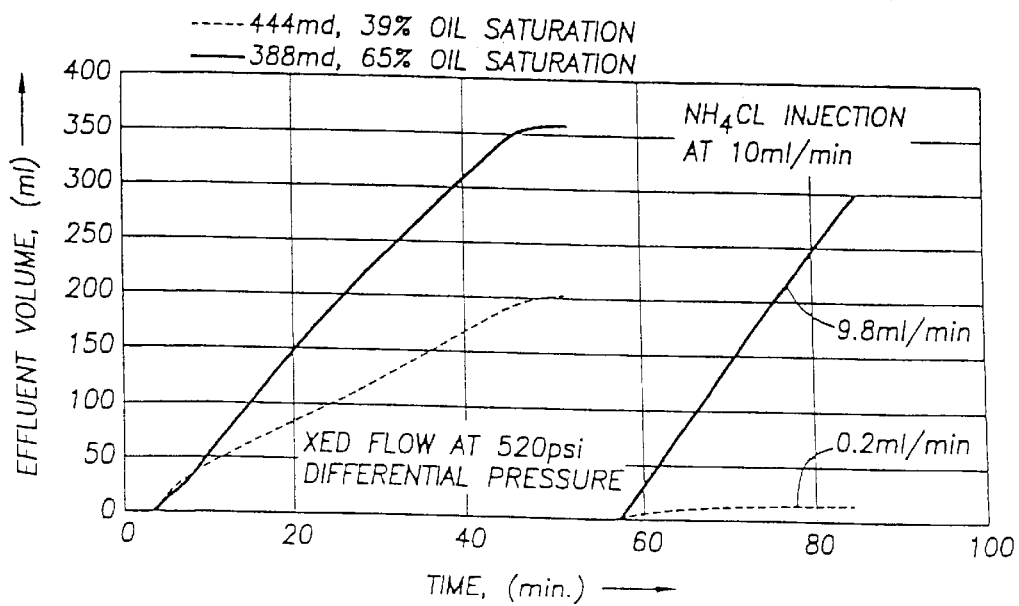
FIG. 23 presents a graph showing the effect of diversion using the same aqueous fluid used in FIG. 22, but followed by a 15% HCl brine and using the same preflush composition referred to in regards to FIG. 21. The cores were maintained at 190° F., instead of 150° F.

FIG. 23 shows that the sequence of mutual solvent and then viscoelastic surfactant can divert acid treatment away from areas of low oil saturation into an area of high oil saturation.

EXAMPLE 15

Figure 24:
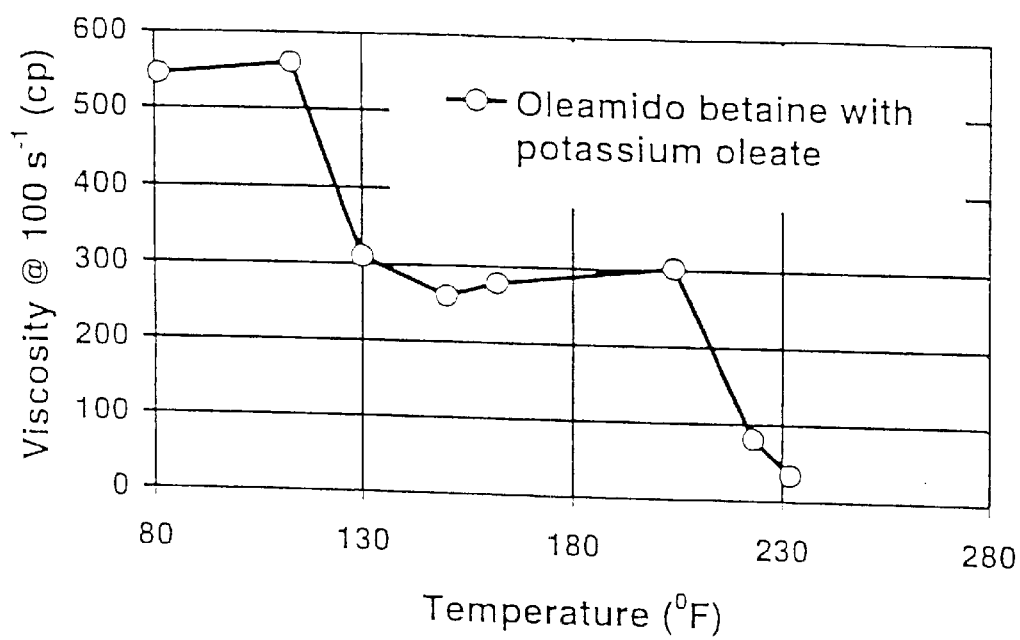
FIG. 24 presents a graph showing the rheology of a zwitterionic/aminoic surfactant system according to the present invention.

Zwitterionic Surfactant Plus Anionic Surfactant 33 ml of oleamido betaine (30% active) dissolved into 250 ml tap water and 2.75 g of potassium oleate was added to the solution. The solution was blended for about 3 minutes and then left in a temperature bath (180° F.) for about 4 hours to degas until the solution became clear. The reological test was performed on a reciprocating capillary viscometer. The test results are shown in FIG. 24. A viscosity of greater then 50 cp was maintained up to a temperature of about 230° F.

EXAMPLE 16

Figure 25:
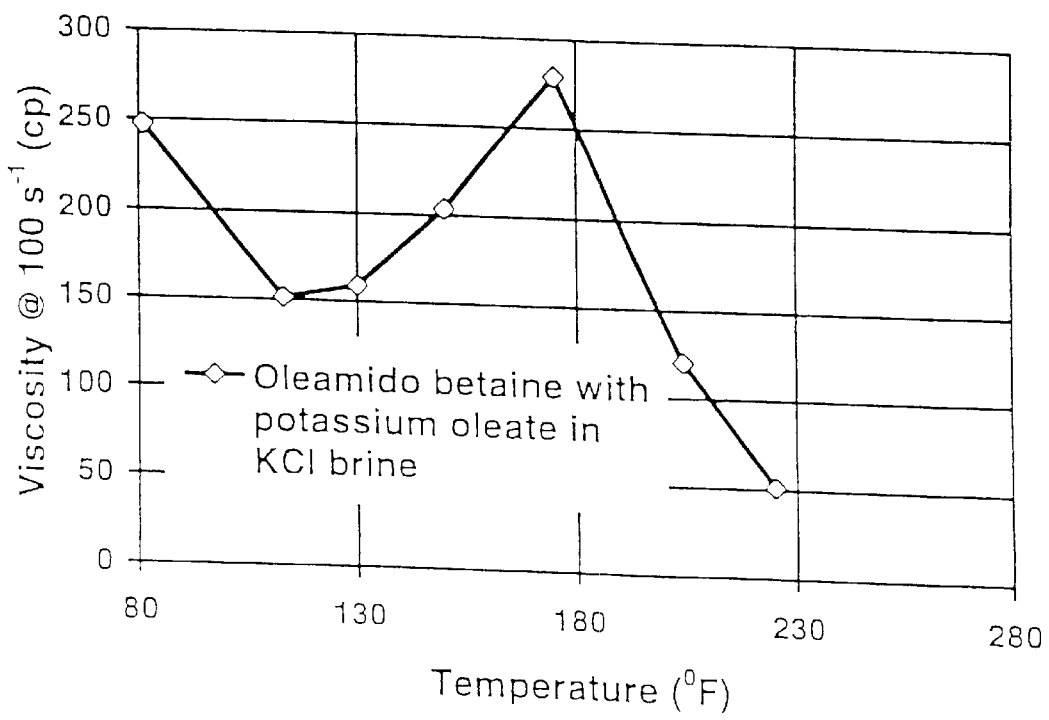
FIG. 25 presents a graph showing the rheology of a zwitterionic/anionic surfactant system with brine according to the present invention.

Zwitterionic Surfactant Plus Anionic Surfactant With Brine 33 ml of oleamido betaine (30% active) was dissolved into 250 ml 3% KCl solution and 2 g of potassium oleate was added to the solution. The solution was blended for about 3 minutes and then left in a temperature bath (180° F.) for about 4 hours to degas until the solution became clear. The rheological test was performed on a reciprocating capillary viscometer. The test results are shown in FIG. 25. A viscosity of at least 50 cp was maintained up to a temperature of about 225° F.

EXAMPLE 17

Figure 26:
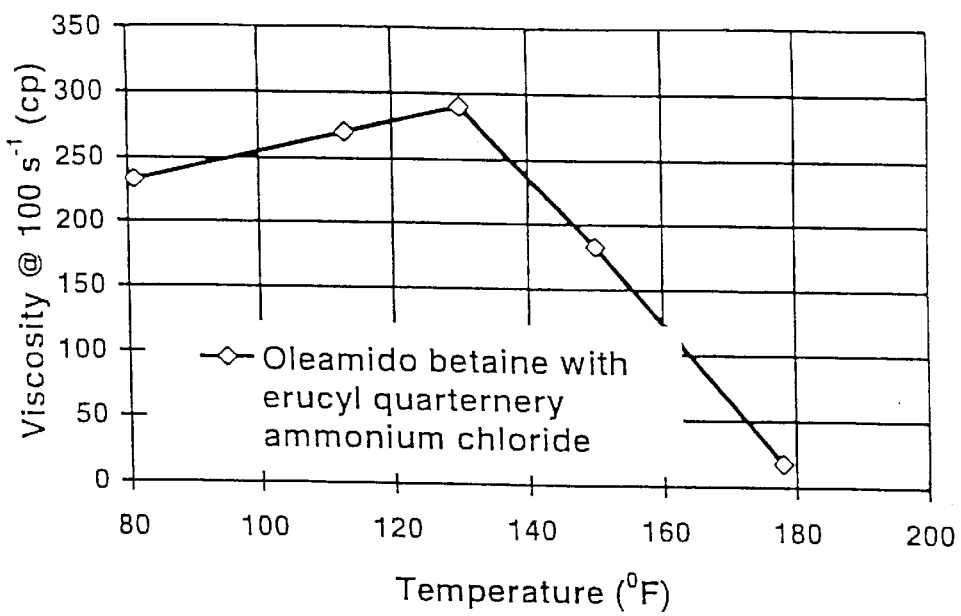
FIG. 26 presents a graph showing the rheology of a zwitterionic/cationic surfactant system according to the present invention.

Zwitterionic Surfactant Plus Cationic Surfactant 37.5 ml of oleamido betaine (30% active) was dissolved into 250 ml tap water and 5 g of erucyl quaternary ammonium chloride was added to the solution. The solution was blended for about 3 minutes and then left in a temperature bath (180° F.) for about 4 hours to degas until the solution became clear. The rheological test was performed on a reciprocating capillary viscometer. The test results are shown in FIG. 26. A viscosity of at least 35 cp was maintained up to a temperature of about 175° F.

EXAMPLE 18

Zwitterionic Surfactant Plus Long Chain Alcohol (nonionic)

Figure 27:
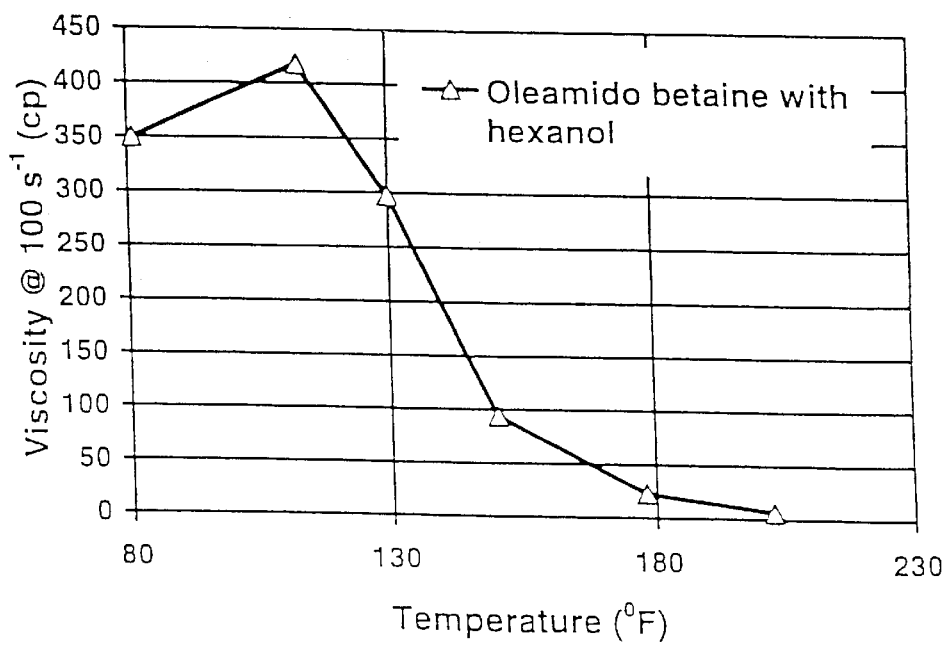
FIG. 27 presents a graph showing the rheology of a zwitterionic/long chain alcohol (nonionic) surfactant system according to the present invention.

33 ml of oleamido betaine (30% active) was dissolved into 250 ml tap water and 1.75 ml of hexanol was added to the solution. The solution was blended for about 3 minutes and then left in a temperature bath (180° F.) for about 4 hours to degas until the solution became clear. The rheological test was performed on a reciprocating capillary viscometer. The test results are shown in FIG. 27. A viscosity of at least 35 cp was maintained up to a temperature of about 175° F.

EXAMPLE 19

Figure 28:
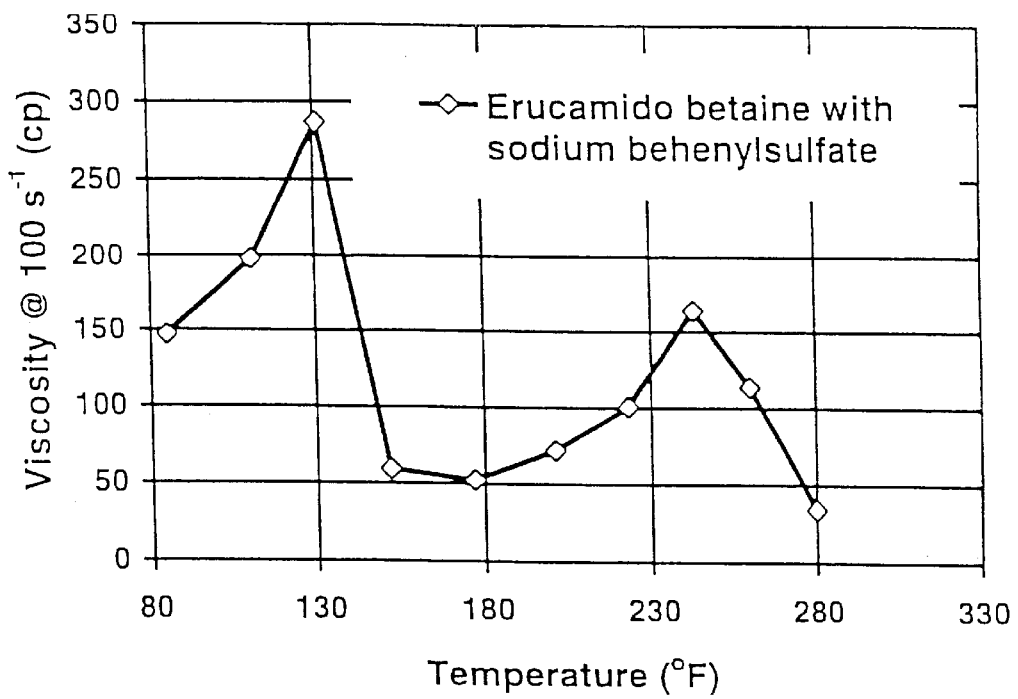
FIG. 28 presents a graph showing the rheology of a zwitterionic/anionic surfactant system according to the present invention.

Zwitterionic Surfactant Plus Anionic Surfactant 7.5 g of erucamido betaine was dissolved into 250 ml tap water and 1.5 g of behenyl sulfate was added to the solution. The solution was blended for about 3 minutes and then left in a temperature bath (180° F.) for about 4 hours to degas until the solution became clear. The rheological test was performed on a reciprocating capillary viscometer. The test results are shown in FIG. 28. A viscosity of at least 35 cp was maintained up to a temperature of about 280° F.

EXAMPLE 20

Figure 29:
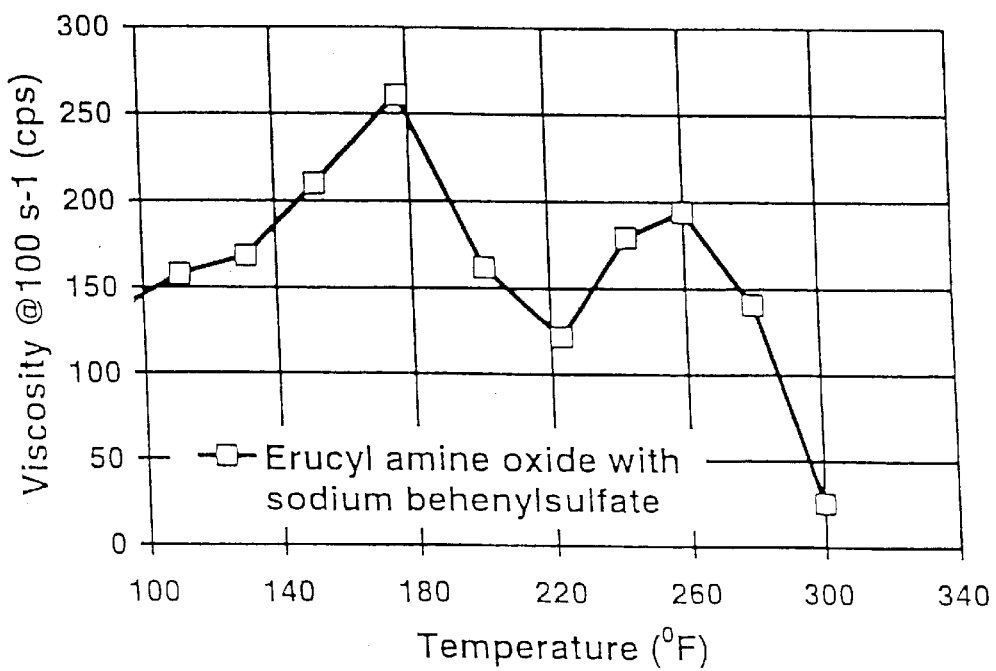
FIG. 29 presents a graph showing the rheology of a nonionic/anionic surfactant system according to the present invention.

Nonionic Surfactant Plus Anionic Surfactant 8.75 g of erucyl amine oxide was dissolved into 250 ml tap water and 3.0 g of sodium behenylsulfate was added to the solution. The solution was blended for about 3 minutes and then left in a temperature bath (180° F.) for about 4 hours to degas until the solution became clear. The rheological test was performed on a reciprocating capillary viscometer. The test results are shown in FIG. 29. A viscosity of at least 35 cp was maintained to a temperature of about 295° F.

EXAMPLE 21

Figure 30:
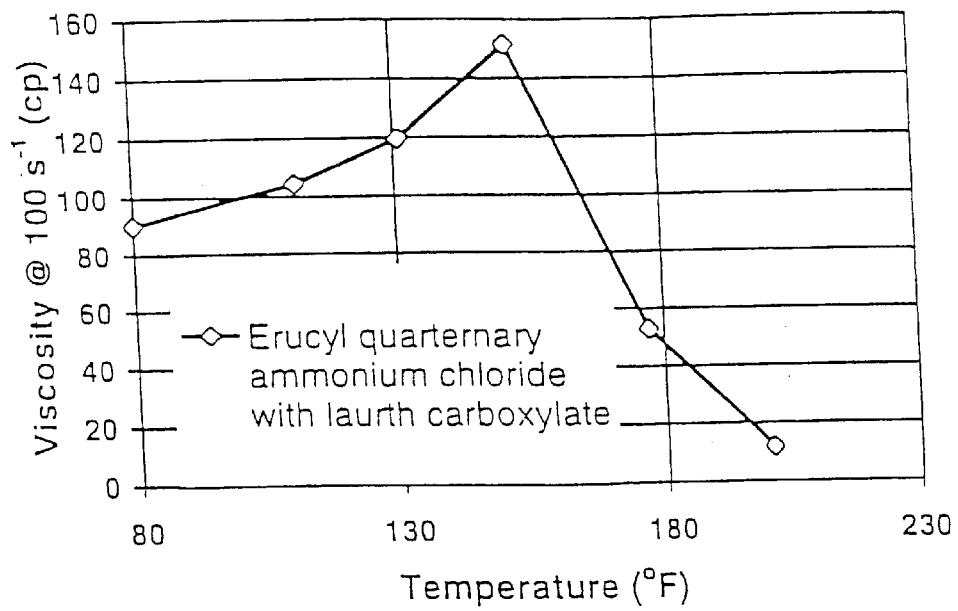
FIG. 30 presents a graph showing the rheology of a cationic/anionic surfactant system according to the present invention.

Cationic Surfactant Plus Anionic Surfactant 10 g of erucyl quaternary ammonium chloride was dissolved into 250 ml tap water and 20 g of laureth carcoxylate was added to the solution. The solution was blended for about 3 minutes and then left in a temperature bath (180° F.) for about 4 hours to degas until the solution became clear. The Theological test was performed on a reciprocating capillary viscometer. The results are shown in FIG. 30. A viscosity of at least 35 cp was maintained to a temperature of about 190° F.

EXAMPLE 22

Nonionic Surfactant Plus Anionic Surfactant (no brine)

Figure 31:
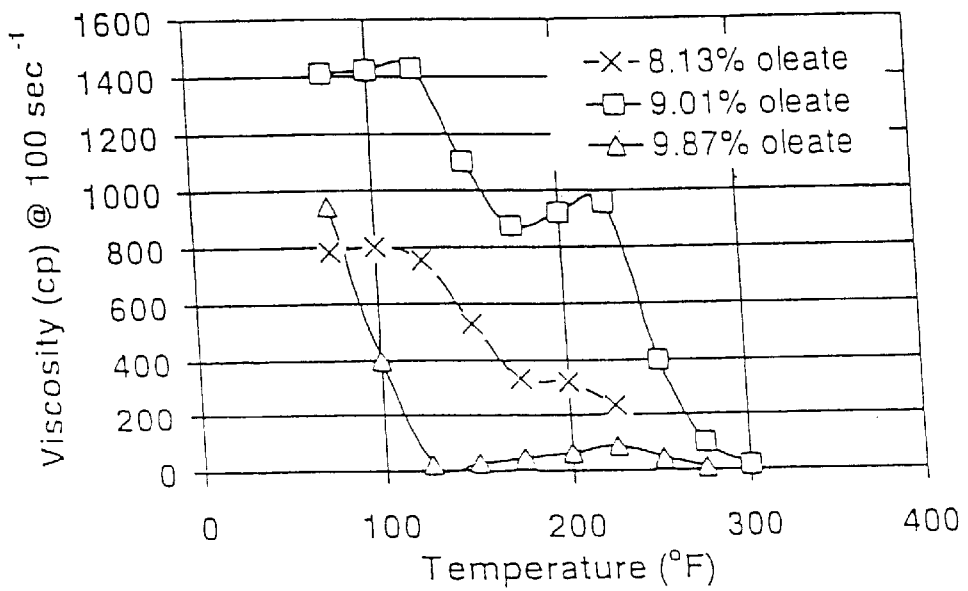
FIG. 31 presents a graph showing the rheology of a nonionic/anionic surfactant system according to the present invention.

Three 1 L blender cups were filled with 150 mL water, each was added octanol 8.40 wt %. Potassium oleate was then added at three concentrations: 8/13 wt %, 9.01 wt % and 9.87%. The mixtures were blended until no solid was visible (~5 min.) and then degassed in a 105° F. water bath for 10 hours (three days for fluid containing 9.01% oleate and 8.40% octanol). Rheological measurements were performed on a Fann 50 rheometer and the viscosity of fluids are shown in the plot below. In the case of 9.01% potassium oleate and 8.40% octanol fluid viscosity is greater than 50 cp (100 sec−1) up to 275° F. The test results are shown in FIG. 31.

EXAMPLE 23

Nonionic Surfactant Plus Anionic Surfactant in KCl Brine

Figure 32:
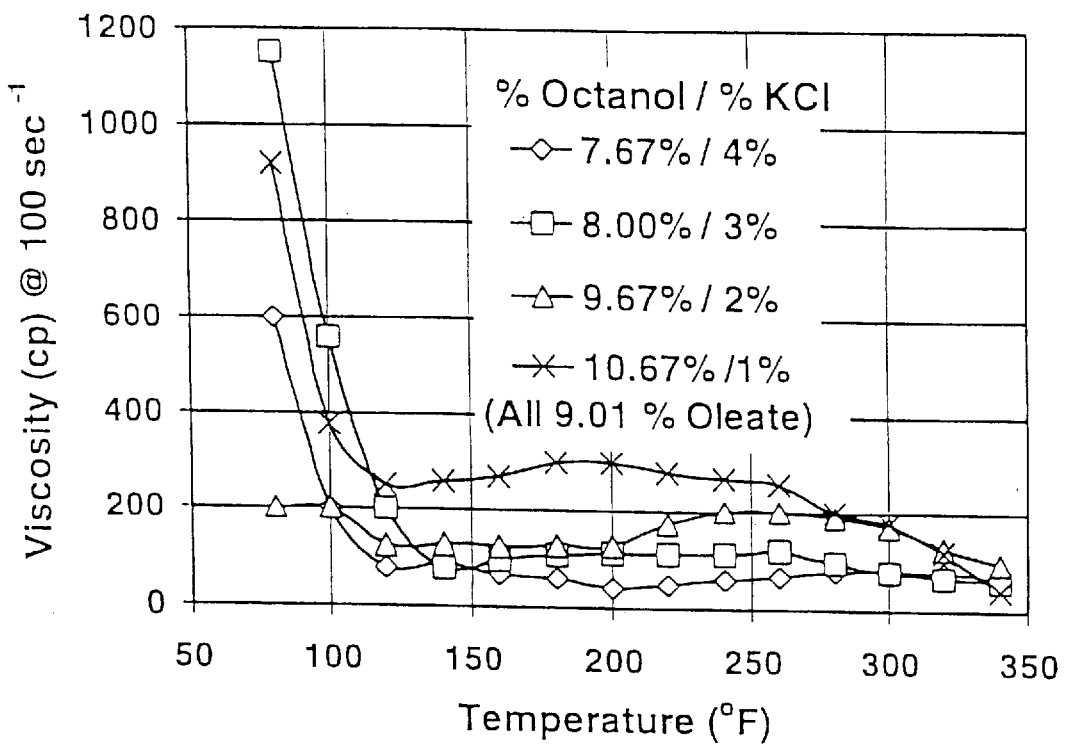
FIG. 32 presents a graph showing the rheology of a nonionic/anionic surfactant system in KCl brine system according to the present invention.

Four 150 ml fluids that have the HIGHEST SECOND GEL PHASE VISCOSITY at ambient temperature were prepared as described in example 2A. First fluid contains 9.01% potassium oleate, 8.0% octanol and 3% KCl; third fluid contains 9.01% potassium oleate, 9.67% octanol and 2% KCl; and forth fluid contains 9.05% potassium oleate, 10.67% octanol and 1% KCl. All fluids were degassed in a 150° F. bath for 10 hours and cooled to ambient temperature before rheological measurements were performed on a Fann 50 rheometer. The data show sufficient viscosity for adequate proppant transport (~50 cp @100 sec–1) up to fluid temperature 340° F. can be obtained in the case of fluids #1, #2 and #3. The test results are shown in FIG. 32.

EXAMPLE 24

Nonionic Copolymer Surfactant Without Brine 15 to 25 g of poly(oxyethelene-oxypropylene-oxyethylene) ($PEO_{100}PPO_{65}PEO_{100}$) was dissolved into 100 ml tap water. The solution exit as spherical micelles packed onto a simple cubic lattice to form gel. More than 50 cp @100 s–1 is achieved at temperature above 160° F.

EXAMPLE 25

Cationic Plus Nonionic Surfactant With Brine

Two 1 L blender cups were filled with 150 mL 4 wt. % KCl brine, each was then added 2 v. % of erucyl quaternary ammonium chloride (QUAT) and 0.05 to 0.15 wt. % non-ionic surfactant (lauryl ethoxylated alcohol, dodecylamine or 1-dodecyl-2-pyrollidinone) with blending. The mixtures were degassed in a 150° F. water bath and rheological measurements were performed on a Fann35 viscometer. Rheological data are listed in below.

| Composition | Temperature (° F.) | Viscosity @ $170s^{-1}$ (cp) |
|---|---|---|
| QUAT plus dodecylamine | 100 | 60 |
|  | 150 | 39 |
| QUAT plus ethoxylated dodecyl alcohol | 110 | 51 |
|  | 150 | 45 |
| QUAT plus 1-dodecyl-2-pyrrolidinone | 80 | 63 |
|  | 150 | 44 |

EXAMPLE 26

Anionic Surfactant in Brine

Figure 33:
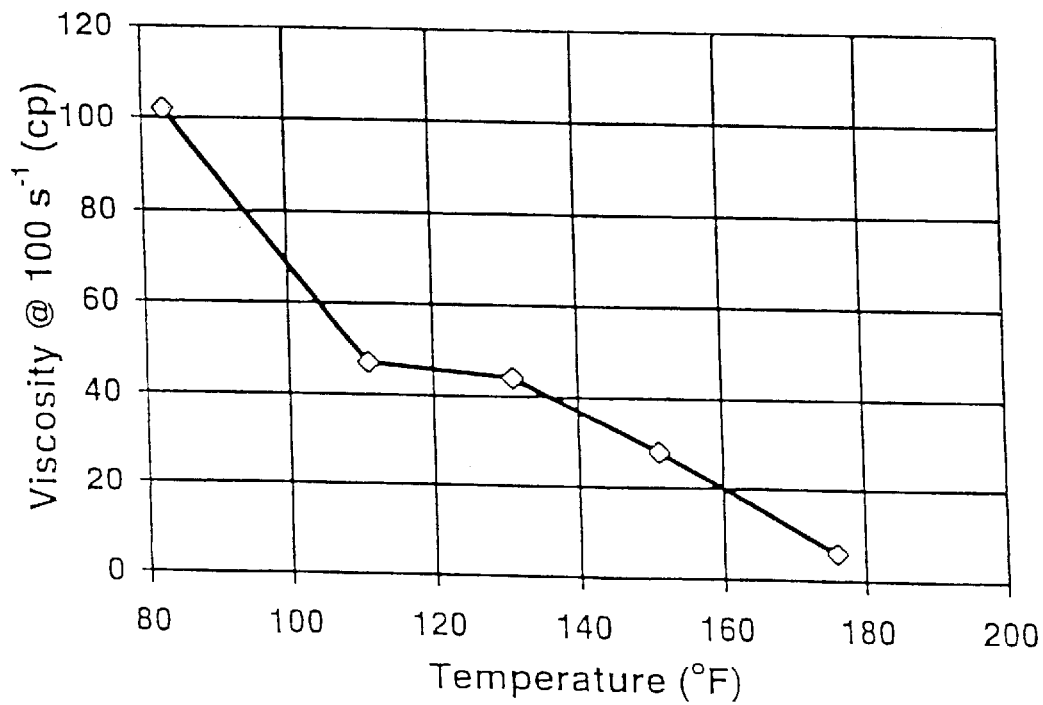
FIG. 33 presents a graph showing the rheology of a anionic surfactant in brine according to the present invention.

A 1L cup was filled with 150 ml 2 wt. % KCl brine; and 1 wt. % of sodium oleate was added with blending. The mixture was degassed in a 150° F. water bath and Theological measurements was performed on a Farm 50 viscometer. The test results are shown in FIG. 33.

EXAMPLE 27

Anionic Surfactant Without Brine (>C18)

A 1L blender cup was filled with 150 ml water, and 5 wt. % of potassium oleate was added with blending. The mixture was degassed in a 150° F. water bath and rheological measurements was performed on a Farm 50 viscometer and its viscosity at ambient temperature is 45 cp @100 $s^{-1}$.

EXAMPLE 28

Anionic Surfactant (lauryl) in Brine (<C18)

Figure 34:
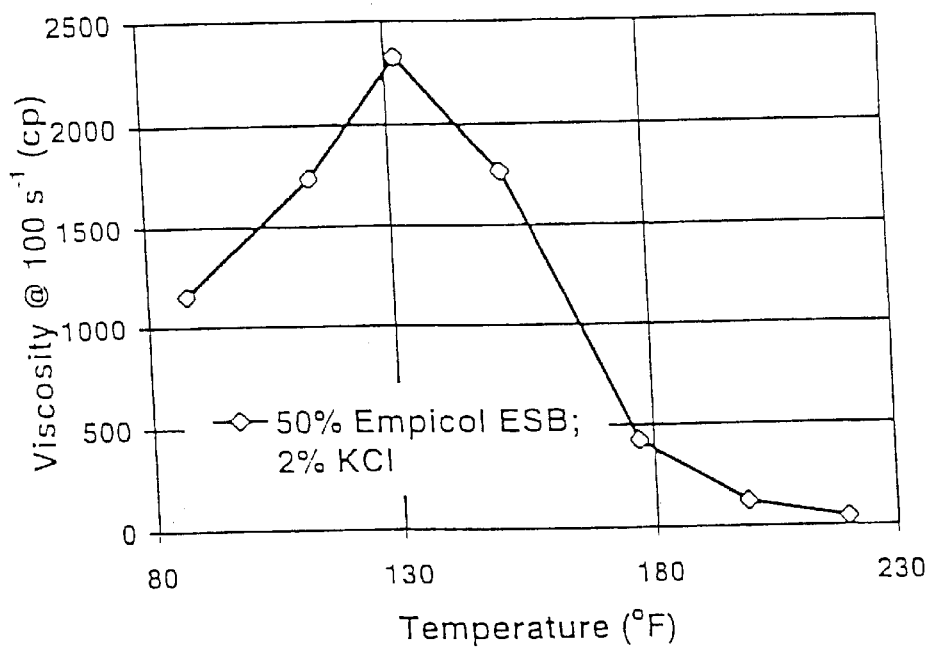
FIG. 34 presents a graph showing the rheology of a zwitterionic surfactant without brine according to the present invention.

A 1L blender cup was filled with 150 ml 2 wt. % KCl brine, and 50 wt. % of sodium laurth sulfate (Empicol ESB, 28% active) was added with blending. The mixture was degassed in a 150° F. water bath and rheological measurements was performed on a Fann 50 viscometer. The test results are shown in FIG. 34.

EXAMPLE 29

Zwitterionic Surfactant Without Brine (>C18)

Figure 35:
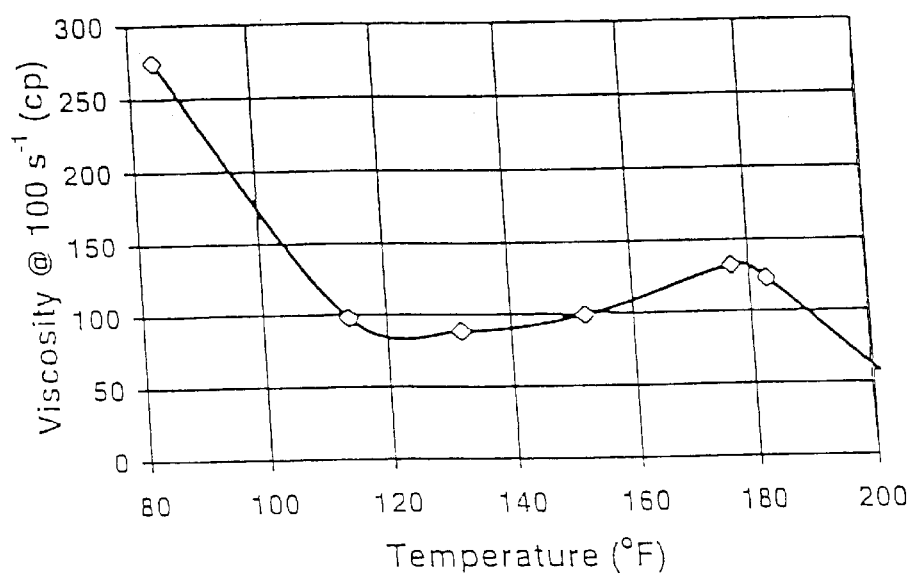
FIG. 35 presents a graph showing the rheology of a zwitterionic surfactant with brine according to the present invention.

A 1L blender cup was filled with tap water, and 7 Vol. % of erucamido betaine (Mirataine BET-E, Rhodia, 55% active) was added with blending. The mixture was degassed in a 150° F. water bath and rheological measurements was performed on a reciprocating capillary viscometer. The test results are shown in FIG. 35. A viscosity of at least 50 cp was maintained to a temperature of about 200° F.

Fann 50 (model A, Fann Instrument) Testing Procedure

At each designed temperature, about 50 ml of the fluid is placed into the measurement cup. The cup is kept at the designed temperature. For each temperature, the fluid is ramping at the following schedule: 100, 75, 50, 25, S5, 75, and $100s^{-1}$. From the measurement of the shear stress and shear rate, the power law parameters, N' and K', for the fluid Theological properties are determined and the viscosity at $100s^{-1}$ at designed temperature is obtained. The testing procedure is not exactly API standard.

Reciprocating Capillary Viscometer Testing Procedure

Figure 36:
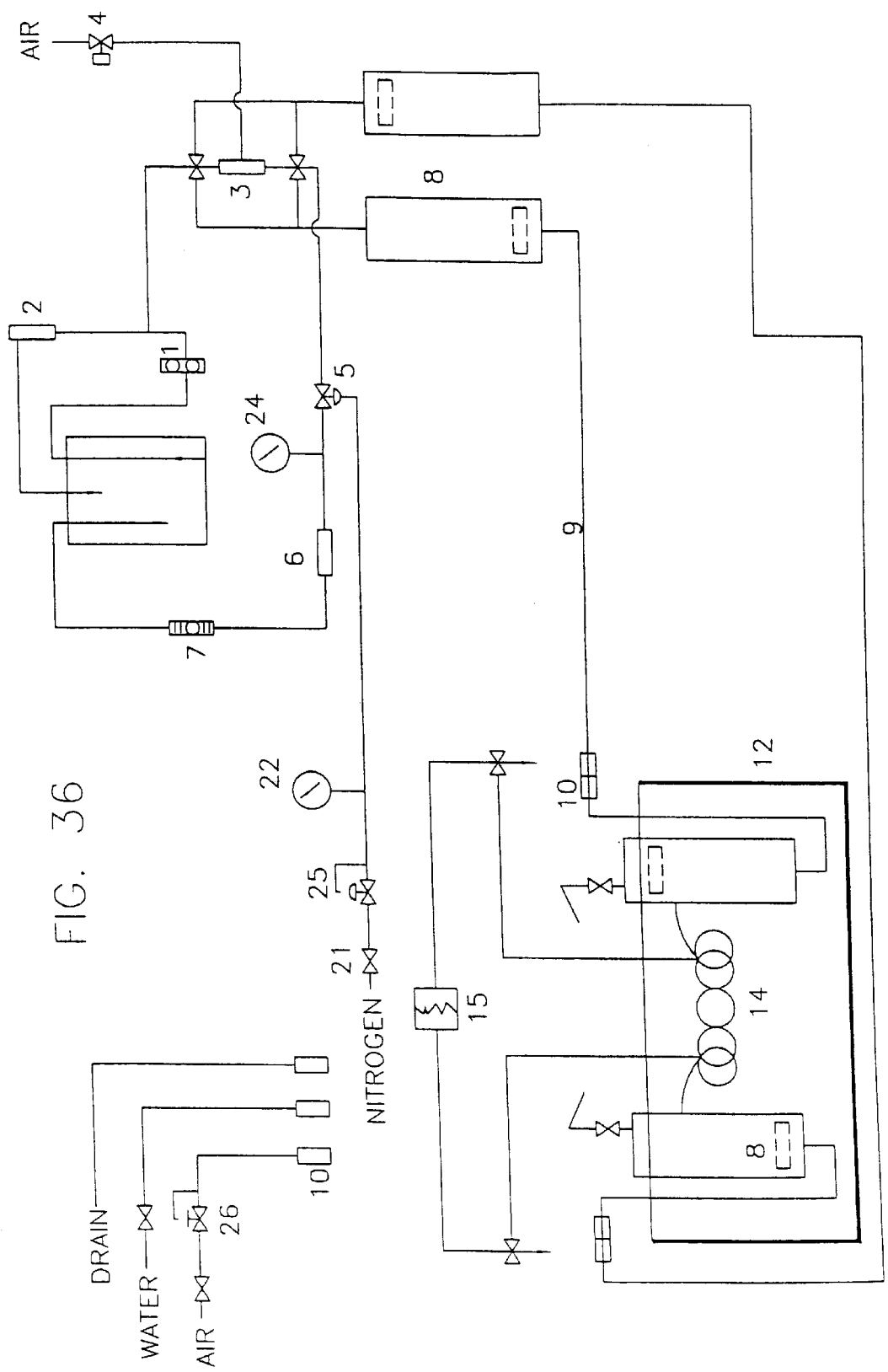
FIG. 36 presents a schematic illustration of a reciprocating capillary viscometer.

The reciprocating capillary viscometer was assembled by engineers of Schlumberger Technology Corporation, and the basic outline set-up of the viscometer is shown in FIG. 36. Similar devices have been used by the oilfield industry. At each designed temperature, about 250 ml of the fluid is placed into the test cylinders. The sample cylinders are kept in a temperature bath at designed temperature. For each temperature, the fluid is ramping at the following schedule: 100, 75, 50, 25, 50, 75, and $100s^{-1}$. From the measurement of the shear stress from the differential pressure cross a capillary tube at different shear rates, the power law parameters, N' and K', for the fluid rheological properties are determined and the viscosity at $100s^{-1}$ at designed temperature is obtained from N' and K'. The testing procedure is not exactly API standard.

The reciprocating capillary viscometer (RCV) can be used to evaluate long term rheology at high temperatures on fluids which are corrosive or highly crosslinked and could not be used on Fann 50 viscometers. This instrument is excellent for determining rheological properties of both linear and crosslinked fracturing fluids.

The purpose of the RCV is to provide long-term rheology data on fracturing fluids under known conditions of shear and temperature. The basic principle of operation involves reciprocation, a portion of the test fluid back and forth inside a capillary tube and measuring the resultant pressure drop as a function of flow rate, temperature and time. By knowing pressure drop, flow rate, and tubing dimensions, shear stress/shear rate data is determined for the fluid composition. The Power Parameters of Consistency Index (k) and Behavior Index (n) are obtained by subjecting the fluid to a series of different shear rates and determining the resultant shear stresses. Apparent viscosity at a shear rate of 100 $sec^{-1}$ is then calculated.

To avoid and effects due to energy lesser and change in flow pattern when a fluid enters or leaves a capillary, a distance of at least 50 to 300 diameters between capillary ends and the measurement section depending on the nature of the fluid and other conditions. The RCV used herein had 2965 diameters from the inlet to the measurement section.

The tubing was 62 feet long, had an inside diameter of 0.086 inches and was rolled into 4 inch coils. The values for Reynolds and Dean numbers for this system were well under the values at which deviations occur between coiled capillary flow and straight-tube laminar flow.

Instrument Design

The Reciprocating Capillary Viscometer allows long time, high temperature rheology data to be collected using capillary tubes as the measurement device (FIG. 36). The test fluid is placed into a floating piston accumulator which is driven by oil from a positive displacement pump. The fluid travels through a port in the accumulator wall and into 62 feet of ⅛ in. O.D. stainless steel tubing. The fluid leaves the capillary and enters another accumulator. The fluid displaces the piston in the receiving accumulator until a programmable controller switches a valve on the hydraulic oil line which reverses the direction of fluid travel. The differential pressure is measured across the center 20 feet of ⅛ in O.D. tubing. The fluid direction is reversed every time a volume of fluid equal to the volume of the measurement capillary has been pumped. This go allows a portion of test fluid to remain in the capillary tube and under known shear at all times. Fluids may be tested above their boiling point because of a 200 psi back pressure which is applied on the oil being displaced from the accumulators by an adjustable back pressure regulator. By knowing the pressure drop, the tubing dimensions, and the pump flow rate, shear stress/shear rate data is determined. Temperature control is by means of a Haake circulating bath. The pump flow rate, bath heater, chart speed, hydraulic oil directional control valves, and time of data collection are controlled by a programmable controller. Data collection, data storage and analysis id done on a computer. The functions of each of the different units of the instrument are described in more detail in the following sections.

Hydraulic System

The fluid shear rate and direction of travel is controlled by the hydraulic system. This part of the instrument consists of a positive displacement duplex pump, 4 floating piston accumulators, two three-way valves connected to a valve actuator, a relief valve, connections, etc. The shear rate is determined by the pump flow rate. The direction of fluid travel is controlled by the two three-way valves connected to the valve actuator. The three way valves are mounted in opposite positions and connected to the valve actuator. This allows oil to flow from the pump to one accumulator at the same time oil is being displaced from the other accumulator and back to the oil reservoir. When the actuator rotates the valves to the opposite position, the flow direction is reversed.

The hydraulic system has four floating piston accumulators. Two of the accumulators isolate the oil which is pumped through the piston pump form the oil which displaces the piston in the sample accumulators. The pump oil is a low viscosity hydrocarbon while the oil driving the samples accumulators is a silicone oil (Dow Corning 200 Fluid, 100 c.s., flash point >450° F.). The isolation accumulators allow a constant temperature and viscosity oil to be pumped at all times. This is necessary to maintain constant flow rates and to protect the pump heads from temperature damage.

Capillary Selection and Measurement Method

FIG. 36 illustrates the arrangement of the sample accumulators, pressure transducer, and capillary. The sample is loaded into the accumulators and capillary by a "batch load" process. The floating piston accumulators drive the fluid back and forth in the 62 feet of ⅛ in. (0.086 in. nominal I.D.) tubing while the pressure drop for a given flow rate is measured across the center 20 feet of tubing using a Validyne differential pressure transducer. The tubing diameter and length were selected on basis of satisfying three conditions:

1. To allow fluid testing at shear rates similar to those obtainable on a Fann 50 Viscometer.
2. To have a large enough differential pressure to minimize measurement errors.
3. To have enough fluid volume in the measurement capillary to the flow direction does not have to be reversed at too short of an interval. This allows stable flow to be achieved between direction changes.

A typical procedure for carrying out these measurements is as follows:

1. Fluid direction is reversed after pumping slightly less than one measurement capillary volume. For a 0.086 in I.D. by 20.0 ft. capillary the volume is 22.8 ml (vol.=$\pi r^2 L$). The direction is reversed every 22.0 ml. The total capillary volume for 62 ft. is 70.1 ml.
2. The fluid direction reversal time is dependent on the pump rate.
3. A shear ramp is run while pumping one measurement capillary volume (22.8 ml). The shear ramp consists of flow rates to generate the shear rtes of 100, 75, 50, 25, 75, and 100 sec$^{-1}$. The pressure drop for 100 sec$^{-1}$ rate is taken from the constant shear rate data just before the ramp.
4. The transducer is "zeroed" prior to each ramp by the computer. This is done by taking data at the 100 sec–1 constant shear rate in both flow directions (from the left accumulator to the right accumulator and then right to left) and then dividing by two. This is possible because the transducer reads pressure as positive when the fluid is traveling right to left and negative when the fluid travels left to right.

Data Collection

The RCV are interfaced to a real-time computer system which allows experimental setup, data collection and analysis, and transfer to storage on a Host computer for further data analysis and reporting. The fluid flow behavior is determined by applying a standard Power Law model and determining the parameters of Behavior Index (n) and the Consistency Index (k). These parameters are obtained from the slope and intercept of a least square fit of log shear rate vs log shear stress data determined by:

$$\text{shear rate} = \frac{8V}{D}$$
$$\text{shear stress} = \frac{\Delta P}{4L}$$

V = velocity (cm/sec.)
D = diameter (cm)
ΔP = dynes/cm
L = length (cm)

Parts List for RCV (FIG. 35)

1. Pump: Beckman 101A No. 235214 (0–28 ml/min) 6000 psi max.
2. Relief Valve: Teledyne no. 637B-10-1/4-2 (set at 1400 psi).
3. Flow Direction Control Valves and Operator: Whitey "60" series MS151SR Operator and two Whitey model SS-43-SX$ 3-way valves.
4. Back Pressure Regulator: Grove S-91W.
5. Filter: Nupro SS-415 15 micron.
6. Flowmeter: Dwyer RMA-14-TMV (0–25 × 1j00 cc/min, air).
7. Floating Piston Accumulators (isolation and sample): 304 S.S. design pressure ratings 3500 psi at 75° F. and 1620 psi at 400° F. 225 CC volume above piston. 2 ¾" O.D., 7 ¾" Body, 8 ½" overall with caps. ¼" wall thickness. O-rings 2–136.
8. Flexible Tubing: Teflon lined, swagelock connections.
9. Quick Connects: Swagelock (double shutoff).

Temperature Control and Measurement

10. Haake W26 bath and Haake N3 Controller (220 volts). Note: Controller has been modified so that heating elements are activated by closure of a power relay controlled by the Beckman controller.

Sample Capillary and Transducer

11. ⅛" O.D. by ≈ 0.085" I.D. Stainless Steel. Measurement Capillary is 20.0 ft., reservoir capillaries[(2)] are 21 ft. long.
12. Differential Pressure Transducer: Validyne Model DP 305 psi range.

The invention has been described in the more limited aspects of preferred embodiments hereof, including numerous examples. Other embodiments have been suggested and still others may occur to those skilled in the art upon a reading and understanding of the specification. It is intended that all such embodiments be included within the scope of this invention.

What is claimed is:

1. A method of acidizing a formation having a hydrocarbon zone and a water-baring zone, the method comprising:
   (a) selectively blocking the pore structure in the water-bearing zone at the formation face to selectively retard migration of acid into the water-bearing zone and allow migration into the hydrocarbon zone; and
   (b) injecting acid into the formation, wherein the acid is diverted from the water-bearing zone to the hydrocarbon zone as a result of selectively blocking the pore structure in the water-bearing zone at the formation face, wherein the step for selectively blocking forms a plug of viscous fluid in the pore structure of the water-bearing zone at the formation face, and wherein the viscous fluid has at least
   (i) a viscosifying surfactant capable of forming micelle in an aqueous environment;
   (ii) a water-soluble salt to effect formation stability, and
   (iii) an aqueous carrier fluid in which the viscosifying surfactant forms the viscosifying micelles.

2. The method of claim 1, wherein the water-bearing zone contains a residual amount of hydrocarbon residues and the method further comprising injecting a solvent prior to the step for selectively blocking.

3. The method of claim 2, wherein the solvent is selected from the group consisting of aromatic compounds, low molecular weight esters, ethers, alcohols, interfacial reducing agents, and surfactants.

4. The method of claim 3, wherein the solvent is a low molecular weight ether.

5. The method of claim 4, wherein the low molecular weight ether is ethylene glycol monobutyl ether.

6. The method of claim 1, wherein the acidizing method is amatrix acidizing method.

7. The method of claim 1, wherein the acidizing method is a fracture acidizing method.

8. A method of acidizing a formation having a hydrocarbon zone and a water-bearing zone, the method comprising:
   (a) pumping into a wellbore a wellbore service fluid comprising
      1) an aqueous medium
      2) a thickening amount of at lest one surfactant capable of forming viscosifying micelles in the aqueous medium; and
      3) a water-soluble salt to effect formation stability,
      4) wherein the fluid contains viscosifying micelles at surface conditions and a test fluid consisting of water and the thickening amount of the at least one surfactant has a viscosity of at least 35 cP at 100 $sec^{-1}$ and 130 degrees F. as measured by the RCV test
   wherein the at least one viscosifying surfactant therein selectively blocks the pore structure in the water-bearing zone at the formation face to selectively retard migration of acid into the water-bearing zone and allow migration into the hydrocarbon zone; and
   (b) injecting acid into the formation, wherein the acid is diverted from the water-bearing zone to the hydrocarbon zone as a result of selectively blocking the pore structure in the water-bearing zone at the formation face.

* * * * *